United States Patent
Meng et al.

(10) Patent No.: US 12,496,354 B2
(45) Date of Patent: Dec. 16, 2025

(54) CD142 ANTIBODIES, ANTIBODY-DRUG CONJUGATES, PREPARATIONS AND USES THEREOF

(71) Applicant: MULTITUDE THERAPEUTICS INC., Shanghai (CN)

(72) Inventors: Xun Meng, Shanghai (CN); Shu-Hui Liu, Redwood City, CA (US); Yue Zhang, Shanghai (CN)

(73) Assignee: Multitude Therapeutics Inc., Shanghai (CN)

( * ) Notice: Subject to any disclaimer, the term of this patent is extended or adjusted under 35 U.S.C. 154(b) by 0 days.

(21) Appl. No.: 19/073,422

(22) Filed: Mar. 7, 2025

(65) Prior Publication Data

US 2025/0242044 A1 Jul. 31, 2025

Related U.S. Application Data

(63) Continuation of application No. PCT/CN2023/125261, filed on Oct. 18, 2023.

(51) Int. Cl.
| | | |
|---|---|---|
| A61K 47/68 | (2017.01) | |
| A61P 35/00 | (2006.01) | |
| C07K 16/36 | (2006.01) | |

(52) U.S. Cl.
CPC .... *A61K 47/6851* (2017.08); *A61K 47/68031* (2023.08); *A61P 35/00* (2018.01); *C07K 16/36* (2013.01); *C07K 2317/24* (2013.01); *C07K 2317/73* (2013.01); *C07K 2317/92* (2013.01)

(58) Field of Classification Search
CPC .............................. A61K 47/6851; C07K 16/36
See application file for complete search history.

(56) References Cited

U.S. PATENT DOCUMENTS

| | | | |
|---|---|---|---|
| 5,244,903 | A | 9/1993 | Wall et al. |
| 5,500,362 | A | 3/1996 | Robinson et al. |
| 9,028,833 | B2 | 5/2015 | Govindan et al. |
| 2016/0297890 | A1 | 10/2016 | Agatsuma et al. |
| 2024/0238440 | A1 | 7/2024 | Zhang et al. |
| 2024/0245795 | A1 | 7/2024 | Zhang et al. |
| 2024/0245799 | A1 | 7/2024 | Zhang et al. |

FOREIGN PATENT DOCUMENTS

| | | | | |
|---|---|---|---|---|
| CN | 112094346 | A | 12/2020 | |
| WO | 90/07861 | A1 | 7/1990 | |
| WO | 99/58572 | A1 | 11/1999 | |
| WO | 2010/066803 | A2 | 6/2010 | |
| WO | WO-2011157741 | A2 * | 12/2011 | .............. A61P 35/02 |
| WO | 2015/075201 | A1 | 5/2015 | |
| WO | 2018/036243 | A1 | 3/2018 | |
| WO | 2019/136309 | A1 | 7/2019 | |
| WO | 2020/236841 | A2 | 11/2020 | |
| WO | 2022/115451 | A1 | 6/2022 | |
| WO | 2022/115477 | A1 | 6/2022 | |

OTHER PUBLICATIONS

Hanahan et al. Cell. 144(5): 646-674; Published: Mar. 4, 2011 (Year: 2011).*
Pitot et al. Cancer. 73(3): 962-970; Published: Aug. 1, 1993 (Year: 1993).*
Al-Lazikani et al., "Standard Conformation for the canonical structures of Immunoglobulins", J. Molec. Biol., 1997, 273, 927-948.
Almagro, "Identification of differences in the specificity-determining residues of antibodies that recognize antigens of different size: implications for the rational design of antibody repertoires", J. Mol. Recognit, 2004, 17, 132-143.
Alouane et al., "Self-Immolative Spacers: Kinetic Aspects, Structure-Property Relationships, and Applications", Angew. Chem. Int. Ed., 2015, 54, 7492-7509.
Altschul et al., "Basic Local Alignment Search Tool", J. Mol. Biol., 1990, 215, 403-410.
Altschul et al., "Gapped BLAST and PSI-BLAST: a new generation of protein database search programs", Nuc Acids Res., 1997, 25, 3389-3402.
Armour et al., "Recombinant human IgG molecules lacking Fc ? receptor I binding and monocyte triggering activities", Eur. J. Immunol, 1999, 29, 2613-2624.
Chothia et al., "Canonical Structures for the Hypervariable Regions of Immunoglobulins", J. Mol. Biol., 1987, 196, 901-917.
Chothia et al., "Conformations of Immunoglobulin hypervariable regions", Nature, 1989, 342, 877-883.
Conilh et al., "Exatecan Antibody Drug Conjugates Based on a Hydrophilic Polysarcosine Drug-Linker Platform", Pharmaceuticals, Mar. 9, 2021, vol. 14, 1-17.
Jones et al., "Replacing the complementarity-determining regions in a human antibody with those from a mouse", Nature, 1986, 321, 522-525.
Joubert et al., "Antibody-Drug Conjugates: The Last Decade", Pharmaceuticals, 2020, 13(9), 245, 1-31.
Kohler et al., "Continuous cultures of fused cells secreting antibody of predefined specificity", Nature, 1975, 256, 495-497.
Kong et al., "MTX-13, a Novel PTK7-Directed Antibody-Drug Conjugate with Widened Therapeutic Index Shows Sustained Tumor Regressions for a Broader Spectrum of PTK7-Positive Tumors", Molecular Cancer Therapeutics, Jun. 22, 2023, vol. 22, No. 10, 1128-1143.
Kuroiwa et al., "Efficient modification of a human chromosome by telomere-directed truncation in high homologous recombination-proficient chicken DT40 cells", Nucl. Acids Res., 1998, 26, 3447-3448.
Morrison et al., "Chimeric human antibody molecules: Mouse antigen-binding domains with human constant region domains", Proc. Natl. Acad. Sci. U.S.A,, 1984, 81, 6851-6855.

(Continued)

*Primary Examiner* — Juliet C Switzer
*Assistant Examiner* — Katherine Ann Holtzman
(74) *Attorney, Agent, or Firm* — BakerHostetler

(57) ABSTRACT

The present disclosure relates to the antibodies specific targeting CD142, antibody-drug conjugates, preparations and uses thereof. The antibody or antigen-binding fragment thereof binding to CD142 is covalently linked to a cytotoxic payload through a linker. The antibody or antigen-binding fragment thereof binding to CD142 and the antibody-drug conjugate exhibit cytotoxic effects on tumor cells.

28 Claims, 10 Drawing Sheets

Specification includes a Sequence Listing.

(56) References Cited

OTHER PUBLICATIONS

Nakada et al., "Novel antibody drug conjugates containing exatecan derivative-based cytotoxic payloads", Bioorg. Med. Chem. Lett., 2016, 26, 1542-1545.

Ogitani et al., "DS-8201a, A Novel HER2-Targeting ADC with a Novel DNA Topoisomerase I Inhibitor, Demonstrates a Promising Antitumor Efficacy with Differentiation from T-DM1", Clin Cancer Res., 2016, 22(20), 5097-5108.

Pace et al., "How to measure and predict the molar absorption coefficient of a protein", Protein Science, 1995, vol. 4, 2411-2423.

Su et al., "Antibody-drug conjugates: Recent advances in linker chemistry", Acta Pharmaceutica Sinica B., Dec. 21, 2021, vol. 11, No. 12, 3889-3907.

Tomizuka eds., "Double trans-chromosomic mice: Maintenance of two individual human chromosome fragments containing Ig heavy and k loci and expression of fully human antibodies", Proc. Natl. Acad. Sci. USA, 2000, 97, 722-727.

Tomizuka et al., "Functional expression and germline atransmission of a human chromosome fragment in chimaeric mice", Nature Genetics, 1997, 16, 133-143.

Tsuchikama et al., "Antibody-drug conjugates: recent advances in conjugation and linker chemistrie", Protein Cell, Jan. 2018, 9(1), 33-46.

Weng et al., "AMT-562, a Novel HER3-targeting Antibody-Drug Conjugate, Demonstrates a Potential to Broaden Therapeutic Opportunities for HER3-expressing Tumors", Molecular Cancer Therapeutics, Jun. 11, 2023, vol. 22, No. 9, 1013-1027.

Weng et al., "Antibody-Exatecan Conjugates with a Novel Self-immolative Moiety Overcome Resistance in Colon and Lung Cancer", Cancer Discovery, Jan. 24, 2023, vol. 13, 950-973.

Zhang et al., "Pathological expression of tissue factor confers promising antitumor response to a novel therapeutic antibody SC1 in triple negative breast cancer and pancreatic adenocarcinoma" Oncotarget, 2017, vol. 8, No. 35, 59086-59102.

Zhao et al., "Safety and Efficacy of Therapeutic Cancer Vaccines Alone or in Combination With Immune Checkpoint Inhibitors in Cancer Treatment", Front Pharmacol., 2019, 10, 749, 11 pages.

* cited by examiner

```
                              SEQUENCE LISTING

Sequence total quantity: 38
SEQ ID NO: 1            moltype = AA   length = 8
FEATURE                 Location/Qualifiers
source                  1..8
                        mol_type = protein
                        organism = synthetic construct
SEQUENCE: 1
GYTFSSYW                                                                    8

SEQ ID NO: 2            moltype = AA   length = 8
FEATURE                 Location/Qualifiers
source                  1..8
                        mol_type = protein
                        organism = synthetic construct
VARIANT                 5
                        note = X is D or Q
VARIANT                 8
                        note = X is S or A
SEQUENCE: 2
IYPGXGDX                                                                    8

SEQ ID NO: 3            moltype = AA   length = 11
FEATURE                 Location/Qualifiers
source                  1..11
                        mol_type = protein
                        organism = synthetic construct
SEQUENCE: 3
TREGYGNRFA Y                                                               11

SEQ ID NO: 4            moltype = AA   length = 5
FEATURE                 Location/Qualifiers
source                  1..5
                        mol_type = protein
                        organism = synthetic construct
SEQUENCE: 4
SSVSY                                                                       5

SEQ ID NO: 5            moltype = AA   length = 9
FEATURE                 Location/Qualifiers
source                  1..9
                        mol_type = protein
                        organism = synthetic construct
SEQUENCE: 5
QQWSYNPPT                                                                   9

SEQ ID NO: 6            moltype = AA   length = 118
FEATURE                 Location/Qualifiers
source                  1..118
                        mol_type = protein
                        organism = synthetic construct
SEQUENCE: 6
QVQLQQSGAE LVRPGSSVKI SCKASGYTFS SYWMYWVKQR PGQGLEWIGQ IYPGDGDSNY  60
NENFKGKATL TADKSSSTAY MQLSSLTSED SAVYFCTREG YGNRFAYWGQ GTLVTVSA   118

SEQ ID NO: 7            moltype = AA   length = 106
FEATURE                 Location/Qualifiers
```

```
source                    1..106
                          mol_type = protein
                          organism = synthetic construct
SEQUENCE: 7
QIVLTQSPAL MSASPGEKVT MTCSASSSVS YMYWYQQKPR SSPKPWINLT SNLASGVPAR    60
FSGRGSGTSY SLTISSMEAE DAATYYCQQW SYNPPTFGGG TKLEIK                  106

SEQ ID NO: 8              moltype = AA  length = 118
FEATURE                   Location/Qualifiers
source                    1..118
                          mol_type = protein
                          organism = synthetic construct
SEQUENCE: 8
QVQLVQSGAE VKRPGSSVKV SCKASGYTFS SYWMYWVRQA PGQGLEWIGQ IYPGDGDSNY    60
NENFQGRVTI TADKSTSTAY MELSSLRSED TAVYYCTREG YGNRFAYWGQ GTLVTVSS    118

SEQ ID NO: 9              moltype = AA  length = 118
FEATURE                   Location/Qualifiers
source                    1..118
                          mol_type = protein
                          organism = synthetic construct
SEQUENCE: 9
QVQLVQSGAE VKRPGSSVKV SCKASGYTFS SYWMYWVRQA PGQGLEWIGQ IYPGDGDSNY    60
NENFQGRVTI TADKSTSTAY MELSSLTSED SAVYFCTREG YGNRFAYWGQ GTLVTVSS    118

SEQ ID NO: 10             moltype = AA  length = 118
FEATURE                   Location/Qualifiers
source                    1..118
                          mol_type = protein
                          organism = synthetic construct
SEQUENCE: 10
QVQLVQSGAE VKRPGSSVKV SCKASGYTFS SYWMYWVRQA PGQGLEWIGQ IYPGQGDSNY    60
NENFQGRVTI TADKSTSTAY MELSSLRSED TAVYYCTREG YGNRFAYWGQ GTLVTVSS    118

SEQ ID NO: 11             moltype = AA  length = 118
FEATURE                   Location/Qualifiers
source                    1..118
                          mol_type = protein
                          organism = synthetic construct
SEQUENCE: 11
QVQLVQSGAE VKRPGSSVKV SCKASGYTFS SYWMYWVRQA PGQGLEWIGQ IYPGQGDANY    60
NENFQGRVTI TADKSTSTAY MELSSLTSED SAVYFCTREG YGNRFAYWGQ GTLVTVSS    118

SEQ ID NO: 12             moltype = AA  length = 118
FEATURE                   Location/Qualifiers
source                    1..118
                          mol_type = protein
                          organism = synthetic construct
SEQUENCE: 12
QVQLVQSGAE VKRPGSSVKV SCKASGYTFS SYWMYWVRQA PGQGLEWIGQ IYPGQGDANY    60
NENFQGKATM TADKSMSTAY MQLSSLTSED SAVYFCTREG YGNRFAYWGQ GTLVTVSS    118

SEQ ID NO: 13             moltype = AA  length = 106
FEATURE                   Location/Qualifiers
source                    1..106
                          mol_type = protein
                          organism = synthetic construct
SEQUENCE: 13
EIVLTQSPAL LSLSPGERAT LSCSASSSVS YMYWYQQKPG QAPRLLINLT SNLASGVPAR    60
FSGRGSGTDF TLTISSLEPE DFAVYYCQQW SYNPPTFGGG TKVEIK                  106

SEQ ID NO: 14             moltype = AA  length = 106
FEATURE                   Location/Qualifiers
source                    1..106
                          mol_type = protein
                          organism = synthetic construct
SEQUENCE: 14
EIVLTQSPAL MSLSPGERAT LSCSASSSVS YMYWYQQKPR SAPRPWINLT SNLASGVPAR    60
FSGRGSGTDF SLTISSLEAE DFATYYCQQW SYNPPTFGGG TKVEIK                  106

SEQ ID NO: 15             moltype = AA  length = 106
FEATURE                   Location/Qualifiers
source                    1..106
                          mol_type = protein
                          organism = synthetic construct
SEQUENCE: 15
EIVLTQSPAL MSLSPGERAT LSCSASSSVS YMYWYQQKPR SAPRPWIQLT SNLASGVPAR    60
FSGRGSGTDF SLTISSLEAE DFATYYCQQW SYNPPTFGGG TKVEIK                  106
```

```
SEQ ID NO: 16              moltype = AA    length = 106
FEATURE                    Location/Qualifiers
source                     1..106
                           mol_type = protein
                           organism = synthetic construct
SEQUENCE: 16
QIVLTQSPAL MSATPGEKVT MTCSASSSVS YMYWYQQLPR SSPKPWIQLT SNLASGVPAR    60
FSGRGSGTSY SLTISSMEAE DAATYYCQQW SYNPPTFGGG TKLEIK                  106

SEQ ID NO: 17              moltype = AA    length = 106
FEATURE                    Location/Qualifiers
source                     1..106
                           mol_type = protein
                           organism = synthetic construct
SEQUENCE: 17
EIVLTQSPAL LSLSPGERAT LSCSASSSVS YMYWYQQKPG QAPRLLIQLT SNLASGVPAR    60
FSGRGSGTDF TLTISSLEPE DFAVYYCQQW SYNPPTFGGG TKVEIK                  106

SEQ ID NO: 18              moltype = DNA    length = 354
FEATURE                    Location/Qualifiers
source                     1..354
                           mol_type = other DNA
                           organism = synthetic construct
SEQUENCE: 18
caggttcagc tgcagcagtc tggggctgag ctggtgaggc ctgggtcctc agtgaagatt    60
tcctgcaagg cttctggcta tacattcagt agctactggg tgtactgggt gaagcagagg   120
cctggacagg gtcttgagtg gattggacag atttatcctg gagatggtga ttctaactac   180
aatgaaaatt tcaagggtaa agccacactg actgcagaca atcctccag cacagcctac    240
atgcagctca gcagcctgac atctgaggac tctgcggtct atttctgtac aagagagggg   300
tatggtaacc ggtttgctta ctggggccag gggactctgg tcactgtctc tgca         354

SEQ ID NO: 19              moltype = DNA    length = 318
FEATURE                    Location/Qualifiers
source                     1..318
                           mol_type = other DNA
                           organism = synthetic construct
SEQUENCE: 19
caaattgttc tcacccagtc tccagcactc atgtctgcat ctccagggga gaaggtcacc    60
atgacctgca gtgccagctc aagtgtaagt tacatgtatt ggtaccagca gaagccaaga   120
tcctcccca aaccctggat taatctcaca tccaacctgg cttctggagt ccctgctcgc    180
ttcagtggcc gtgggtctgg gacctcttac tctctcacaa tcagcagcat ggaggctgaa   240
gatgctgcca cttattactg ccagcagtgg agttataacc cacccacgtt cggagggggg   300
accaagctgg aaataaaa                                                 318

SEQ ID NO: 20              moltype = AA    length = 8
FEATURE                    Location/Qualifiers
source                     1..8
                           mol_type = protein
                           organism = synthetic construct
SEQUENCE: 20
GFTFTEYH                                                              8

SEQ ID NO: 21              moltype = AA    length = 10
FEATURE                    Location/Qualifiers
source                     1..10
                           mol_type = protein
                           organism = synthetic construct
VARIANT                    6
                           note = X is N or Q
VARIANT                    7
                           note = X is G or A
SEQUENCE: 21
IRNRAXXYTT                                                           10

SEQ ID NO: 22              moltype = AA    length = 12
FEATURE                    Location/Qualifiers
source                     1..12
                           mol_type = protein
                           organism = synthetic construct
SEQUENCE: 22
ARLTMVVAEF DY                                                        12

SEQ ID NO: 23              moltype = AA    length = 6
FEATURE                    Location/Qualifiers
source                     1..6
                           mol_type = protein
                           organism = synthetic construct
SEQUENCE: 23
QDINKY                                                                6
```

```
SEQ ID NO: 24          moltype = AA   length = 8
FEATURE                Location/Qualifiers
source                 1..8
                       mol_type = protein
                       organism = synthetic construct SEQUENCE: 24
LQYDNLLT                                                                  8

SEQ ID NO: 25          moltype = AA   length = 121
FEATURE                Location/Qualifiers
source                 1..121
                       mol_type = protein
                       organism = synthetic construct SEQUENCE: 25
EVKLVESGGG LVQPGGSLRL SCATSGFTFT EYHMSWVRQP PGKALEWLGF IRNRANGYTT        60
EYSASVKGRF TISRDNSQNI LYLQMNTLRT EDSATYYCAR LTMVVAEFDY WGQGTTLTVS       120
S                                                                       121

SEQ ID NO: 26          moltype = AA   length = 106
FEATURE                Location/Qualifiers
source                 1..106
                       mol_type = protein
                       organism = synthetic construct SEQUENCE: 26
DIQMTQSPSS LSASLGGEVT ITCKASQDIN KYIAWYQHKP GKGPRLLIHY TSTLQPGIPS        60
RFSGSGSGRD YSFSVSNLEP EDIATYYCLQ YDNLLTFGAG TKLELK                      106

SEQ ID NO: 27          moltype = AA   length = 121
FEATURE                Location/Qualifiers
source                 1..121
                       mol_type = protein
                       organism = synthetic construct SEQUENCE: 27
EVQLVESGGG LVQPGGSLRL SCAASGFTFT EYHMSWVRQA PGKGLEWVGF IRNRANGYTT        60
EYAASVKGRF TISRDDSKNS LYLQMNSLKT EDTAVYYCAR LTMVVAEFDY WGQGTLVTVS       120
S                                                                       121

SEQ ID NO: 28          moltype = AA   length = 121
FEATURE                Location/Qualifiers
source                 1..121
                       mol_type = protein
                       organism = synthetic construct SEQUENCE: 28
EVQLVESGGG LVQPGGSLRL SCAASGFTFT EYHMSWVRQA PGKGLEWVGF IRNRANAYTT        60
EYAASVKGRF TISRDDSKNS LYLQMNSLKT EDTAVYYCAR LTMVVAEFDY WGQGTLVTVS       120
S                                                                       121

SEQ ID NO: 29          moltype = AA   length = 121
FEATURE                Location/Qualifiers
source                 1..121
                       mol_type = protein
                       organism = synthetic construct SEQUENCE: 29
EVQLVESGGG LVQPGGSLRL SCAASGFTFT EYHMSWVRQA PGKGLEWVGF IRNRAQGYTT        60
EYAASVKGRF TISRDDSKNS LYLQMNSLKT EDTAVYYCAR LTMVVAEFDY WGQGTLVTVS       120
S                                                                       121

SEQ ID NO: 30          moltype = AA   length = 121
FEATURE                Location/Qualifiers
source                 1..121
                       mol_type = protein
                       organism = synthetic construct SEQUENCE: 30
EVQLVESGGG LVQPGGSLRL SCAASGFTFT EYHMSWVRQA PGKGLEWVGF IRNRANGYTT        60
EYAASVKGRF TISRDNSKNS LYLQMNTLRT EDTAVYYCAR LTMVVAEFDY WGQGTLVTVS       120
S                                                                       121

SEQ ID NO: 31          moltype = AA   length = 121
FEATURE                Location/Qualifiers
source                 1..121
                       mol_type = protein
                       organism = synthetic construct SEQUENCE: 31
EVQLVESGGG LVQPGGSLRL SCAASGFTFT EYHMSWVRQA PGKGLEWVGF IRNRANAYTT        60
EYAASVKGRF TISRDNSKNS LYLQMNTLRT EDTAVYYCAR LTMVVAEFDY WGQGTLVTVS       120
S                                                                       121

SEQ ID NO: 32          moltype = AA   length = 121
```

```
FEATURE                 Location/Qualifiers
source                  1..121
                        mol_type = protein
                        organism = synthetic construct
SEQUENCE: 32
EVQLVESGGG LVQPGGSLRL SCAASGFTFT EYHMSWVRQA PGKGLEWVGF IRNRAQGYTT     60
EYAASVKGRF TISRDNSKNS LYLQMNTLRT EDTAVYYCAR LTMVVAEFDY WGQGTLVTVS    120
S                                                                    121

SEQ ID NO: 33           moltype = AA   length = 106
FEATURE                 Location/Qualifiers
source                  1..106
                        mol_type = protein
                        organism = synthetic construct
SEQUENCE: 33
DIQMTQSPSS LSASVGDRVT ITCQASQDIN KYLNWYQHKP GKGPKLLIYY TSTLQTGVPS     60
RFSGSGSGTD FTFTVSNLQP EDIATYYCLQ YDNLLTFGQG TKLEIK                   106

SEQ ID NO: 34           moltype = AA   length = 106
FEATURE                 Location/Qualifiers
source                  1..106
                        mol_type = protein
                        organism = synthetic construct
SEQUENCE: 34
AIQMTQSPSS LSASVGERVT ITCRASQDIN KYLNWYQHKP GKGPKLLIYY TSTLQTGVPS     60
RFSGSGSGTD FTFTVSNLQP EDIATYYCLQ YDNLLTFGQG TKLEIK                   106

SEQ ID NO: 35           moltype = AA   length = 330
FEATURE                 Location/Qualifiers
source                  1..330
                        mol_type = protein
                        organism = synthetic construct
SEQUENCE: 35
ASTKGPSVFP LAPSSKSTSG GTAALGCLVK DYFPEPVTVS WNSGALTSGV HTFPAVLQSS     60
GLYSLSSVVT VPSSSLGTQT YICNVNHKPS NTKVDKKVEP KSCDKTHTCP PCPAPELLGG    120
PSVFLFPPKP KDTLMISRTP EVTCVVVDVS HEDPEVKFNW YVDGVEVHNA KTKPREEQYN    180
STYRVVSVLT VLHQDWLNGK EYKCKVSNKA LPAPIEKTIS KAKGQPREPQ VYTLPPSRDE    240
LTKNQVSLTC LVKGFYPSDI AVEWESNGQP ENNYKTTPPV LDSDGSFFLY SKLTVDKSRW    300
QQGNVFSCSV MHEALHNHYT QKSLSLSPGK                                     330

SEQ ID NO: 36           moltype = AA   length = 107
FEATURE                 Location/Qualifiers
source                  1..107
                        mol_type = protein
                        organism = synthetic construct
SEQUENCE: 36
RTVAAPSVFI FPPSDEQLKS GTASVVCLLN NFYPREAKVQ WKVDNALQSG NSQESVTEQD     60
SKDSTYSLSS TLTLSKADYE KHKVYACEVT HQGLSSPVTK SFNRGEC                  107

SEQ ID NO: 37           moltype = DNA   length = 363
FEATURE                 Location/Qualifiers
source                  1..363
                        mol_type = other DNA
                        organism = synthetic construct
SEQUENCE: 37
gaggtgaagc tggtggagtc tggaggaggc ttggtacagc ctgggggttc tctgagactc     60
tcctgtgcaa cttctgggtt caccttcact gaataccaca tgagctgggt ccgccagcct    120
ccaggaaagg cacttgagtg gttgggtttt attagaaaca gtgctaatgg ttacacaaca    180
gagtacagtg catctgtgaa gggtcggttc accatctcca gagataattc caaaacatc    240
ctctatcttc aaatgaacac cctgagaact gaggacagtg ccacttatta ctgtgcaagg    300
cttactatgg tagtagcgga gtttgactac tggggccaag gcaccactct cacagtctcc    360
tca                                                                  363

SEQ ID NO: 38           moltype = DNA   length = 318
FEATURE                 Location/Qualifiers
source                  1..318
                        mol_type = other DNA
                        organism = synthetic construct
SEQUENCE: 38
gacatccaga tgacacagtc tccatcctca ctgtctgcat ctctgggagg cgaagtcacc     60
atcacttgca aggcaagcca agacattaac aagtatatag cttggtacca acacaagcct    120
ggaaaaggtc ctaggctgct catacattac acatctacat tacagccagg catcccatca    180
aggttcagtg gaagtgggtc tgggagagat tattccttca gcgtcagcaa cctgcagcct    240
gaagatattg caacttatta ttgtctacag tatgataatc ttctcacgtt cggtgctggg    300
accaagctgg agctgaaa                                                  318
```

CD142 ANTIBODIES, ANTIBODY-DRUG CONJUGATES, PREPARATIONS AND USES THEREOF

CROSS-REFERENCE TO RELATED APPLICATIONS

This application is a continuation of International Patent Application No. PCT/CN2023/125261, filed Oct. 18, 2023, which claims priority to Chinese Patent Application No. PCT/CN2022/126276, filed Oct. 19, 2022, the entire contents of which are incorporated herein by reference.

SEQUENCE LISTING

The instant application contains a Sequence Listing which is being submitted herewith electronically in XML format and is hereby incorporated by reference in its entirety. Said XML copy, created on Mar. 5, 2025, is named 105728_000122_Sequence_listing.xml and is 39 KB in size.

TECHNICAL FIELD

The present disclosure relates to the antibodies specific targeting CD142, antibody-drug conjugates, preparations and uses thereof.

BACKGROUND

The statements in this section merely provide background information related to the present disclosure and do not necessarily constitute prior art.

Antibody-drug conjugate (ADC) is a vectorized chemotherapy, and selectively deliver the cytotoxic drugs in the tumor/cancer cell (Antibody-Drug Conjugates: The Last Decade, Nicolas Joubert, et al., Pharmaceuticals (Basel). 2020 Sep. 14; 13(9):245.). The marketed ADC drugs Enhertu and Sacituzumab govitecan have superior effects in the treatment of tumors, especially malignant tumors. Both of Enhertu and Sacituzumab govitecan use DNA topoisomerase inhibitors (camptothecin derivatives) that are more hydrophobic than tubulin inhibitors (such as MMAE, MMAF) as the cytotoxic drugs. Sacituzumab govitecan uses MCC-triazole spacer-PEG7-lysine-PABC as a linker to decompose and release camptothecin SN38 in cell lysosomes (U.S. Ser. No. 13/948,732). Enhertu developed by AstraZeneca/Daiichi sankyo uses cathepsin B-activated GGFG (an amino acid sequence composed of glycine-glycine-phenylalanine-glycine linked by peptide bonds) tetrapeptide as a linker and introduces self-cleavage structure to release Exatecan derivative Dxd (Yusuke Ogitani et al., Clin Cancer Res (2016) 22 (20): 5097-5108). However, the above cytotoxic drugs MMAE, SN38, and Dxd are all substrates of P-glycoprotein (P-gp) (Front Pharmacol 2019; 10:749), and may have drug resistance to some tumors with high expression of P-gp.

Tissue Factor (TF), also known as CD142, is a transmembrane glycoprotein. In complex with its ligand FVIIa, CD142 can activate protease-activated receptor 2, thereby activating intracellular signaling pathways that tumors can exploit to promote malignant cell survival, tumor growth, angiogenesis, and metastasis. In contrast to restricted surface expression in normal tissue cells, CD142 exhibits membranous CD142 expression on a variety of solid tumor cells, including pancreatic, lung, cervical, prostate, bladder, ovarian, breast, and colon cancers. It has been reported that CD142 is significantly expressed on tumor cells and tumor vasculature and is associated with poor disease prognosis and increased metastatic properties. The above properties suggest that CD142 is a potential ADC target. The ADCs targeting CD142 mainly include tisotumab vedotin, ICON-2 (XB002) and MRG004A so far.

Tisotumab vedotin adopts the linker MC-VC-PABA and payload MMAE (PCT/EP2014/075326, PCT/EP2009/066755), and it was approved for marketing in the United States in September 2021. The indication of Tisotumab vedotin is cervical cancer. According to FDA (U.S. Food and Drug Administration) recommendations, Tisotumab vedotin is injected every three weeks at a recommended dose of 2 mg/kg. The drug has serious adverse reactions such as skin toxicity, eye toxicity and bleeding, and the treatment window only reaches 3 mg/kg (BLA Multi-disciplinary Review and Evaluation {Biologics License Application (BLA) 761208}{tisotumab vedotin}).

ICON-2 is in phase I clinical trial in the United States, and the indications under development are adenocarcinoma, bladder cancer, fallopian tube cancer, and head and neck tumors. Its related patent is PCT/US2019/012427. The linker-payload of the drug uses ZymeLink Auristatin (ZLA), a proprietary technology from Zymeworks. Same as Tisotumab Vedotin, severe or significant dermal toxicity was observed in non-human primate (NHP) toxicity studies of ICON-2 (Thi-Sau Migone, et al. ICON-2, a Tissue Factor-Targeted Antibody-Drug Conjugate for the Treatment of Solid Tumors. Presented at World ADC Digital, Sep. 15-18, 2020).

Dose escalation and dose expansion in phase I/II clinical trials of MRG004A (related patent PCT/CN2017/087779) are currently underway in China and the United States to evaluate the safety, tolerability, pharmacokinetic characteristics and preliminary efficacy. Preclinical studies have shown that MRG004A also inhibits coagulation (Oncotarget, 2017, Vol. 8, (No. 35), pp: 59086-59102).

Therefore, there is still a need to develop new CD142-targeting antibodies and antibody-drug conjugates.

SUMMARY

The present disclosure provides is a novel isolated antibody or antigen-binding fragment thereof binding to CD142, antibody-drug conjugate including the antibody or antigen-binding fragment thereof, a preparation method and use thereof, aiming to reduce or decrease the serious adverse reactions and improve the antitumor activity.

In one aspect, the present disclosure provides an isolated antibody or antigen-binding fragment thereof binding to CD142, including at least a heavy chain variable region (VH) and at least a light chain variable region (VL), the VH includes HCDRs 1, 2 and 3, and the VL includes LCDRs 1, 2 and 3; wherein the HCDR1 includes the amino acid sequence set forth in SEQ ID NO: 1, the HCDR2 includes the amino acid sequence shown as IYPGX$_1$GDX$_2$ (SEQ ID NO: 2), the HCDR3 includes the amino acid sequence set forth in SEQ ID NO: 3; and the LCDR1 includes the amino acid sequence set forth in SEQ ID NO: 4, the LCDR2 includes the amino acid sequence shown as LTS, the LCDR3 includes the amino acid sequence set forth in SEQ ID NO: 5; X$_1$ is D or Q, X$_2$ is S or A.

In some embodiments, the X$_1$ is D, and X$_2$ is S. In some embodiments, the X$_1$ is Q, and X$_2$ is S. In some embodiments, the X$_1$ is Q, and X$_2$ is A.

The present disclosure provides an isolated antibody or antigen-binding fragment thereof binding to CD142, including at least a heavy chain variable region (VH) and at least a light chain variable region (VL), the VH includes HCDRs 1, 2 and 3, and the VL includes LCDRs 1, 2 and 3; wherein the HCDR1 includes the amino acid sequence set forth in SEQ ID NO: 20, the HCDR2 includes amino acid sequence shown as IRNRA$X_3X_4$YTT (SEQ ID NO: 21), the HCDR3 includes the amino acid sequence set forth in SEQ ID NO: 22; and the LCDR1 includes the amino acid sequence set forth in SEQ ID NO: 23, the LCDR2 includes the amino acid sequence shown as YTS, the LCDR3 includes the amino acid sequence set forth in SEQ ID NO: 24; $X_3$ is N or Q, $X_4$ is G or A.

In some embodiments, $X_3$ is N, $X_4$ is G. In some embodiments, $X_3$ is N, $X_4$ is A. In some embodiments, $X_3$ is Q, $X_4$ is G.

In one aspect, the disclosure provides a nucleic acid encoding the antibody or antigen-binding fragment thereof binding to CD142 described above.

In one aspect, the disclosure provides a vector, wherein the vector includes the nucleic acid encoding the antibody or antigen-binding fragment thereof binding to CD142.

In one aspect, the disclosure provides a host cell, wherein the cell includes the nucleic acid, or the vector described above.

In one aspect, the disclosure provides an antibody-drug conjugate of formula I,

Ab-(L-D)n    (I)

or an isomer, an isotopic variant, a pharmaceutically acceptable salt, prodrug, solvate thereof, or combinations thereof; wherein Ab is an isolated antibody or antigen-binding fragment thereof binding to CD142;

L is a linker that covalently links to Ab and D, respectively;

D is a payload;

n is an integer of 1 to 10.

In one aspect, the disclosure provides a method of preparing the antibody-drug conjugate of formula I, or an isomer, an isotopic variant, a pharmaceutically acceptable salt, prodrug, solvate thereof, or combinations thereof, including the following steps: reducing the isolated antibody or antigen-binding fragment thereof binding to CD142 such that disulfide bonds thereof are at least partially reduced, and reacting with a reactive group of the linker in linker-payload, obtaining antibody-drug conjugate of formula I.

In some embodiments, the method includes the following steps: reducing the antibody such that disulfide bonds thereof are at least partially reduced and reacts with a carbon atom at position 3 of maleimide-N-yl of the linker of formula IV in linker-payload,

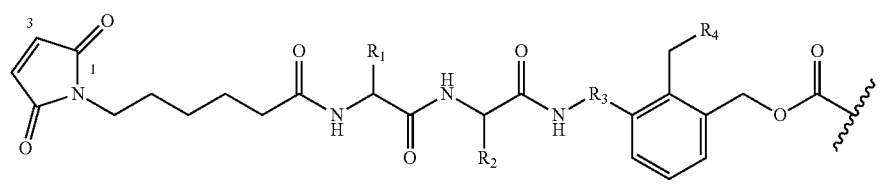

(IV)

Wherein in the linker-payload, a carbonyl group in an ester group of the linker of formula IV is connected to an amino group of the payload;

in formula IV, $R_1$ and $R_2$ are independently selected from hydrogen, methyl and isopropyl group;

$R_3$ represents —$(CR_5HCONH)n^1$-$(CH_2CONH)n^2$- or a single bond, $R_5$ is hydrogen or benzyl, $n^1$ represents an integer of 0 to 2, $n^2$ represents an integer of 0 to 2; and $R_4$ represents a methylamino group or —$(NCH_3COCH_2)$ $n^3$-$NCH_3COCH_3$, and $n^3$ represents an integer of 1 to 20.

In one aspect, the disclosure provides a pharmaceutical composition including the isolated antibody or antigen-binding fragment thereof binding to CD142, or antibody-drug conjugate of formula I, or an isomer, an isotopic variant, a pharmaceutically acceptable salt, prodrug, solvate thereof, or combinations thereof, and a pharmaceutically acceptable excipient.

In one aspect, the disclosure provides a kit including the isolated antibody or antigen-binding fragment thereof binding to CD142, or antibody-drug conjugate described above.

In one aspect, the disclosure provides use of the isolated antibody or antigen-binding fragment thereof binding to CD142, antibody-drug conjugate of formula I, the antibody-drug conjugate of formula I prepared by the method herein, the pharmaceutical composition, the kit described above in the manufacture of a therapeutic agent for diagnosis, prevention and treatment of tumor diseases.

In some embodiments, the tumor includes a solid tumor expressing CD142.

In one aspect, the disclosure provides a method of reducing number of CD142-expressing cells, including administering to a subject a therapeutic dose of a therapeutic agent, wherein the therapeutic agent includes the isolated antibody or antigen-binding fragment thereof binding to CD142, antibody-drug conjugate of formula I, the antibody-drug conjugate of formula I prepared by the method herein, the pharmaceutical composition, the kit described above.

The isolated antibody or antigen-binding fragment thereof binding to CD142 and the antibody-drug conjugate of formula I provided herein have improved or excellent in vivo efficacy and safety, and HNSTD (not seen in severe toxicity maximum dose) can reach 30 mg/kg. In addition, the isolated antibody or antigen-binding fragment thereof binding to CD142 and the antibody-drug conjugate of formula I provided herein have a week effect on blood coagulation function, thus the potential bleeding-related adverse reactions can be avoided.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1A:
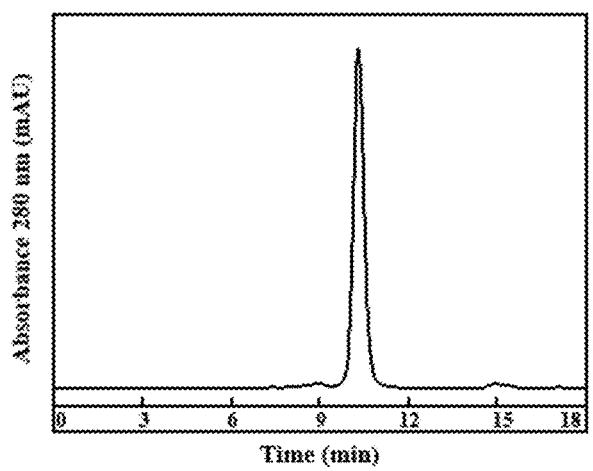
FIG. 1A and 1B show the detection graphs of size exclusion chromatography and hydrophobic interaction chromatography of Hu01-L3H1 naked antibody prepared by Example 4, respectively; Hu01-L3H1 naked antibody is used as quality control substance.

The present disclosure is explained in greater detail below. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which do not depart from the instant invention. Hence, the following description is intended to illustrate some particular embodiments of the invention, and not to exhaustively specify all permutations, combinations and variations thereof.

Unless defined otherwise, all technical and scientific terms used herein have the same meaning as commonly understood by one of ordinary skill in the art to which the disclosure pertains. Although any methods and materials similar or equivalent to those described herein may be used in the practice for testing of the present disclosure, the preferred materials and methods are described herein. In describing and claiming the present disclosure, the following terminology will be used.

Unless defined otherwise, all numbers used in this specification and claims to indicate content, concentration, ratio, mass, volume, time, temperature, thickness, technical effect, etc., shall in any case be understood as represented by the term "about" or "approximately" modification. Accordingly, unless indicated to the contrary, the numerical parameters set forth in the following specification and attached claims are approximations. It may vary depending upon the desired properties and effects sought to be obtained by the present disclosure, and each numerical parameter should be interpreted in accordance with the number of significant digits and conventional rounding methods, or as understood by those skilled in the art, to those skilled in the art.

Although the numerical ranges and parameters setting forth the broad scope of the disclosure are approximations, the numerical values set forth in the specific examples are provided as precisely as possible. Any numerical value, however, inherently contain certain errors necessarily resulting from the standard deviation found in their respective testing measurements. Every numerical range given throughout this specification will include every narrower numerical range that falls within such broader numerical range, as if such narrower numerical ranges were all expressly written herein.

[Antibody]

The present disclosure provides examples of isolated antibody or antigen-binding fragment thereof binding to CD142, which is also known as Tissue Factor (TF). CD142 exhibits membranous CD142 expression on a variety of solid tumor cells compared to restricted surface expression in normal tissue cells and is associated with poor tumor prognosis and increased metastatic properties. therefore, CD142 can be used as a target and/or biomarker for the treatment and diagnosis of target tumors.

The term "antibody" (used interchangeably in the plural) is an immunoglobulin molecule capable of specifically binding to a target, such as carbohydrate, polynucleotides, lipids, polypeptides, etc., through at least one antigen recognition site located in the variable region of the immunoglobulin molecule. A typical antibody molecule includes a heavy chain variable region (VH) and a light chain variable region (VL). The variable region is a region with large changes in amino acid composition and arrangement at the N-terminal of the antibody molecule. The site of specific binding, that is, the antigen-binding site, is used to determine the specificity of antibody recognition. The VH and VL regions can be further subdivided into hypervariable regions, also known as "complementarity determining regions" (CDRs), interspersed with more conserved regions known as "framework regions" (FR). Each VH and VL is generally composed of three CDRs and four FRs arranged in the following order from amino to carboxy terminus: FR1, CDR1, FR2, CDR2, FR3, CDR3, FR4. The extent of framework regions and CDRs can be precisely identified using methods known in the art, e.g., by Kabat definitions, Chothia definitions, AbM definitions and/or contact definitions, all of which are well known in the art. See, e.g., Kabat, E. A. et al. (1991) Sequences of Proteins of Immunological Interest, Fifth Edition, U.S. Department of Health and Human Services, NIH Publication No. 91-3242; Chothia et al., (1989) Nature 342:877; Chothia, C. et al. (1987) J. Mol. Biol. 196:901-917; Al-lazikani et al. (1997) J. Molec. Biol. 273: 927-948; and Almagro, J. Mol. Recognit. 17:132-143 (2004). See also hgmp.mrc.ac.uk and bioinf.org.uk/abs. The antibody could be intact (i.e., full-length) polyclonal or monoclonal antibodies. Antibodies include antibodies of any class, such as IgD, IgE, IgG, IgA, or IgM (or subclasses thereof), and the antibody need not be of any particular class. Depending on the antibody amino acid sequence of their heavy chain constant domains, immunoglobulins can be divided into different classes. There are five main classes of immunoglobulins: IgA, IgD, IgE, IgG, and IgM, and several of these can be further divided into subclasses (isotypes), such as IgG1, IgG2, IgG3, IgG4, IgA1, and IgA2. The heavy chain constant domains that correspond to the different classes of immunoglobulins are called u, 6, E, y and p, respectively. The subunit structures and three-dimensional configurations of different classes of immunoglobulins are well-known.

As used herein, the term "antigen-binding fragment" refers to one or more fragments of an antibody that retain the ability to specifically bind to an antigen. Examples of antigen-binding fragment include but are not limited to Fab, Fab', F(ab')2, Fv, single-chain (scFv), mutants thereof, fusion proteins comprising antibody moieties, humanized antibodies, chimeric antibodies, diabodies, nanobodies, linear antibodies, single chain antibodies, multispecific antibodies (e.g., bispecific antibodies), and any other modified constructs of immunoglobulin molecules comprising antigen recognition sites with the desired specificity, including glycosylation variants of antibodies, amino acid sequence variants of antibodies, and covalently modified antibodies.

The disclosure provides an isolated antibody or antigen-binding fragment thereof binding to CD142, including at least a heavy chain variable region (VH) and at least a light chain variable region (VL), the VH includes heavy chain CDRs (HCDRs) 1, 2 and 3, and the VL includes light chain CDRs (LCDRs) 1, 2 and 3; wherein the HCDR1 includes the amino acid sequence set forth in SEQ ID NO: 1, the HCDR2 includes the amino acid sequence shown as IYPGX$_1$GDX$_2$ (SEQ ID NO: 2), the HCDR3 includes the amino acid sequence set forth in SEQ ID NO: 3; and the LCDR1 includes the amino acid sequence set forth in SEQ ID NO: 4, the LCDR2 includes the amino acid sequence shown as LTS (leucine-threonine-serine), the LCDR3 includes the amino acid sequence set forth in SEQ ID NO: 5; X$_1$ is D or Q, X$_2$ is S or A. The CDRs are defined/numbered by IMGT system.

In some embodiments, the X$_1$ is D, and X$_2$ is S. In some embodiments, the X$_1$ is Q, and X$_2$ is S. In some embodiments, the X$_1$ is Q, and X$_2$ is A. Herein, amino acids are shown in single-letter codes which is well-known to the skilled in the art, such as, "D", "Q", "S" and "A" represent aspartic acid, glutamine, serine, and alanine, respectively.

Antibodies having the same light/heavy chain CDR1, CDR2, and CDR3 regions as those exemplary antibodies targeting CD142 are within the scope of this disclosure.

The antibody or the framework region of the antibody has a mutation that does not affect the binding of the variable region of the antibody to the antigen, the mutation can increase the binding affinity of the antibody to the antigen or remain substantially unchanged. In some embodiments, the isolated antibody or antigen-binding fragment thereof binding to CD142 further includes conservatively modified variants, the said conservatively modified variants include individual substitutions, deletions or additions to a polypeptide sequence which result in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles. The following eight groups contain amino acids that are conservative substitutions for one another: 1) Alanine (A), Glycine (G); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); 6) Phenylalanine (F), Tyrosine (Y), Tryptophan (W); 7) Serine (S), Threonine (T); and 8) Cysteine (C), Methionine (M) (see, e.g., Creighton, Proteins (1984)). In some embodiments, the term "conservative sequence modifications" are used to refer to amino acid modifications that do not significantly affect or alter the binding characteristics of the antibody containing the amino acid sequence.

In some embodiments of the isolated antibody or antigen-binding fragment thereof binding to CD142, the VH includes the amino acid sequence set forth in SEQ ID NO: 8, 9, 10, 11 or 12, and the VL includes the amino acid sequence set forth in SEQ ID NO: 13, 14, 15, 16 or 17.

In some embodiments, the variable region of the isolated antibody or antigen-binding fragment thereof binding to CD142 are selected from the following (a-1) to (e-1): (a-1) the VH having at least 70%, 86%, 87%, 89%, 90%, 95%, 96%, 97%, 98%, or 99% identity to the amino acid sequence set forth in SEQ ID NO: 6, and the VL having at least 70%, 79%, 80%, 87%, 88%, 90%, 95%, 96%, 97%, 98%, or 99% identical to the amino acid sequence set forth in SEQ ID NO: 7; (b-1) the VH having at least 90%, 95%, 96%, 97%, 98%, or 99% identity to the amino acid sequence set forth in SEQ ID NO: 8, and the VL having at least 90%, 95%, 96%, 97%, 98%, or 99% identical to the amino acid sequence set forth in SEQ ID NO: 15; (c-1) the VH having at least 90%, 95%, 96%, 97%, 98%, or 99% identity to the amino acid sequence set forth in SEQ ID NO: 8, and the VL having at least 90%, 95%, 96%, 97%, 98%, or 99% identical to the amino acid sequence set forth in SEQ ID NO: 17; (d-1) the VH having at least 90%, 95%, 96%, 97%, 98%, or 99% identity to the amino acid sequence set forth in SEQ ID NO: 9, and the VL having at least 90%, 95%, 96%, 97%, 98%, or 99% identical to the amino acid sequence set forth in SEQ ID NO: 15; and (e-1) the VH having at least 90%, 95%, 96%, 97%, 98%, or 99% identity to the amino acid sequence set forth in SEQ ID NO: 9, and the VL having at least 90%, 95%, 96%, 97%, 98%, or 99% identical to the amino acid sequence set forth in SEQ ID NO: 17.

In the present disclosure, the term "identity" in the context of two or more nucleic acids or polypeptide sequences, refers to the extent to which two or more sequences or subsequences that are the same. Two sequences are "identical" if they have the same sequence of amino acids or nucleotides over the region being compared. Two sequences are "substantially identical" if two sequences have a specified percentage of amino acid residues or nucleotides that are the same (i.e., 60% identity, optionally 65%, 70%, 75%, 80%, 85%, 90%, 95%, or 99% identity over a specified region, or, when not specified, over the entire sequence), when compared and aligned for maximum correspondence over a comparison window, or designated region as measured using one of the following sequence comparison algorithms or by manual alignment and visual inspection. Optionally, the identity exists over a region that is at least about 30 nucleotides (or 10 amino acids) in length, or more preferably over a region that is 100 to 500 or 1000 or more nucleotides (or 20, 50, 200 or more amino acids) in length. Two examples of algorithms that are suitable for determining percent sequence identity and sequence similarity are the BLAST and BLAST 2.0 algorithms, which are described in Altschul et al, Nuc. Acids Res. 25:3389-3402, 1997; and Altschul et al., J. Mol. Biol. 215:403-410, 1990, respectively.

Other than percentage of sequence identity noted above, another indication that two polypeptides are substantially identical is that the polypeptide encoded by the first nucleic acid is immunologically cross reactive with the antibodies raised against the polypeptide encoded by the second nucleic acid, as described below. Thus, a polypeptide is typically substantially identical to a second polypeptide, for example, where the two peptides differ only by conservative substitutions. Another indication that two nucleic acid sequences are substantially identical is that the two molecules or their complements hybridize to each other under stringent conditions. Yet another indication that two nucleic acid sequences are substantially identical is that the same primers can be used to amplify the sequence.

In some embodiments, the VH of the isolated antibody or antigen-binding fragment thereof binding to CD142 includes the amino acid sequence set forth in SEQ ID NO: 6, and the VL includes the amino acid sequence set forth in SEQ ID NO: 7. In some embodiments, the VH includes the amino acid sequence set forth in SEQ ID NO: 8, and the VL includes the amino acid sequence set forth in SEQ ID NO: 15. In some embodiments, the VH includes the amino acid sequence set forth in SEQ ID NO: 8, and the VL includes the amino acid sequence set forth in SEQ ID NO: 17. In some embodiments, the VH includes the amino acid sequence set forth in SEQ ID NO: 9, and the VL includes the amino acid sequence set forth in SEQ ID NO: 15. In some embodiments, the VH includes the amino acid sequence set forth in SEQ ID NO: 9, and the VL includes the amino acid sequence set forth in SEQ ID NO: 17.

In some other embodiments, the isolated antibody or antigen-binding fragment thereof binding to CD142, including at least a heavy chain variable region (VH) and at least a light chain variable region (VL), the VH includes HCDRs 1, 2 and 3, and the VL includes LCDRs 1, 2 and 3; wherein the HCDR1 includes the amino acid sequence set forth in SEQ ID NO: 20, the HCDR2 includes amino acid sequence shown as IRNRAX$_3$X$_4$YTT (SEQ ID NO: 21), the HCDR3 includes the amino acid sequence set forth in SEQ ID NO: 22; and the LCDR1 includes the amino acid sequence set forth in SEQ ID NO: 23, the LCDR2 includes the amino acid sequence shown as YTS (tyrosine-threonine-serine), the LCDR3 includes the amino acid sequence set forth in SEQ ID NO: 24; X$_3$ is N or Q, X$_4$ is G or A. The CDRs are defined by IMGT system.

In some embodiments, X$_3$ is N, X$_4$ is G. In some embodiments, X$_3$ is N, X$_4$ is A. In some embodiments, X$_3$ is Q, X$_4$ is G.

In some embodiments, the VH of the isolated antibody or antigen-binding fragment thereof binding to CD142 includes the amino acid sequence set forth in SEQ ID NO: 27, 28, 29, 30, 31 or 32, and the VL includes the amino acid sequence set forth in SEQ ID NO: 33 or 34.

In some embodiments, the isolated antibody or antigen-binding fragment thereof binding to CD142 includes a VH and a VL selected from the following (a-2) to (l-2): (a-2) VH having at least 70%, 85%, 87%, 89%, 90%, 95%, 96%, 97%, 98%, or 99% identity to the amino acid sequence set forth in SEQ ID NO: 25, and the VL having at least 70%, 80%, 84%, 85%, 90%, 95%, 96%, 97%, 98%, or 99% identity to the amino acid sequence set forth in SEQ ID NO: 26; (b-2) VH having at least 95%, 96%, 97%, 98%, or 99% identity to the amino acid sequence set forth in SEQ ID NO: 27, and the VL having at least 95%, 96%, 97%, 98%, or 99% identity to the amino acid sequence set forth in SEQ ID NO: 33; (c-2) VH having at least 95%, 96%, 97%, 98%, or 99% identity to the amino acid sequence set forth in SEQ ID NO: 28, and VL having at least 95%, 96%, 97%, 98%, or 99% identity to the amino acid sequence set forth in SEQ ID NO: 33; (d-2) VH having at least 95%, 96%, 97%, 98%, or 99% identity to the amino acid sequence set forth in SEQ ID NO: 29, and VL having at least 95%, 96%, 97%, 98%, or 99% identity to the amino acid sequence set forth in SEQ ID NO: 33; (e-2) VH having at least 95%, 96%, 97%, 98%, or 99% identity to the amino acid sequence set forth in SEQ ID NO: 30, and VL having at least 95%, 96%, 97%, 98%, or 99% identity to the amino acid sequence set forth in SEQ ID NO: 33; (f-2) VH having at least 95%, 96%, 97%, 98%, or 99% identity to the amino acid sequence set forth in SEQ ID NO: 31, and VL having at least 95%, 96%, 97%, 98%, or 99% identity to the amino acid sequence set forth in SEQ ID NO: 33; (g-2) VH having at least 95%, 96%, 97%, 98%, or 99% identity to the amino acid sequence set forth in SEQ ID NO: 32, and VL having at least 95%, 96%, 97%, 98%, or 99% identity to the amino acid sequence set forth in SEQ ID NO: 33; (h-2) VH having at least 95%, 96%, 97%, 98%, or 99% identity to the amino acid sequence set forth in SEQ ID NO: 27, and VL having at least 95%, 96%, 97%, 98%, or 99% identity to the amino acid sequence set forth in SEQ ID NO: 34; (i-2) VH having at least 95%, 96%, 97%, 98%, or 99% identity to the amino acid sequence set forth in SEQ ID NO: 28, and VL having at least 95%, 96%, 97%, 98%, or 99% identity to the amino acid sequence set forth in SEQ ID NO: 34; (j-2) VH having at least 95%, 96%, 97%, 98%, or 99% identity to the amino acid sequence set forth in SEQ ID NO: 29, and VL having at least 95%, 96%, 97%, 98%, or 99% identity to the amino acid sequence set forth in SEQ ID NO:

34; (k-2) VH having at least 95%, 96%, 97%, 98%, or 99% identity to the amino acid sequence set forth in SEQ ID NO: 31, and VL having at least 95%, 96%, 97%, 98%, or 99% identity to the amino acid sequence set forth in SEQ ID NO: 34; and (l-2) VH having at least 95%, 96%, 97%, 98%, or 99% identity to the amino acid sequence set forth in SEQ ID NO: 32, and VL having at least 95%, 96%, 97%, 98%, or 99% identity to the amino acid sequence set forth in SEQ ID NO: 34.

In some embodiments, the VH of the isolated antibody or antigen-binding fragment thereof binding to CD142 includes the amino acid sequence set forth in SEQ ID NO: 25, and the VL includes the amino acid sequence set forth in SEQ ID NO: 26. In some embodiments, the VH includes the amino acid sequence set forth in SEQ ID NO: 27, and the VL includes the amino acid sequence set forth in SEQ ID NO: 33. In some embodiments, the VH includes the amino acid sequence set forth in SEQ ID NO: 28, and the VL includes the amino acid sequence set forth in SEQ ID NO: 33. In some embodiments, the VH includes the amino acid sequence set forth in SEQ ID NO: 29, and the VL includes the amino acid sequence set forth in SEQ ID NO: 33. In some embodiments, the VH includes the amino acid sequence set forth in SEQ ID NO: 30, and the VL includes the amino acid sequence set forth in SEQ ID NO: 33. In some embodiments, the VH includes the amino acid sequence set forth in SEQ ID NO: 31, and the VL includes the amino acid sequence set forth in SEQ ID NO: 33. In some embodiments, the VH includes the amino acid sequence set forth in SEQ ID NO: 32, and the VL includes the amino acid sequence set forth in SEQ ID NO: 33. In some embodiments, the VH includes the amino acid sequence set forth in SEQ ID NO: 27, and the VL includes the amino acid sequence set forth in SEQ ID NO: 34. In some embodiments, the VH includes the amino acid sequence set forth in SEQ ID NO: 28, and the VL includes the amino acid sequence set forth in SEQ ID NO: 34. In some embodiments, the VH includes the amino acid sequence set forth in SEQ ID NO: 29, and the VL includes the amino acid sequence set forth in SEQ ID NO: 34. In some embodiments, the VH includes the amino acid sequence set forth in SEQ ID NO: 31, and the VL includes the amino acid sequence set forth in SEQ ID NO: 34. In some embodiments, the VH includes the amino acid sequence set forth in SEQ ID NO: 32, and the VL includes the amino acid sequence set forth in SEQ ID NO: 34.

The isolated antibodies or antigen-binding fragment thereof binding to CD142 provided by the present disclosure can bind to mammalian (e.g., human or murine) CD142 protein. In some embodiments, the isolated antibody or antigen-binding fragment thereof specifically binds to human CD142. In some embodiments, the isolated antibody or antigen-binding fragment thereof specifically binds to murine CD142.

The isolated antibody or antigen-binding fragment thereof binding to CD142 provided herein includes a constant region of the heavy and light chains, the constant chain is derived from immunoglobulins IgM, IgG, IgA, IgD, IgE class, or subclass thereof. In some embodiments, the isolated antibody or antigen-binding fragment thereof binding to CD142 is an IgG class, optionally, IgG1, IgG2, IgG3, or IgG4 subclass. In some embodiments, the isolated antibody or antigen-binding fragment thereof binding to CD142 is human IgG1 subclass.

In some embodiments, the heavy chain of any isolated antibody or antigen-binding fragment thereof binding to CD142 as described herein may further comprise a heavy chain constant region (CH) or a portion thereof, and the light chain may further comprise a light chain constant region (CL) or a portion thereof. The constant region can be of any suitable origin, e.g., human, mouse, rat or rabbit. Antibody heavy and light chain constant regions are well known in the art, e.g., those provided in the IMGT database (imgt.org) or at vbase2.org, both of which are incorporated herein by reference.

In some embodiments, the heavy chain constant region includes the amino acid sequence set forth in SEQ ID NO: 35, and the light chain constant region includes the amino acid sequence set forth in SEQ ID NO: 36.

When desired, the isolated antibody or antigen-binding fragment thereof binding to CD142 as described herein may comprise modified constant regions. For example, it may comprise a modified constant region that is immunologically inert, e.g., does not trigger complement-mediated lysis, or does not stimulate antibody-dependent cell-mediated cytotoxicity (ADCC). ADCC activity can be assessed using the methods disclosed in U.S. Pat. No. 5,500,362. In other embodiments, the constant region is modified as described in Eur. J. Immunol. (1999) 29:2613-2624; PCT Application No. PCT/GB99/01441; and/or British patent application No. 9809951.8.

The isolated antibody or antigen-binding fragment thereof binding to CD142 described herein could be human, humanized or chimeric antibody.

In some embodiments, the isolated antibody or antigen-binding fragment thereof binding to CD142 described herein is a human antibody.

The term "human antibody" is one which possesses an amino acid sequence corresponding to that of an antibody produced by a human or a human cell, or derived from a non-human source that utilizes a human antibody repertoire or human antibody-encoding sequences (e.g., obtained from human sources or designed de novo). Human antibodies specifically exclude humanized antibodies.

In some embodiments, the isolated antibody or antigen-binding fragment thereof binding to CD142 described herein is a humanized antibody.

The term "humanized antibody" refers to forms of non-human (e.g., murine) antibodies that are specific chimeric immunoglobulins, immunoglobulin chains, or antigen-binding fragment thereof containing minimal sequence derived from non-human immunoglobulins. In most cases, humanized antibodies are human immunoglobulins (recipient antibodies) in which residues from the recipient's complementarity determining regions (CDRs) are derived from non-human species with the desired specificity, affinity, and capacity Residue substitutions such as mouse, rat or rabbit CDRs (donor antibodies). In some instances, Fv framework region (FR) residues of the human immunoglobulin are replaced by corresponding non-human residues. In addition, humanized antibodies may contain residues that are neither present in the recipient antibody nor in the introduced CDR or framework sequences but are included to further improve and optimize antibody performance. In general, a humanized antibody will contain at least one, and usually two, substantially the entire variable domain, wherein all or substantially all of the CDR regions correspond to those of the non-human immunoglobulin, and all or substantially all the FR regions are those of the human immunoglobulin consensus sequence. Humanized antibodies will optimally also comprise at least a portion of an immunoglobulin constant region or domain (Fc), typically a human immunoglobulin constant region or domain. Antibodies may have modified Fc regions as described in WO 99/58572. Other forms of humanized antibodies have one or more CDRs (one, two, three, four, five, and/or six) that are altered relative to the original antibody, also referred to as "derived from" one or more CDRs from one or more CDRs of the original antibody.

In some embodiments, the isolated antibody or antigen-binding fragment thereof binding to CD142 described herein is a chimeric antibody, which can include heavy and light chain constant regions from a human antibody. A chimeric antibody refers to an antibody having a variable region or a portion of a variable region from a first species and a constant region from a second species. Typically, in these chimeric antibodies, the variable regions of both the light and heavy chains mimic the variable regions of antibodies derived from one species of mammal (e.g., non-human mammals such as mice, rabbits, and rats) regions, while the constant portion is homologous to sequences in an antibody derived from another mammal, such as a human. In some embodiments, amino acid modifications can be made in the variable and/or constant regions.

The isolated antibody or antigen-binding fragment thereof binding to CD142 as described herein can be prepared by any method known in the art. For example, Harlow and Lane, (1998) Antibodies: A Laboratory Manual, Cold Spring Harbor Laboratory, New York.

The isolated antibody or antigen-binding fragment thereof binding to CD142 can be obtained by immunizing an animal with CD142 or any polypeptide selected from the amino acid sequence of CD142 according to methods commonly practiced in the art, collecting and purifying the antibody produced in vivo. In this case, by examining the cross-reactivity of the antibody binding to the obtained xenogeneic CD142 with human CD142, an antibody that can be applied to human diseases can be selected. Alternatively, it can be obtained by following known methods (e.g., Kohler and Milstein, Nature (1975) 256, pp. 495-497; Kennet, R. eds., Monoclonal Antibodies, pp. 365-367, Plenum Press, N.Y. (1980)), the antibody-producing cells that produce antibodies against CD142 are fused with myeloma cells to establish hybridomas, and monoclonal antibodies are obtained from the hybridomas. CD142 used as an antigen can be obtained by expressing the CD142 gene in host cells using genetic engineering.

Hybridomas can be engineered to obtain chimeric antibodies, such as those in which mouse or rat-derived antibody variable regions are linked to human-derived constant regions (see Proc. Natl. Acad. Sci. U.S.A., 81, 6851-6855, (1984)).

Humanized antibodies can be exemplified by antibodies obtained by incorporating only complementarity determining regions (CDRs) into antibodies derived from humans (see Nature (1986) 321, pp. 522-525) and by CDR grafting, e.g., an antibody obtained by grafting a part of the amino acid residues of the framework in addition to the sequence of the CDRs (WO 90/07861). Human antibodies can be obtained by a method using human antibody-producing mice having human chromosomal fragments comprising the heavy and light chain genes of human antibodies (see Tomizuka, K. et al., Nature Genetics (1997) 16, pp. 133-143; Kuroiwa, Y. et al., Nucl. Acids Res. (1998) 26, pp. 3447-3448; Yoshida, H. et al., Animal Cell Technology: Basic and Applied Aspects vol. 10, pp. 69-73 (Kitagawa, Y., Matsuda, T. and Iijima, S. eds.), Kluwer Academic Publishers, 1999; Tomizuka, K. eds., Proc. Natl. Acad. Sci. USA (2000) 97, pp. 722-727, etc.).

The isolated antibody or antigen-binding fragment thereof provided herein binds to CD142 specifically and shows good affinity to CD142-expesssing cells. The isolated antibody or antigen-binding fragment thereof has obvious killing effect on tumor cells. In some embodiments, the isolated antibody or antigen-binding fragment thereof binding to CD142 provided herein could reduce/eliminate disease cells, e.g., $CD142^+$ tumor cells, thereby treating and/or diagnosing a CD142 target tumor.

The isolated antibody or antigen-binding fragment thereof provided herein has reduced effect on blood coagulation function, and decreased coagulation toxicity. In some embodiments, isolated antibody or antigen-binding fragment thereof provided herein has reduced effects on blood clotting time and are effective in avoiding the bleeding side effects as compared with antibodies targeting CD142, such as Tisotumab vedotin, in the prior art.

The present disclosure provides a nucleic acid encoding the above isolated antibody or antigen-binding fragment thereof binding to CD142, wherein the nucleic acid encodes the VH and/or VL. In some embodiments, the nucleic acid encoding VH includes nucleotide sequence shown in SEQ ID NO: 18; the nucleic acid encoding VL includes nucleotide sequence shown in SEQ ID NO: 19; or the nucleic acid encoding VH includes nucleotide sequence shown in SEQ ID NO:37; the nucleic acid encoding VL includes nucleotide sequence shown in SEQ ID NO:38.

The present disclosure also provides a vector including the nucleic acid described above. Meanwhile, the present disclosure provides a host cell including the above nucleic acid or the vector.

[Antibody-Drug Conjugate]

The present disclosure provides an antibody-drug conjugate having the structure of formula I, or an isomer, an isotopic variant, a pharmaceutically acceptable salt, prodrug, solvate thereof, or combinations thereof, $$Ab\text{-}(L\text{-}D)n \quad (I)$$

wherein Ab is an isolated antibody or antigen-binding fragment thereof binding to CD142;

L is a linker that covalently links to Ab and D, respectively;

D is a payload;

n is an integer of 1 to 10.

The term "antibody-drug conjugate", also called "ADC", refers to a conjugate of the antibodies or the antigen-binding thereof binding to CD142 described herein covalently linked to a payload. Typically, the antibody-drug conjugate may include an antibody, a payload, and optionally a linker between the antibody and the payload. ADCs can provide therapeutic effects by delivering payloads to $CD142^+$ cells, particularly $CD142^+$ tumor cells, targeted by the antibody. The antibody-drug conjugate can be prepared by various methods known to the skilled in the art.

The term "linker" refers to a connecting structure connecting an antibody and a payload. Molecular design and property of the linker are critical determinant factors for ADC efficacy in terms of pharmacokinetics (PK)/pharmacodynamics (PD) and therapeutic window. For optimal efficacy, an ideal linker should have the following properties: (1) The linker needs to possess sufficient stability in plasma so that ADCs can circulate in the bloodstream and localize to the tumor site without premature cleavage. Instability of the linker causes premature liberation of the toxic payload and undesired damage to non-target healthy cells, leading to systemic toxicity and adverse effects. (2) The linker needs to possess the ability to be rapidly cleaved and to release free and toxic payload once the ADC is internalized into the target tumor cell. (3) Another property to be considered in the linker design is hydrophobicity. Hydrophobic linkers coupled with hydrophobic payloads often promote aggregation of ADCs. Such molecules are unfavorable in the pursuit of therapeutically useful ADCs, and may cause hepatotoxicity or provoke undesired immune response (Kyoji Tsuchikama et al., Antibody-drug conjugates: recent advances in conjugation and linker chemistrie, Protein Cell. 2018 January; 9(1):33-46).

The term "isomer" refers to compounds that have the same molecular formula but differ in structure, which is also called structural isomer, usually including structural isomers and stereoisomers. Structural isomers refer to isomers caused by differences in the connecting order of atoms in the molecule or different bonding properties, preferably including tautomer. Tautomer refers to functional group isomer resulting from the rapid movement of an atom at two positions in a molecule. Stereoisomers refer to isomers caused by atoms or atomic groups in a molecule that are connected to each other in the same order and bond, but differ in spatial arrangements, preferably including optical isomers. Optical isomers refer to stereoisomers with different optical properties due to the absence of anti-axial symmetry in the molecule, such as enantiomers, diastereomers, racemates and mesomeres.

The term "prodrug" refers to a compound obtained by modifying the chemical structure of a drug, which is inactive or less active in vitro, and releases the active drug through enzymatic or non-enzymatic transformation in vivo to exert pharmacological effects. In the present disclosure, a prodrug can be ADC molecule or payload.

In some embodiments, the linker is a cleavable linker or a non-cleavable linker.

In some embodiments, the linker includes a cleavable peptide.

In some embodiments, the cleavable peptide is cleavable by an enzyme.

In some embodiments, the enzyme includes Cathepsin B.

In some embodiments, the cleavable peptide or L includes an amino acid unit.

In some embodiments, the amino acid unit includes a dipeptide, tripeptide, tetrapeptide or pentapeptide.

In some embodiments, the amino acid unit is selected from the group consisting of Val-Cit, Val-Ala, Glu-Val-Cit, Ala-Ala-Asn, Gly-Val-Cit, Gly-Gly-Gly and Gly-Gly-Phe-Gly, or combinations thereof. The amino acids shown in three-letter codes are well-known to the skilled in the art, including but not limited to, Val represents for valine, Cit represents for citrulline, Ala represents for alanine, Glu represents for glutamic acid, Asn represents for asparagine, Gly represents for glycine, and Phe represents for phenylalanine.

In some embodiments, the L includes at least one spacer, which can provide distance between the payload and the antibody.

In some embodiments, the spacer includes self-immolative spacers.

In some embodiments, the self-immolative spacer includes p-aminobenzoxy carbonyl (PABC) or p-aminobenzyl (PAB).

A self-immolative spacer may be defined as a bifunctional chemical moiety which is capable of covalently linking together two spaced chemical moieties into a normally stable tripartite molecule, can release one of the spaced chemical moieties from the tripartite molecule, such as, by means of enzymatic cleavage, and following cleavage (e.g., enzymatic cleavage), can spontaneously cleave from the remainder of the molecule to release the other of the spaced chemical moieties.

In some embodiments, the cleavable peptide is directly spliced to the spacer.

In some embodiments, the spacer includes the structure shown as $-NH-(CH_2)n^4$-La-Lb-Lc-, where La denotes $-O-$ or a single bond; Lb denotes $-CR^2(-CR^3)-$, or a single bond, where $R_2$ and $R_3$ each independently denote $C_1$-$C_6$ alkyl, $-(CH_2)n^a$-$NH_2$, $-(CH_2)n^b$-COOH, or $-(CH_2)n^c-OH$, $n^4$ denotes an integer from 0 to 6, $n^a$, $n^b$ and $n^c$ each independently denote an integer from 1 to 4, but $R^2$ and $R^3$ are not the same when $n^a$ is 0, and Lc denotes $-C(=O)-$.

In some embodiments, the spacer includes $-NH-(CH_2)_3-C(=O)-$, $-NH-CH_2-O-CH_2-C(=O)-$ or $-NH-(CH_2)_2-O-CH_2-C(=O)-$.

In some embodiments, the linker includes a structure represented by $-L_1$-$L_2$-$L_3$-, wherein $L_1$ denotes -(succinimidyl-3-yl-N)$-(CH_2)m^1$-$C(=O)-$, $-CH_2-C(=O)-NH-(CH_2)m^2-C(=O)-$ or $-C(=O)-(CH_2)$ $m^3$-$C(=O)-$, where $m^1$ denotes an integer of 2 to 8, $m^2$ denotes an integer of 1 to 8, and $m^3$ denotes an integer of 1 to 8; $L_2$ denotes amino acid unit; $L_3$ denotes self-immolative spacer.

In some embodiments, $m^1$ denotes 2, 3, 4, 5, 6, 7, or 8. In some embodiments, $m^2$ denotes 1, 2, 3, 4, 5, 6, 7, or 8. In some embodiments, $m^3$ denotes 1, 2, 3, 4, 5, 6, 7, or 8.

In some embodiments, L is selected from the group consisting of
-(succinimidyl-3-yl-N)—CH$_2$CH$_2$—C(=O)-GGFG-PABC-;
(succinimidyl-3-yl-N)—CH$_2$CH$_2$CH$_2$CH$_2$CH$_2$—C(=O)-GGFG-PABC-;
-(succinimidyl-3-yl-N)—CH$_2$CH$_2$CH$_2$CH$_2$CH$_2$—C(=O)-GGFG-NH-PABC-;
-(succinimidyl-3-yl-N)—CH$_2$CH$_2$—C(=O)—NH—CH$_2$CH$_2$O—CH$_2$CH$_2$O—CH$_2$CH$_2$—C(=O)-GGFG-PABC-;
-(succinimidyl-3-yl-N)—CH$_2$CH$_2$—C(=O)—NH—CH$_2$CH$_2$O—CH$_2$CH$_2$O—CH$_2$CH$_2$O—CH$_2$CH$_2$O—CH$_2$CH$_2$—C(=O)-GGFG-PABC-;
—CH$_2$—C(=O)—NH—CH$_2$CH$_2$—C(=O)-GGFG-PABC-;
—C(=O)—CH$_2$CH$_2$CH$_2$CH$_2$CH$_2$—C(=O)-GGFG-PABC-;
-(succinimidyl-3-yl-N)—CH$_2$CH$_2$—C(=O)-GGFG-NH—CH$_2$CH$_2$—C(=O)—;
-(succinimidyl-3-yl-N)—CH$_2$CH$_2$—C(=O)-GGFG-NH—CH$_2$CH$_2$CH$_2$—C(=O)—;
-(succinimidyl-3-yl-N)—CH$_2$CH$_2$CH$_2$CH$_2$CH$_2$—C(=O)-GGFG-NH—CH$_2$CH$_2$—C(=O)—;
-(succinimidyl-3-yl-N)—CH$_2$CH$_2$CH$_2$CH$_2$CH$_2$—C(=O)-GGFG-NH—CH$_2$CH$_2$CH$_2$—C(=O)—;
-(succinimidyl-3-yl-N)—CH$_2$CH$_2$CH$_2$CH$_2$CH$_2$—C(=O)-GGFG-NH—CH$_2$CH$_2$CH$_2$CH$_2$—C(=O)—;
-(succinimidyl-3-yl-N)-CH$_2$CH$_2$CH$_2$CH$_2$CH$_2$—C(=O)—;
-(succinimidyl-3-yl-N)—CH$_2$CH$_2$CH$_2$CH$_2$CH$_2$—C(=O)-GGFG-NH—CH$_2$CH$_2$—O—CH$_2$—C(=O)—;
-(succinimidyl-3-yl-N)—CH$_2$CH$_2$—C(=O)—NH—CH$_2$CH$_2$O—CH$_2$CH$_2$O—CH$_2$CH$_2$—C(=O)-GGFG-NH—CH$_2$CH$_2$CH$_2$—C(=O)—;
-(succinimidyl-3-yl-N)—CH$_2$CH$_2$—C(=O)—NH—CH$_2$CH$_2$O—CH$_2$CH$_2$O—CH$_2$CH$_2$—C(=O)-GGFG-NH—CH$_2$CH$_2$—C(=O)—;
-(succinimidyl-3-yl-N)—CH$_2$CH$_2$—C(=O)—NH—CH$_2$CH$_2$O—CH$_2$CH$_2$O—CH$_2$CH$_2$O—CH$_2$CH$_2$O—CH$_2$CH$_2$—C(=O)-GGFG-NH—CH$_2$CH$_2$CH$_2$—C(=O)—;

-(succinimidyl-3-yl-N)—CH$_2$CH$_2$—C(=O)—NH—CH$_2$CH$_2$O—CH$_2$CH$_2$O—CH$_2$CH$_2$O—CH$_2$CH$_2$O—CH$_2$CH$_2$—C(=O)-GGFG-NH—CH$_2$CH$_2$—C(=O)—;
—CH$_2$—C(=O)—NH—CH$_2$CH$_2$—C(=O)-GGFG-NH—CH$_2$CH$_2$CH$_2$—C(=O)—;
—C(=O)—CH$_2$CH$_2$CH$_2$CH$_2$CH$_2$CH$_2$—C(=O)-GGFG-NH—CH$_2$CH$_2$CH$_2$—C(=O)—;

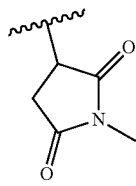

-(succinimidyl-3-yl-N)—CH$_2$CH$_2$—C(=O)—VA-PABC-;
-(succinimidyl-3-yl-N)—CH$_2$CH$_2$CH$_2$CH$_2$CH$_2$—C(=O)—VA-PABC-;
-(succinimidyl-3-yl-N)—CH$_2$CH$_2$CH$_2$CH$_2$CH$_2$—C(=O)—VA-NH-PABC-;
-(succinimidyl-3-yl-N)—CH$_2$CH$_2$—C(=O)—NH—CH$_2$CH$_2$O—CH$_2$CH$_2$O—CH$_2$CH$_2$—C(=O)—VA-PABC-;
-(succinimidyl-3-yl-N)—CH$_2$CH$_2$—C(=O)—NH—CH$_2$CH$_2$O—CH$_2$CH$_2$O—CH$_2$CH$_2$O—CH$_2$CH$_2$O—CH$_2$CH$_2$—C(=O)—VA-PABC-;
—CH$_2$—C(=O)—NH—CH$_2$CH$_2$—C(=O)—VA-PABC-;
—C(=O)—CH$_2$CH$_2$CH$_2$CH$_2$CH$_2$CH$_2$—C(=O)—VA-PABC-;
-(succinimidyl-3-yl-N)—CH$_2$CH$_2$—C(=O)—VA-NH—CH$_2$CH$_2$—C(=O)—;
-(succinimidyl-3-yl-N)—CH$_2$CH$_2$—C(=O)—VA-NH—CH$_2$CH$_2$CH$_2$—C(=O)—;
-(succinimidyl-3-yl-N)—CH$_2$CH$_2$CH$_2$CH$_2$CH$_2$—C(=O)—VA-NH—CH$_2$CH$_2$—C(=O)—;
-(succinimidyl-3-yl-N)—CH$_2$CH$_2$CH$_2$CH$_2$CH$_2$—C(=O)—VA-NH—CH$_2$CH$_2$CH$_2$—C(=O)—;
-(succinimidyl-3-yl-N)—CH$_2$CH$_2$CH$_2$CH$_2$CH$_2$—C(=O)—VA-NH—CH$_2$CH$_2$CH$_2$CH$_2$—C(=O)—;
-(succinimidyl-3-yl-N)—CH$_2$CH$_2$CH$_2$CH$_2$CH$_2$—C(=O)—VA-NH—CH$_2$—O—CH$_2$—C(=O)—;
-(succinimidyl-3-yl-N)—CH$_2$CH$_2$CH$_2$CH$_2$CH$_2$—C(=O)—VA-NH—CH$_2$CH$_2$—O—CH$_2$—C(=O)—;
-(succinimidyl-3-yl-N)—CH$_2$CH$_2$—C(=O)—NH—CH$_2$CH$_2$O—CH$_2$CH$_2$O—CH$_2$CH$_2$—C(=O)—VA-NH—CH$_2$CH$_2$CH$_2$—C(=O)—;
-(succinimidyl-3-yl-N)—CH$_2$CH$_2$—C(=O)—NH—CH$_2$CH$_2$O—CH$_2$CH$_2$O—CH$_2$CH$_2$—C(=O)—VA-NH—CH$_2$CH$_2$—C(=O)—;
-(succinimidyl-3-yl-N)—CH$_2$CH$_2$—C(=O)—NH—CH$_2$CH$_2$O—CH$_2$CH$_2$O—CH$_2$CH$_2$O—CH$_2$CH$_2$O—CH$_2$CH$_2$—C(=O)—VA-NH—CH$_2$CH$_2$CH$_2$—C(=O)—;
-(succinimidyl-3-yl-N)—CH$_2$CH$_2$—C(=O)—NH—CH$_2$CH$_2$O—CH$_2$CH$_2$O—CH$_2$CH$_2$O—CH$_2$CH$_2$O—CH$_2$CH$_2$—C(=O)—VA-NH—CH$_2$CH$_2$—C(=O)—; and
—CH$_2$—C(=O)—NH—CH$_2$CH$_2$—C(=O)—VA-NH—CH$_2$CH$_2$CH$_2$—C(=O)—;
—C(=O)—CH$_2$CH$_2$CH$_2$CH$_2$CH$_2$CH$_2$—C(=O)—VA-NH—CH$_2$CH$_2$CH$_2$—C(=O)—.

In some embodiments, p-aminobenzoxy carbonyl (PABC) or p-aminobenzyl (PAB) includes a polysarcosine (poly-N-methylglycine) residue or a methylamino group.

In some embodiments, the linker includes formula II,

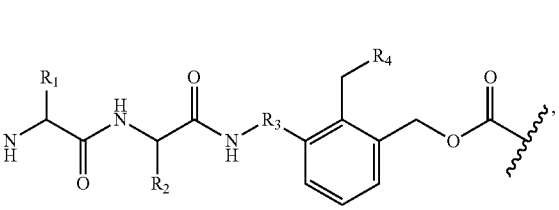

(II)

In formula II, R$_1$ and R$_2$ are independently selected from hydrogen, methyl, and isopropyl group; R$_3$ denotes —(CR$_5$HCONH)n$^1$-(CH$_2$CONH)n$^2$- or a single bond; R$_5$ is selected from hydrogen or benzyl, n$^1$ denotes an integer of 0 to 2, and n$^2$ denotes an integer of 0 to 2; R$_4$ denotes a methylamino group or —(NCH$_3$COCH$_2$)n$^3$-NCH$_3$COCH$_3$, and n$^3$ denotes an integer of 1 to 20.

In some embodiments, in the linker of formula II, R$_4$ denotes —(NCH$_3$COCH$_2$)n$^3$-NCH$_3$COCH$_3$, n$^3$ denotes an integer of 1 to 20. n$^3$ may be selected from for example, any integer of 1, 2, 3, 4, 5, 6, 7, 8, 9, 10, 11, 12, 13, 14, 15, 16, 17, 18, 19, and 20.

In some embodiments, in the linker of formula II, R$_4$ denotes —(NCH$_3$COCH$_2$)n$^3$-NCH$_3$COCH$_3$, n$^3$ denotes an integer of 8 to 15. In some embodiments, in the linker of formula II, R$_4$ denotes —(NCH$_3$COCH$_2$)n$^3$-NCH$_3$COCH$_3$, n$^3$ denotes an integer of 10 to 12.

In some embodiments, in the linker of formula II, R$_4$ denotes a methylamino group.

In the present disclosure, the introduction of R$_4$ which contains a hydrophilic amino group (such as, a polysarcosine group or a methylamino group), is benefit for increasing the hydrophilicity of the antibody-drug conjugate, especially when a hydrophobic payload is conjugated in the antibody-drug conjugate. The increase of the hydrophilicity of ADCs is helpful to reduce aggregation of ADCs in a preparation process, thereby improving the stability, the uniformity, and the purity of ADCs.

In some embodiments, in the linker of formula II, R$_3$ represents a single bond.

In some embodiments, in the linker of formula II, R$_3$ represents —(CR$_5$HCONH)n$^1$-(CH$_2$CONH)n$^2$-, R$_5$ is benzyl, n$^1$ represents an integer of 1 or 2, n$^2$ represents an integer of 1 or 2.

In some embodiments, in the linker of formula II, R$_3$ represents —CR$_5$HCONH—, —CH$_2$CONH—, —CR$_5$HCONH—CH$_2$CONH—; —(CR$_5$HCONH)$_2$—CH$_2$CONH—; —CR$_5$HCONH—(CH$_2$CONH)$_2$—; or —(CR$_5$HCONH)$_2$—(CH$_2$CONH)$_2$—; R$_5$ is benzyl.

In some embodiments, in the linker of formula II, R$_1$ is hydrogen. In some embodiments, in the linker of formula II, R$_1$ is isopropyl.

In some embodiments, in the linker of formula II, R$_2$ is hydrogen. In some embodiments, in the linker of formula II, R$_2$ is methyl.

In some embodiments, the linker of the antibody-drug conjugate is selected from the group consisting of

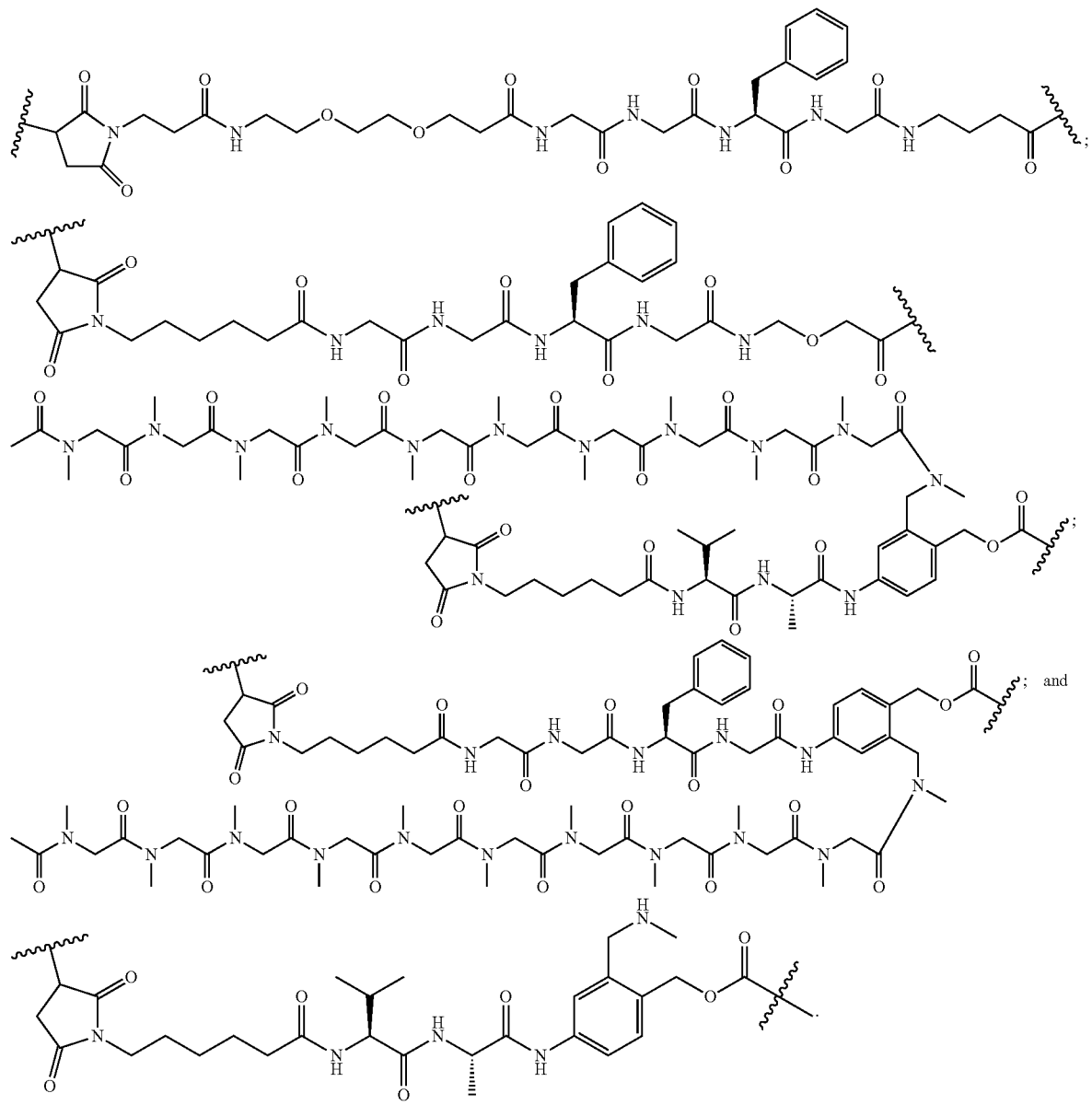

In the present disclosure, in the antibody-drug conjugate, a succinimidyl group of the linker of formula II is connected to an antibody by covalent bonds. In some embodiments, a terminal succinimidyl group of the linker of formula II forms a thioether bond with a sulfhydryl group obtained by a reduction of an interchain disulfide chain of the antibody. The succinimidyl group is

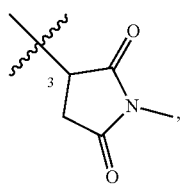 [SMILES: *C1CC(=O)N(C)C1=O]

which forms a thioether bond with a sulfhydryl moiety obtained by a reduction of an interchain disulfide chain of the antibody by a carbon atom at position 3. The bond with $\xi$ in the structural formula represents a chemical bond connected to other groups.

In the present disclosure, the disulfide bond of the antibody including interchain disulfide bond and intrachain disulfide bond, preferably, an interchain disulfide chain that is processed, for example, activated to sulfhydryl and then bonded to linkers. The amino acid in the antibody that are chemically bonded to the succinimidyl group includes one of lysine, histidine, tyrosine and cysteine, or combinations thereof, preferably, cysteine.

The term "payload" includes compounds that are cytotoxic or capable of killing cells upon release from the antibody-drug conjugate, compounds, radionuclides or polypeptides with radiolabels, fluorophores, chromophores, imaging agents and/or metal ions as detection labels or having cell killing effects, compounds, nucleic acids, polypeptides or proteins, enzymes, hormones or nucleic acids that can modulate immune activity in the body (including effects of activation or inhibition).

Under some ideal conditions, in the antibody-drug conjugate, the conjugated payload has little cytotoxicity, or the cytotoxicity thereof is so low that administration of a therapeutically effective dose of the ADC will not cause systemic toxicity in the subject due to the conjugated payload. The payload can be a clinically validated drug for the treatment of a specific disease, or compound, radionuclide, nucleic acid, protein, or polypeptide with acceptable pharmacological activity under conditions of clinical use.

In some embodiments, the payload in the antibody-drug conjugate is a label containing radiolabels, fluorophores, chromophores, imaging agents and/or metal ions as detection labels. The label includes, but is not limited to, chemically synthesized organic compounds, radionuclides, metal complexes or polypeptides. Wherein the radiolabel refers to a labeled compound in which one or several kinds of atoms of the compound molecule are replaced with a radionuclide so that the compound can be identified and used as a tracer, and the radiolabel includes amino acids, polypeptides, proteins, carbohydrates, nucleotides, nucleosides, purines, pyrimidines, steroids, lipid compounds, as well as tumor antigens, hormones, receptors, vitamins and drugs used in medical research. The radionuclide is usually nuclide capable of spontaneously emitting radiation, including but not limited to tritium, iodine 125, iodine 131, sulfur 35, phosphorus 32 and carbon 14. The fluorophore is usually a group including a conjugated double bond, and the fluorophore emits fluorescence when a molecule falls back to a ground state from an excited state. The chromophore refers to an unsaturated group and associated chemical bonds thereof which are contained in a molecule, capable of absorbing light radiation and have transitions. The imaging agent usually refer to radiopharmaceuticals capable of imaging organs, tissues or molecules when introduced into the body in nuclear medicine.

In some embodiments, the payload in the antibody-drug conjugate is nucleic acid which can be ribonucleic acid and/or deoxyribonucleic acid.

In some embodiments, the payload in the antibody-drug conjugate is hormone, growth factor, coagulation factor, and plasminase (e.g., prodrug converting enzymes capable of converting prodrugs to active drugs, ribonucleases).

In some embodiments, the payload in the antibody-drug conjugate is immunomodulator (including cytokines and chemokines that can affect immunity), or agonistic or antagonistic antibodies with biological activity.

In some embodiments, the payload in the antibody-drug conjugate is cytotoxic compound. In some embodiments, the payload in the antibody-drug conjugate has an anti-tumor activity or is an anti-tumor drug. The payload is selected from DNA topoisomerase inhibitor or tubulin inhibitor. The DNA topoisomerase inhibitor can be a topoisomerase I inhibitor or a topoisomerase II inhibitor.

The term "topoisomerase inhibitor" usually refers to a compound that inhibits topoisomerase activity. Compounds known as topoisomerase I inhibitors have activity against topoisomerase I, and topoisomerase II inhibitors have activity against topoisomerase II. Some compounds have activity against both topoisomerase I and topoisomerase II and are known as topoisomerase I/II inhibitors.

The term "tubulin inhibitor" usually refers to compounds that inhibit the microtubule system of eukaryotic cells, interfere with cell division, and inhibit cell proliferation.

In some embodiments, the payload is camptothecin or derivatives thereof having topoisomerase inhibitory effect. The term "derivative" refers to a compound formed by replacing atoms or atomic groups in the molecule of the parent compound with other atoms or atomic groups and is called a derivative of the parent compound. The term "camptothecin and derivatives thereof" generally includes camptothecin and camptothecin derivatives. Camptothecin exerts its pharmacological effects by irreversibly inhibiting topoisomerase I. The camptothecin derivatives include exatecan, irinotecan, topotecan, lurtotecan, silatecan, etirinotecan pegol, TAS 103, 9-aminocamptothecin, 7-ethylcamptothecin, 10-hydroxycamptothecin, 9-nitrocamptothecin, 10,11-methylenedioxycamptothecin, 9-amino-10,11-methylenedioxycamptothecin, 9-chloro-10,11-methylenedioxycamptothecin, (7-(4-methylpiperazinomethylene)-10,11-ethylenedioxy-20(S)-camptothecin, 7-(4-methylpiperazinomethylene)-10,11-methylenedioxy-20(S)-camptothecin, and 7-(2-N-isopropylamino)ethyl)-(20S)-camptothecin, and stereoisomers, salts and esters thereof. Synthetic methods for camptothecin and camptothecin analogs or derivatives thereof are known and are summarized and set forth in U.S. Pat. No. 5,244,903, which is herein incorporated by reference in its entirety.

In some embodiments, the payload is auristatin or derivatives thereof, maytansine or derivatives thereof, which have a tubulin inhibitory effect. The term "auristatin or derivatives thereof" usually includes auristatin F and auristatin F derivatives. The auristatin F derivatives include monomethyl auristatin E (MMAE) and monomethyl auristatin F (MMAF). The term "maytansine or derivatives thereof" usually includes maytansine and maytansine derivatives. The maytansine derivatives include maytansine DM1, maytansine DM2, and maytansine DM4.

In some embodiments, the payload is exatecan, a camptothecin derivative, which as a topoisomerase inhibitor, can act throughout the cell cycle and has strong penetration and good therapeutic effect on slow-growing solid tumors. In addition, the number of intracellular targets is much less than that of targets of tubulin inhibitors, thus a better killing effect can be achieved when ADC molecules carry the same amount of payload into cells. Meanwhile, exatecan molecules are not substrates of P-gp, which is beneficial to reduce or alleviate the problem of drug resistance.

In some embodiments, the payload is camptothecin of formula III or a pharmaceutically acceptable salt thereof, which is connected to the linker by a nitrogen atom of an amino group on a cyclohexane ring thereof,

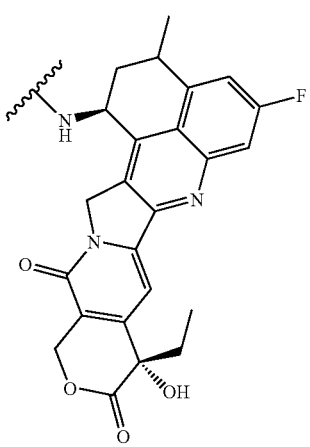

(III)

The exatecan molecule is rigid in structure and has a poor hydrophilicity, thus it is easy to cause polymerization between ADC molecules when it is connected to GGFG tetrapeptide linker commonly used in the prior art to prepare ADC, which does not meet the development requirements of ADC drugs (Bioorg. Med Chem. Lett. 26 (2016) 1542-1545). Therefore, the selection and matching of the linker and the payload have impacts on the safety and stability of ADC drugs.

Without being bound by any theory, due to the multiple hydrophilic groups in the linker of the antibody-drug conjugate, the hydrophilicity of the linker-payload structure is improved, and the aggregation and precipitation of ADCs caused by the hydrophobic payload can be reduced.

After ADC molecule is endocytosed into a cell, the linker is degraded to release compounds of the payload or the linker (or part of the linker)-payload structure. In some embodiments, an amino group on a cyclohexane ring of exatecan of formula III is bonded to the carbonyl group in the ester group of the linker of formula I, and forms a linker-payload structure including carbamate. Without being bound by any theory, after the ADC molecule is endocytosed into the cell, the linker is cleaved by cathepsin (for example, Cathepsin B) to form an intermediate or active metabolite as shown by formula V below, formula V

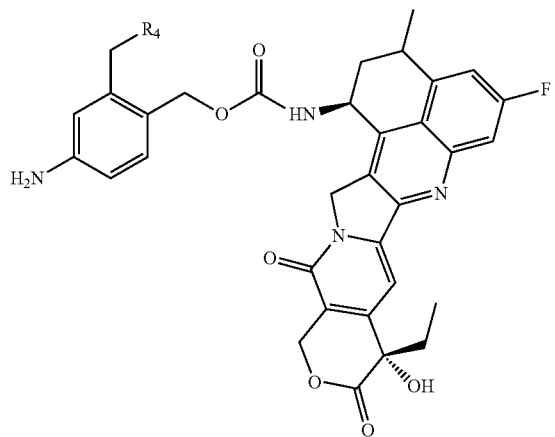

$R_4$ represents a methylamino group or —($NCH_3COCH_2$)$n^3$-$NCH_3COCH_3$, and $n^3$ represents an integer of 1 to 20.

The PABC group in the intermediate or the active metabolite of formula V then undergoes 1,6-elimination to release exatecan. The mechanism of 1,6-elimination of PABC is described in detail in the literature Angew. Chem. Int. Ed. 2015, 54, 7492-7509. Therefore, the linker-payload structure in the ADCs provided by the present disclosure has good in vivo stability and biological activity.

Without being bound by any theory, the cleavage site in the linker-payload structure may be an amide bond in the linker, for example, the amide bond between a carbon atom where the substituent represented by $R_2$ is located and a group represented by $R_3$, or an amide bond in the group represented by $R_3$.

In the antibody-drug conjugate, n, the ratio of the number of molecules of the conjugated payload to each molecule of antibody (DAR), is 1 to 10. In some embodiments, n is 1~10, 1~2, 2~4, 4~6, 2~8, 4~8, 4~10, 6~10, 7~10, or 8~10, exemplary n is 4.66, 7.67, or 7.83.

The term "DAR (Drug-to-Antibody Ratio)" represents an average value of the number of the conjugated payload or drug molecules per antibody molecule, that is, an average number of conjugated drug molecules. In the antibody-drug conjugate, the number of conjugated payload molecules per antibody molecule is a key factor having an influence on the efficacy and safety thereof. The production of the antibody-drug conjugate is carried out by specifying reaction conditions such as the amounts of starting materials and reagents used for reaction, so as to attain a constant number of conjugated payload molecules. A mixture containing different numbers of conjugated payload molecules is usually obtained when the antibody-drug conjugate is prepared. Unless otherwise specified, in the present disclosure, the number of conjugated payload or drug molecules per antibody molecule is defined as an average value, i.e., the average number of conjugated payload or drug molecules.

In some embodiments, the ADCs with the linker described above are chemically coupled to an antibody targeting CD142, resulting a higher DAR value (e.g., DAR8).

In some embodiments, the antibody-drug conjugate includes any one of the following structures:

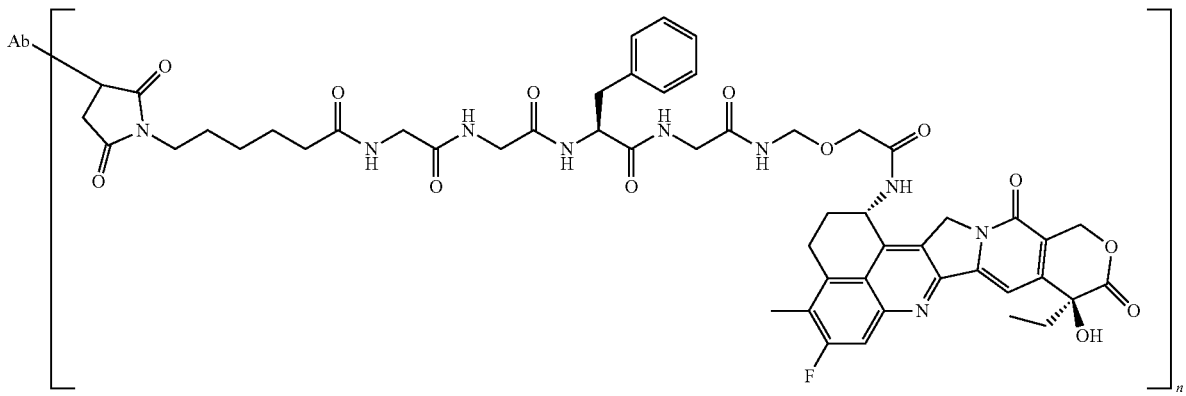

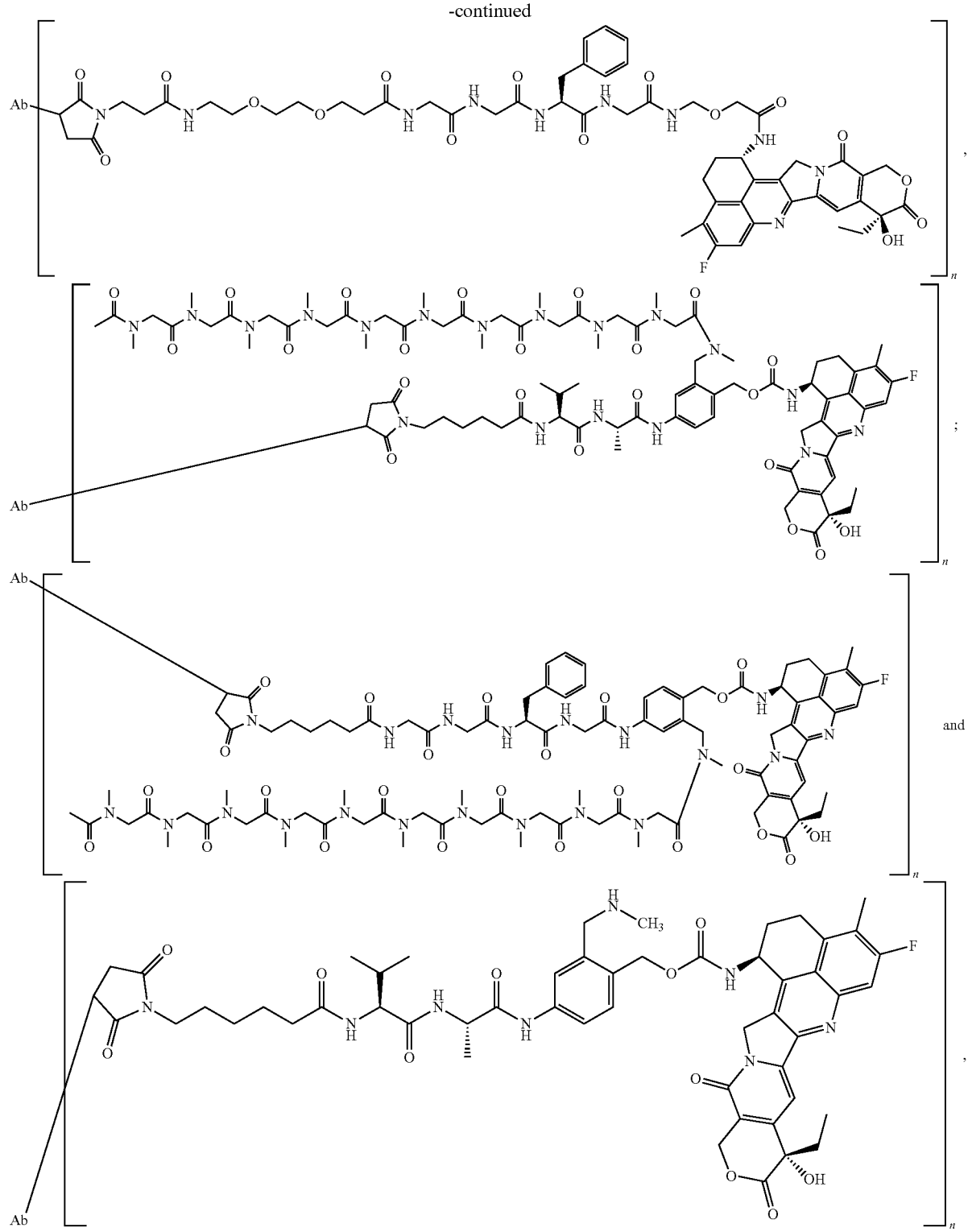

Ab represents the isolated antibody or antigen-binding fragment thereof binding to CD142; n is the same as the ratio of the number of molecules of payload to each molecule of antibody, or DAR.

The antibody in the antibody-drug conjugate is CD142 specifically targeted, and the antibody forms a reactive sulfhydryl group by the disulfide bond, and then is connected to a linker. In some embodiments, the disulfide bond in a hinge region of the antibody forms a reactive sulfhydryl group and then is connected to a linker.

In some embodiments, the antibody in the antibody-drug conjugate is the antibody or antigen-binding fragment thereof provided above. In some embodiments, the antibody or antigen-binding fragment thereof in the antibody-drug conjugate includes a VH sequence as shown in SEQ ID NO: 8, and a VL sequence as shown in SEQ ID NO: 15. In some embodiments, the antibody or antigen-binding fragment thereof in the antibody-drug conjugate includes a VH sequence as shown in SEQ ID NO: 28 and a VL sequence as shown in SEQ ID NO: 33.

The improved hydrophilicity of antibody-drug conjugates may also increase the homogeneity, thus, the antibody-drug conjugates with improved hydrophilicity and/or homogeneity could improve the cytotoxic effect on targeted cells, and improves or maintains the biological activity, safety and other medicinal properties.

The antibody-drug conjugate of the present disclosure has an improved HNSTD (maximum dose without severe toxicity). In addition, it shows a significant efficacy on tumor suppressive, and it may not cause obvious digestive system toxicity. It should be noted that the antibody-drug conjugate of the present disclosure may absorb water, retain the adsorbed water, or become a hydrate due to being left in the atmosphere or recrystallized, and such a water-containing compound and salts thereof are also included in the present disclosure. In addition, compounds of isotope variants labeled with various radioactive or non-radioactive isotopes are also included in the present disclosure. More than one of the atoms constituting the antibody-drug conjugate of the present disclosure may also contain atomic isotopes in unnatural proportions. As an atomic isotope, for example, deuterium ($2H$), tritium ($3H$), iodine-125 ($125I$), or carbon-14 ($14C$), etc., may be exemplified. In addition, the compounds of the present disclosure may be radiolabeled with radioisotope such as tritium ($3H$), iodine-125 ($125I$), or carbon-14 ($14C$). Radiolabeled compounds can be used as therapeutic or prophylactic agents, research reagents such as test reagents, and diagnostic agents, e.g., in vivo imaging diagnostics. All isotopic variants of the antibody-drug conjugate of the present disclosure, whether radioactive or not, are included within the scope of the present disclosure.

[Pharmaceutical Composition]

The present disclosure provides a pharmaceutical composition which includes the isolated antibody or antigen-binding fragment thereof binding to CD142 described above, and a pharmaceutically acceptable excipient.

The present disclosure provides a pharmaceutical composition which includes the antibody-drug conjugate described above, or an isomer, an isotopic variant, a pharmaceutically acceptable salt, prodrug, solvate thereof, or combinations thereof, and a pharmaceutically acceptable excipient.

The pharmaceutical composition can be administered in a suitable manner according to the specific applicable form, physicochemical characteristics, etc. of the pharmaceutically acceptable excipient. In some embodiments, the pharmaceutical composition may be formulated in a form of a freeze-dried formulation or a liquid formulation, which may contain appropriate formulation additives in the art. For example, the above pharmaceutical composition typically contains more than one pharmaceutical carrier, for example, sterile liquid such as water and oil (including petroleum, oils of animal, vegetable, or synthetic origin (e.g., peanut oil, soybean oil, mineral oil, and sesame oil, etc.)). In the case of intravenous administration of the above pharmaceutical composition, water is a more representative carrier. In addition, saline solution, aqueous glucose, and glycerol solution may also be used as a liquid carrier, especially for an injectable solution. Suitable pharmaceutical excipients are known in the art. The above pharmaceutical composition may also contain a trace amount of wetting agent, emulsifier, or pH buffering agent as required. The administration mode of the pharmaceutical composition is usually parenteral administration, which can be intradermal, intramuscular, intraperitoneal, intravenous or subcutaneous injection, but is not limited thereto, for example, the pharmaceutical composition may be administered by infusion or bolus injection. See, e.g., the Handbook of Pharmaceutical Excipients, Third Edition, A. H. Kibbe (Pharmaceutical Press, London, U K, 2000), which is incorporated by reference in its entirety. Remington's Pharmaceutical Sciences, Sixteenth Edition, E. W. Martin (Mack Publishing Co., Easton, Pa., 1980), which is incorporated by reference in its entirety.

The pharmaceutical composition may be containing an active agent, i.e., the isolated antibody or antigen-binding fragment thereof binding to CD142 or the antibody-drug conjugate described above, and a second therapeutic agent (e.g., a cancer therapeutic agent). In some embodiments, the isolated antibody or antigen-binding fragment thereof binding to CD142 of the present disclosure may be administered together with other cancer therapeutic agents to enhance the anticancer effect. In some embodiments, the antibody-drug conjugate of the present disclosure may be administered together with other cancer therapeutic agents to enhance the anticancer effect. Other anticancer agents used for this purpose may be administered to the individual concurrently, separately or sequentially with the antibody-drug conjugate of the present disclosure or may be administered at varying intervals. Exemplary other cancer therapeutic agents may be, for example, paclitaxel, cisplatin, vinblastine, etc., but not limited thereto, as long as they have antitumor activity.

With regard to the present disclosure, the active agent, or pharmaceutical composition comprising the same, can be administered to the subject via any suitable route of administration. For example, the active agent can be administered to a subject via parenteral, nasal, oral, pulmonary, topical, vaginal, or rectal administration. The following discussion on routes of administration is merely provided to illustrate various embodiments and should not be construed as limiting the scope in any way.

The present disclosure also provides a kit, including the isolated antibody or antigen-binding fragment thereof binding to CD142 or the antibody-drug conjugate described above, useful in detecting CD142, or CD142-expressing cells.

[Preparation Method]

The present disclosure provides a preparation method of antibody-drug conjugate, which includes the following steps:

reducing an antibody or antigen-binding fragment thereof such that disulfide bonds thereof are at least partially reduced, and reacting with a reactive group of the linker in the linker-payload to obtain the antibody-drug conjugate with the structure of formula I, $$Ab\text{-}(L\text{-}D)n \tag{I}$$

or an isomer, an isotopic variant, a pharmaceutically acceptable salt, prodrug, solvate thereof, or combinations thereof;

wherein Ab is the isolated antibody or antigen-binding fragment thereof binding to CD142 described above; L is a linker that covalently links to Ab and D, respectively; D is a payload; n is an integer of 1 to 10.

The reactive group is not particularly limited as long as the reactive group contains a moiety capable of reacting with the resulting sulfhydryl group of the antibodies.

In some embodiments, a carbon atom at position 3 of maleimide-N-yl in L-D reacts with the reduced antibody and covalently links to prepare ADC.

In some embodiments, the method includes the following steps: reducing the antibody such that interchain disulfide bonds thereof are at least partially reduced, and reacting with a carbon atom at position 3 of maleimide-N-yl of the linker represented by formula IV,

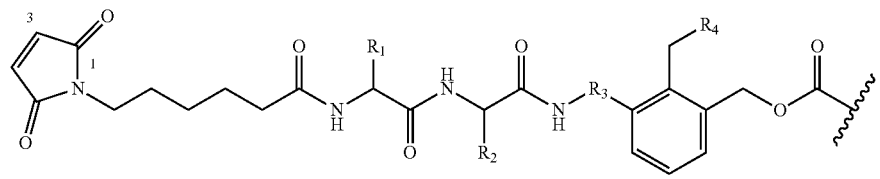

(IV)

A carbonyl group in an ester group of the linker of formula IV is connected to an amino group of the payload in the antibody-drug conjugate;

In formula IV, $R_1$ and $R_2$ are each independently selected from hydrogen, methyl or isopropyl group;

$R_3$ represents $—(CR_5HCONH)n^1-(CH_2CONH)n^2-$ or a single bond, $R_5$ is selected from hydrogen or benzyl, $n^1$ represents an integer of 0 to 2, and $n^2$ represents an integer of 0 to 2;

$R_4$ represents a methylamino group or $—(NCH_3COCH_2)$ $n^3-NCH_3COCH_3$, and $n^3$ represents an integer of 1 to 20.

In antibody-drug conjugate, in many practical cases, linkers of the structure of above formula IV with a payload are connected to the same antibody molecule having a reactive thiol group. In some embodiments, the antibody reacts with a reducing agent such as dithiothreitol (DTT), 2-mercaptoethanol, or tris(2-carboxyethyl) phosphine hydrochloride (TCEP), causing disulfide bond of the antibody chain to form a reactive sulfhydryl group. The amount of the reducing agent can be 0.3-10 times the molar equivalent of the antibody, for example, 1-10, 3-10, 5-10, 7-10 times the molar equivalent of the antibody.

In some embodiments, the method further includes: reacting the antibody with a reducing agent in a buffer solution containing a chelating agent, followed by an addition of a linker-payload solution to carry out the reaction. The linker-payload is particularly a compound formed by the bonding of the linker of formula IV and the payload, wherein the amino group (primary amino group) in the payload is connected to the carbonyl group in the ester group of the linker of formula IV. The term "chelating agent" refers to a complex capable of forming a complex with a cyclic structure by coordinative bonding with a metal atom or ion.

In some embodiments, the reducing agent reacts with the antibody in a buffered solution containing a chelating agent, resulting in an antibody with partially or fully reduced interchain disulfide bonds. The chelating agent includes, but is not limited to, ethylenediaminetetraacetic acid (EDTA) and diethylenetriaminepentaacetic acid (DTPA). The chelating agent is used at a concentration of 1 mM~20 mM, for example, 2 mM~20 mM, 5 mM~20 mM, 8 mM~20 mM, 1 mM~15 mM, or 1 mM~10 mM. The components of the buffer solution may be buffer salts commonly used in the art, such as sodium phosphate, sodium borate, sodium acetate, or similar buffer salts.

The reaction of the antibody with the reducing agent is carried out under adjusted pH. In some embodiments, when the antibody reacts with the reducing agent, the pH of the solution is 5~9, optionally, 6~8, 6~7, 6.5~7.5, or 7~8. For example, the reaction is carried out when the pH of the solution is about 7. The pH of the solution can be adjusted using either acidic or basic chemicals, and exemplary acidic or basic chemicals include acetic acid, hydrochloric acid, phosphoric acid, sulfuric acid, sodium bicarbonate, sodium carbonate, sodium hydroxide, and triethylamine.

The reaction of antibody and the reducing agent is carried out under regulated temperature, and an exemplary reaction temperature is −10~40° C., −5~40° C., 0~40° C., 5~40° C., 25~40° C., 30~40° C., 35~38° C., for example, about 37° C.

The linker-payload may be dissolved in an organic solvent selected from any one of dimethyl sulfoxide (DMSO), dimethylformamide (DMF), dimethylacetamide (DMA), and N-methyl-2-pyrrolidone (NMP), or combinations thereof.

In some embodiments, a solution of the linker-payload is added to a buffer solution of the antibody that has been reduced or has reactive thiol groups in an amount of a volume ratio of 1% to 20%, based on the volume of the buffer solution of the antibody. In some embodiments, the volume ratio of the added solution of the linker-payload is 1~20%, 2~20%, 5~20%, 10~20%, 15~20%, 1~18%, 1~15%, 1~13%, 1~10%, or 5~15%, based on the volume of buffer solution of the antibody.

In some embodiments, the DAR is 4~20, optionally, 8~20. In some embodiments, the DAR is 10~20, 14~20, 16~20, or 18~20.

In some embodiments, a temperature at which the antibody reacts with the linker~payload is −10~40° C., −5~40° C., 0~40° C., 5~40° C., 10~40° C., 15~40° C., 20~40° C., 0~37° C. In some embodiments, a reaction temperature is 5~37° C., 10~37° C., 10~25° C., or 15~30° C.

In some embodiments, a time for the antibody to react with linker~payload is 0.5~2 hours. In some embodiments, the time for the antibody to react with linker~payload is 0.5~1.75 hours, 0.5~1.5 hours, 0.5~1.25 hours, 0.75~2 hours, or 1~2 hours.

The reaction can be terminated by inactivating the unreacted linker-payload using a thiol-containing reagent. The thiol-containing reagent includes, but is not limited to, cysteine or N-acetyl-(L)-cysteine (NAC). More specifically, a thiol-containing reagent with a molar equivalent of 1-2 times that of the linker-payload is added to the reaction solution, and incubated at room temperature (10-25° C.) for 10-30 minutes, as such, the reaction can be terminated.

In the case where the antibody has a sulfhydryl group, the antibody-drug conjugate may also be obtained by reaction of compounds using known methods (e.g., available by the method described in patent publication US2016/297890 (e.g., available by the methods described in paragraphs [0336] to [0374])). The antibody having a sulfhydryl group can be obtained by methods well known to those skilled in the art (Hermanson, G. T, Bioconjugate Techniques, pp. 56-136, pp. 456-493, Academic Press (1996)).

The antibody-drug conjugate provided by the present disclosure can be obtained by the above preparation method. In some embodiments, the prepared antibody-drug conjugate is subjected to a purification process including, but not limited to, gel filtration, e.g., a purification using a gel column.

Method of Use

The present disclosure also provides uses of the above antibody, the above antibody-drug conjugate, the above pharmaceutical composition, or the antibody-drug conjugate prepared by the above method, or the kit above-mentioned in the manufacture of a therapeutic agent for diagnosis, prevention and treatment of tumor diseases, which includes benign tumors and malignant tumors (e.g., cancer).

The present disclosure provides a method of diagnosing, preventing, and treating tumor diseases, including administering a therapeutically effective amount of the antibody, the antibody-drug conjugate, the antibody-drug conjugate prepared by the above method, the pharmaceutical composition, or the kit described above to a subject in need.

The tumor diseases are not limited to the above diseases as long as the cells of lesion location express the protein recognizable by a CD142 targeting antibody. In some embodiments, the tumor diseases include ovarian carcinoma, gastric carcinoma, esophageal cancer, cervical cancer, prostate cancer, pancreatic cancer, breast cancer, glioblastoma multiforme, lung cancer, bladder cancer, melanoma, and kidney cancer.

In some embodiments, the tumor disease is a CD142 related disease, such as, CD142-expressing solid tumor. In some embodiments, the CD142 related disease includes pancreatic cancer, breast cancer, esophageal cancer, lung cancer, ovarian carcinoma, bladder cancer, and cervical cancer.

The present disclosure provides the use of the above antibody, the above antibody-drug conjugate, the above pharmaceutical composition, or the antibody-drug conjugate prepared by the above method in the manufacture of a therapeutic agent targeting CD142.

The present disclosure provides a method for reducing the number of CD142-expressing cells, including administering a therapeutically effective amount of the above antibody, the above antibody-drug conjugate, the above pharmaceutical composition, or the above antibody-drug conjugate prepared by the above method to a subject in need thereof. The elimination of CD142-expressing cells in a subject is benefit for the treatment of CD142 related disease.

As used herein, the subject can be non-human mammals and humans. Non-human mammals include, but are not limited to, farm animals, sport animals, pets, primates, horses, dogs, cats, mice, and rats. In some embodiments, the subject is a human. The human subject in need of treatment can be a human subject having, at risk of having, or suspected of having a target disease/disorder associated with tumor or CD142 related tumor.

A subject with a target disease or disorder can be identified by routine medical examination (e.g., laboratory tests, organ function tests, CT scans, or ultrasound). A subject suspected of having any such target disease/disorder may exhibit one or more symptoms of that disease/disorder. A subject at risk of having the disease/disorder can be a subject with one or more risk factors of that disease/disorder.

The term "therapeutically effective amount" refers to an amount of each active agent required to impart a therapeutic effect to a subject, singly or in combination with one or more other active agents. In some embodiments, the therapeutic effect refers to decreased CD142 activity or decreased $CD142^+$ cell activity. It will be apparent to those skilled in the art to determine whether the amount of the antibody or the ADC including the antibody achieves a therapeutic effect or not. As will be recognized by those skilled in the art, the effective amount will depend on the particular condition being treated, the severity of the condition, individual patient parameters (including age, physical condition, physique, sex and weight), duration of treatment, nature of the concomitant therapy (if any), the particular route of administration, and knowledge and expertise of health practitioners and similar factors. These factors are well known to those of ordinary skill in the art and can be explained only by routine experimentation. It is generally preferred to use the maximum amount of the individual components or combinations thereof, i.e., the highest safe amount according to sound medical judgment.

In some embodiments, the dosage of the antibody or antigen binding fragment thereof, antibody-drug conjugate can be determined empirically in individuals who have been given one or more administrations of the antibody. In some embodiments, an acceptable therapeutic dose of the antibody-drug conjugate is 0.1~30 mg/kg, 0.5~30 mg/kg, 1~30 mg/kg, 1~25 mg/kg, 0.1~25 mg/kg mg/kg, 0.1~20 mg/kg, 1~20 mg/kg, or 0.5~20 mg/kg. In some embodiments, a dosing frequency is once every 12 hours, once every day, once every week, once every 2 weeks, once every 4 weeks, once every 5 weeks, once every 6 weeks, once every 7 weeks, once every 8 weeks, once every 9 weeks, or once every 10 weeks; or once a month, once every 2 months, or once every 3 months, or longer. The therapeutic dose and frequency of administration can vary with the therapeutic regimen.

Various embodiments and preferences of the present disclosure may be combined with each other as long as they are not inherently inconsistent with each other, and the various embodiments formed by the combination are considered to be part of the disclosure of the present application.

The technical solutions of the present disclosure will be more clearly and specifically described below with reference to the embodiments by way of illustration. It should be understood that these embodiments are for illustrative purposes only and are in no way intended to limit the scope of protection of the present disclosure. The scope of protection of the present disclosure is limited only by the claims.

Examples

The invention is further described in the following examples, which do not limit the scope of the invention described in the claims.

Example 1: Preparation of Compound LP-1
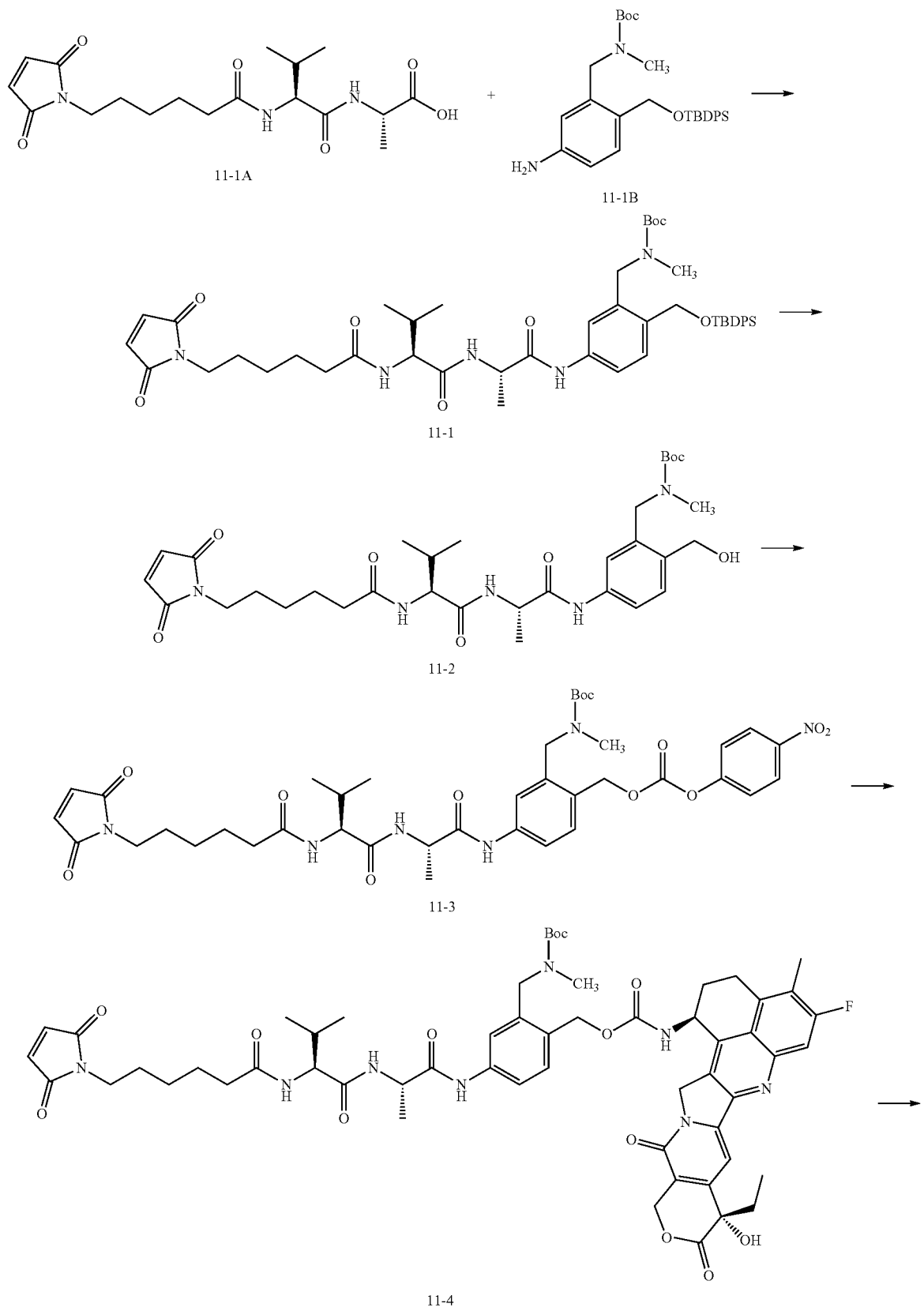

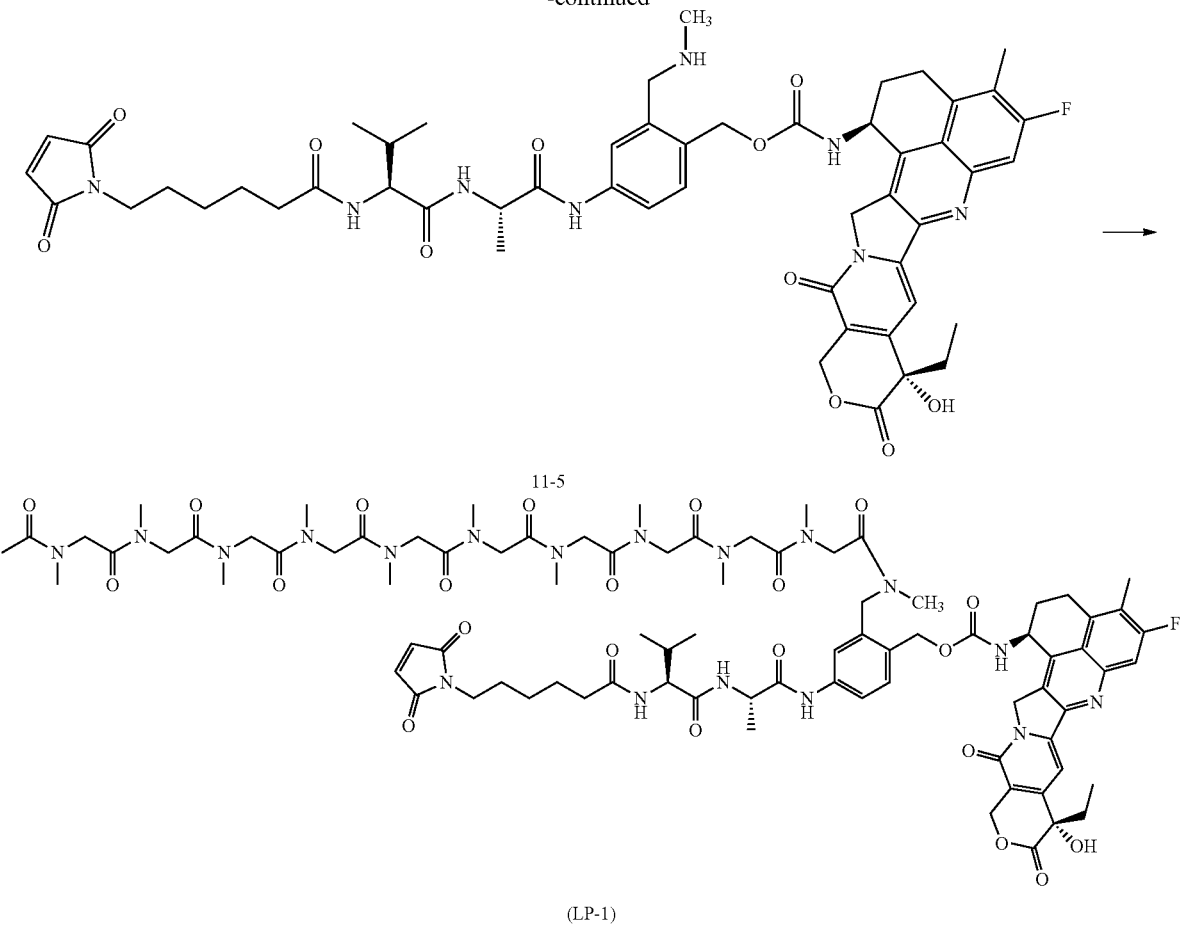

(LP-1)

Step 1: Synthesis of Intermediate 11-1

DCM (dichloromethane): MeOH (methanol) (v:v=2:1, 90 mL), and EEDQ (2-ethoxy-1-ethoxycarbonyl-1,2-dihydroquinoline; 1.86 g, 7.55 mmol) were added to a mixed solution of compound 11-1A (Mc-Val-Ala-OH, purchased from MedChemExpress Shanghai; 2.4 g, 6.29 mmol) and compound 11-1B (3.18 g, 6.29 mmol) at room temperature (20° C.~30° C.). The reaction solution was stirred at room temperature for 24 hours, and solvent therein was removed in vacuo. Then, a crude residue was further purified by flash chromatography to obtain compound 11-1 (3.9 g, 71%). LC-MS (ESI, m/z): 868.49 (M+H).

Step 2: Synthesis of Intermediate 11-2

Compound 11-1 (2 g, 2.3 mmol) was dissolved in anhydrous THF (tetrahydrofuran; 50 mL), and hydrogen fluoride-pyridine (4.6 g, 46 mmol) was added thereto under an argon atmosphere at 0° C. Then, the reaction mixture was stirred at 0° C. for 2 hours. The reaction was quenched by addition of water. A resultant mixture was extracted with DCM, and the organic phase therein was dried and concentrated. The residue was purified by silica gel chromatography to obtain compound 11-2 (1.1 g, 76%). LC-MS (ESI, m/z): 630.31 (M+H).

Step 3: Synthesis of Intermediate 11-3

Compound 11-2 (700 mg, 1.11 mmol) was dissolved in anhydrous DMF (N,N-dimethylformamide; 4 mL), and DIPEA (N,N-diisopropylethylamine; 0.39 ml, 2.23 mmol) and 4,4'-dinitrodiphenyl carbonate (406 mg, 1.33 mmol) were added thereto under an argon atmosphere at room temperature. Then, the reaction mixture was stirred at ambient temperature for overnight. Solvent in the reaction mixture was removed by concentration, and the product thus obtained was precipitated using MTBE (methyl tert-butyl ether). A yellow solid was collected by filtration, washed with diethyl ether, and dried to obtain compound 11-3. LC-MS (ESI, m/z): 795.41 (M+H).

Step 4: Synthesis of Intermediate 11-4

Compound 11-3 (300 mg, 0.44 mmol) was dissolved in anhydrous DMF (4 mL), and dried pyridine (1 mL) was added thereto, followed by addition of exatecan mesylate (purchased from MedChemExpress Shanghai; 234 mg, 0.44 mmol) and HOBt (1-hydroxybenztriazole; 60 mg, 0.44 mmol). The reaction mixture was stirred at room temperature under argon overnight. The product thus obtained was purified by pre-HPLC (preparative high-performance liquid chromatography) to obtain intermediate 11-4 (230 mg, 48%). LC-MS (ESI, m/z): 1091.53 (M+H).

Step 5: Synthesis of Intermediate 11-5

Compound 11-4 (200 mg, 0.183 mmol) was dissolved in 1 mL anhydrous DCM, and 300 μL TFA was added thereto at 0° C. The reaction mixture was stirred at room temperature for 30 min, and solvent therein was removed by concentration to obtain TFA salt of intermediate 11-5, which may be used in next step without further purification. LC-MS (ESI, m/z): 991.47 (M+H).

Step 6: Synthesis of Compound LP-1

Compound 11-5 (120 mg, 0.109 mmol) was dissolved in 1 mL anhydrous DMF, and Ac-Sar10-COOH (N-Acetyl Decasarcosine; 84 mg, 0.109 mmol) was added thereto, followed by addition of HATU (2-(7-azabenzotriazole)-N,N,N',N'-tetramethyluronium hexafluorophosphate; 50 mg, 0.130 mmol) and DIPEA (38 μL, 0.22 mmol). The reaction mixture was stirred at room temperature overnight, and the solvent therein was removed by concentration. The crude product was purified by pre-HPLC to obtain compound LP-1 (74 mg, 38%). LC-MS (ESI, m/z): 1743.85 (M+H).

Example 2: Preparation of Compound LP-2

Compound LP-3 was intermediate of LP-1. Removing Step 6, intermediate 11-5 would be LP-3.

Example 4: Preparation of Monoclonal Antibody Mu01 and Hu01

Balb/c mice (8-12 weeks of age) were immunized with a fragment of the extracellular region of human CD142 protein antigen (purchased from ACROBiosystems, product No. TF3-H52H5), and their serum titers were monitored to determine the number of immunizations. After the initial immunization, the mice were given three- or four-times booster immunizations, and the serum was collected for titer detection. The mice with qualified titers were given booster immunizations once, and the whole spleen and ½ lymph nodes were harvested and fused with myeloma SP2/0 cell line for PEG fusion. The fusion cells were cultured in plate. The supernatants were collected and screened for antigen by ELISA. The positive cells were transferred to a 96-well plate for further culture. After 7 days, supernatants were collected

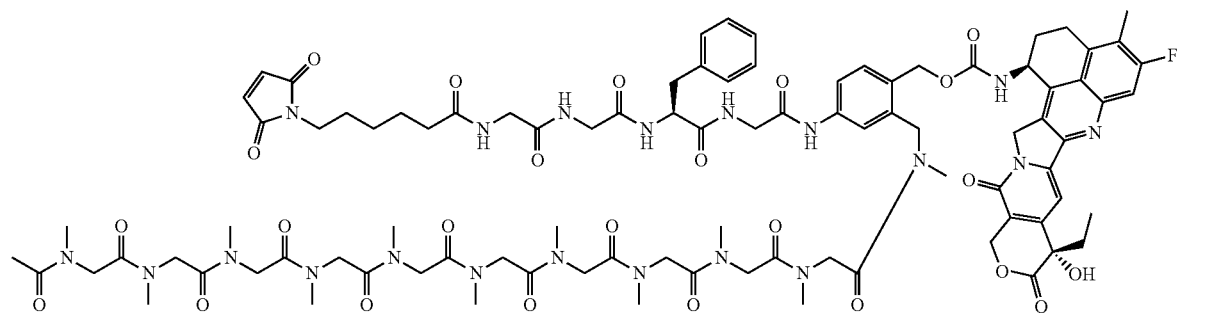

LP-2

The synthesis of compound LP-2 was conducted according to the synthesis steps of compound LP-1. The starting material 11-1A was replaced by Mc-GGFG-OH (purchased from MedChem Express Shanghai) to obtain compound LP-2 which was beige amorphous solid. LC-MS (ESI, mz): 1891.90 (M+H).

Example 3: Preparation of Compound LP-3 and assayed for reaction with antigen using ELISA. Positive cells were further tested for antigen binding affinity at different dilutions. 20 parental clones with the highest immunogen affinity entered the subclone. The monoclonal hybridoma cells were obtained by limited dilution and ELISA screening. The hybridoma cells were injected into the abdominal of mice to prepare ascites. After collection and purification, the monoclonal antibody, named Mu01,

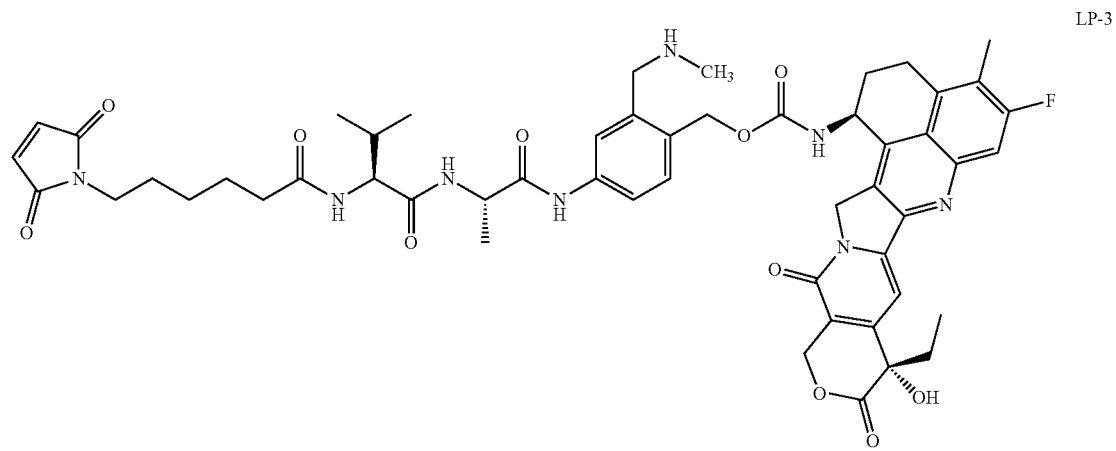 [SMILES: CC[C@@]1(O)C(=O)OCc2c1cc1n(c2=O)Cc2c-1nc1cc(F)c(C)c3c1c2[C@@H](NC(=O)OCc1ccc(NC(=O)[C@H](C)NC(=O)[C@@H](NC(=O)CCCCCN2C(=O)C=CC2=O)C(C)C)cc1CNC)CC3]

LP-3 was obtained. The variable region and CDRs of Mu01 were sequenced, as shown in Table 1. The amino acid sequences of CDRs were underlined.

TABLE 1

Hybridoma sequence

| variable region | Amino acid sequence (single-letter code) |
|---|---|
| VH | QVQLQQSGAELVRPGSSVKISCKASGYTFSSYWMYW VKQRPGQGLEWIGQIYPGDGDSNYNENFKGKATLTA DKSSSTAYMQLSSLTSEDSAVYFCTREGYGNRFAYW GQGTLVTVSA (SEQ ID NO: 6) |
| VL | QIVLTQSPALMSASPGEKVTMTCSASSSVSYMYWYQ QKPRSSPKPWINLTSNLASGVPARFSGRGSGTSYSL TISSMEAEDAATYYCQQWSYNPPTFGGGTKLEIK (SEQ ID NO: 7) |

The DNA sequence coding the VH were shown as SEQ ID NO: 18, and the DNA sequence coding the VL were shown as SEQ ID NO: 19.

The VH and VL of hybridoma sequences were modified to obtain the humanized 01 variable region (referred as to "Hu01"), as shown in Table 2. H1, H2, H3, H4 and H5 denoted the sequence codes of VH, respectively. L1, L2, L3, L4 and L5 denoted the sequence codes of VL, respectively. L3H1 (or Hu01-L3H1") indicated a humanized antibody including the light chain variable region coded L3 and the heavy chain variable region coded H1. L3H2 indicated a humanized antibody including the light chain variable region coded L3 and the heavy chain variable region coded H2. L5H1 indicated a humanized antibody including the light chain variable region coded L5 and the heavy chain variable region coded H1. L5H2 indicated a humanized antibody including the light chain variable region coded L5 and the heavy chain variable region coded H2.

For the purpose of preparation and/or detection in examples, the constant region of human IgG1 was selected as the constant region of the Hu01 antibody described above, wherein the heavy chain constant region and the light chain constant region were shown as SEQ ID NO: 35 and SEQ ID NO: 36, respectively.

Example 5: Preparation of Monoclonal Antibody Mu02 and Hu02

Balb/c mice (8-12 weeks of age) were immunized with a fragment of the extracellular region of human CD142 protein antigen (purchased from ACROBiosystems, product No. TF3-H52H5), and their serum titers were monitored to determine the number of immunizations. After the initial immunization, the mice were given three- or four-times booster immunizations, and the serum was collected for titer detection. The mice with qualified titers were given booster immunizations once, and the whole spleen and ½ lymph nodes were harvested and fused with myeloma SP2/0 cell line for PEG fusion. The fusion cells were cultured in plate. The supernatants were collected and screened for antigen by ELISA. The positive cells were transferred to a 96-well plate for further culture. After 7 days, supernatants were collected and assayed for reaction with antigen using ELISA. Positive cells were further tested for antigen binding affinity at different dilutions. 20 parental clones with the highest immunogen affinity entered the subclone. The monoclonal hybridoma cells were obtained by limited dilution and ELISA screening. The hybridoma cells were injected into the abdominal of mice to prepare ascites. After collection and purification, the monoclonal antibody named Mu02 was obtained. The amino acid sequences of and variable region and CDRs of Mu02 were determined, as shown in Table 3. The CDRs were underlined.

TABLE 2

Variable region sequences of Hu01

| | variable region | | Amino acid sequence (single-letter code) |
|---|---|---|---|
| VH | H1 | SEQ ID NO: 8 | QVQLVQSGAEVKRPGSSVKVSCKASGYTFSSYWMYWVRQAPGQGLEWIGQIYPGDGDSN YNENFQGRVTITADKSTSTAYMELSSLRSEDTAVYYCTREGYGNRFAYWGQGTLVTVSS |
| | H2 | SEQ ID NO: 9 | QVQLVQSGAEVKRPGSSVKVSCKASGYTFSSYWMYWVRQAPGQGLEWIGQIYPGDGDSN YNENFQGRVTITADKSTSTAYMELSSLTSEDSAVYFCTREGYGNRFAYWGQGTLVTVSS |
| | H3 | SEQ ID NO: 10 | QVQLVQSGAEVKRPGSSVKVSCKASGYTFSSYWMYWVRQAPGQGLEWIGQIYPG*Q*GDSN YNENFQGRVTITADKSTSTAYMELSSLRSEDTAVYYCTREGYGNRFAYWGQGTLVTVSS |
| | H4 | SEQ ID NO: 11 | QVQLVQSGAEVKRPGSSVKVSCKASGYTFSSYWMYWVRQAPGQGLEWIGQIYPG*Q*GD*A*N YNENFQGRVTITADKSTSTAYMELSSLTSEDSAVYFCTREGYGNRFAYWGQGTLVTVSS |
| | H5 | SEQ ID NO: 12 | QVQLVQSGAEVKRPGSSVKVSCKASGYTFSSYWMYWVRQAPGQGLEWIGQIYPG*Q*GD*A*N YNENFQGKATMTADKSMSTAYMQLSSLTSEDSAVYFCTREGYGNRFAYWGQGTLVTVSS |
| VL | L1 | SEQ ID NO: 13 | EIVLTQSPALLSLSPGERATLSCSASSSVSYMYWYQQKPGQAPRLLINLTSNLASGVPA RFSGRGSGTDFTLTISSLEPEDFAVYYCQQWSYNPPTFGGGTKVEIK |
| | L2 | SEQ ID NO: 14 | EIVLTQSPALMSLSPGERATLSCSASSSVSYMYWYQQKPRSAPRPWINLTSNLASGVPA RFSGRGSGTDFSLTISSLEAEDFATYYCQQWSYNPPTFGGGTKVEIK |
| | L3 | SEQ ID NO: 15 | EIVLTQSPALMSLSPGERATLSCSASSSVSYMYWYQQKPRSAPRPWIQLTSNLASGVPA RFSGRGSGTDFSLTISSLEAEDFATYYCQQWSYNPPTFGGGTKVEIK |
| | L4 | SEQ ID NO: 16 | QIVLTQSPALMSATPGEKVTMTCSASSSVSYMYWYQQLPRSSPKPWIQLTSNLASGVPA RFSGRGSGTSYSLTISSMEAEDAATYYCQQWSYNPPTFGGGTKLEIK |
| | L5 | SEQ ID NO: 17 | EIVLTQSPALLSLSPGERATLSCSASSSVSYMYWYQQKPGQAPRLLIQLTSNLASGVPA RFSGRGSGTDFTLTISSLEPEDFAVYYCQQWSYNPPTFGGGTKVEIK |

HCDR 2 were underlined, and amino acid substitutions were in bold italic.
The CDR of Mu01 and Hu01 was defined and numbered by IMGT system.

TABLE 3

| | Hybridoma sequence |
| --- | --- |
| variable region | Amino acid sequence (single-letter code) |
| VH | EVKLVESGGGLVQPGGSLRLSCATSGFTFTEYH MSWVRQPPGKALEWLGFIRNRANGYTTEYSASV KGRFTISRDNSQNILYLQMNTLRTEDSATYYCA RLTMVVAEFDYWGQGTTLTVSS (SEQ ID NO: 25) |
| VL | DIQMTQSPSSLSASLGGEVTITCKASQDINKYI AWYQHKPGKGPRLLIHYTSTLQPGIPSRFSGSG SGRDYSFSVSNLEPEDIATYYCLQYDNLLTFGA GTKLELK (SEQ ID NO: 26) |

The DNA sequence coding the VH were shown as SEQ ID NO: 37, and the DNA sequence coding the VL were shown as SEQ ID NO: 38.

The VH and VL of hybridoma sequences were modified to obtain the humanized 02 variable region (referred as to "Hu02"), as shown in Table 4. H1, H2, H3, H4, H5 and H6 denoted the sequence codes of VH, respectively. L1 and L2 denoted the sequence codes of VL, respectively. L1H1 indicated a humanized antibody including the light chain variable region coded L1 and the heavy chain variable region coded H1. L1H2 (or Hu02-L1H2) indicated a humanized antibody including the light chain variable region coded L1 and the heavy chain variable region coded H2. L1H3 indicated a humanized antibody including the light chain variable region coded L1 and the heavy chain variable region coded H3. L1H4 indicated a humanized antibody including the light chain variable region coded L1 and the heavy chain variable region coded H4. L1H5 indicated a humanized antibody including the light chain variable region coded L1 and the heavy chain variable region coded H5. L1H6 indicated a humanized antibody including the light chain variable region coded L1 and the heavy chain variable region coded H6. L2H1 indicated a humanized antibody including the light chain variable region coded L2 and the heavy chain variable region coded H1. L2H2 indicated a humanized antibody including the light chain variable region coded L2 and the heavy chain variable region coded H2. L2H3 indicated a humanized antibody including the light chain variable region coded L2 and the heavy chain variable region coded H3. L2H4 indicated a humanized antibody including the light chain variable region coded L2 and the heavy chain variable region coded H4. L2H5 indicated a humanized antibody including the light chain variable region coded L2 and the heavy chain variable region coded H5. L2H6 indicated a humanized antibody including the light chain variable region coded L2 and the heavy chain variable region coded H6.

TABLE 4

| | Variable region of Hu02 | | |
| --- | --- | --- | --- |
| | variable region | | Amino acid sequence (single-letter code) |
| VH | H1 | SEQ ID NO: 27 | EVQLVESGGGLVQPGGSLRLSCAASGFTFTEYHMSWVRQAPGKGLEWVGFIRNRANGYT TEYAASVKGRFTISRDDSKNSLYLQMNSLKTEDTAVYYCARLTMVVAEFDYWGQGTLVT VSS |
| | H2 | SEQ ID NO: 28 | EVQLVESGGGLVQPGGSLRLSCAASGFTFTEYHMSWVRQAPGKGLEWVGFIRNRAN*A*YT TEYAASVKGRFTISRDDSKNSLYLQMNSLKTEDTAVYYCARLTMVVAEFDYWGQGTLVT VSS |
| | H3 | SEQ ID NO: 29 | EVQLVESGGGLVQPGGSLRLSCAASGFTFTEYHMSWVRQAPGKGLEWVGFIRNRA*Q*GYT TEYAASVKGRFTISRDDSKNSLYLQMNSLKTEDTAVYYCARLTMVVAEFDYWGQGTLVT VSS |
| | H4 | SEQ ID NO: 30 | EVQLVESGGGLVQPGGSLRLSCAASGFTFTEYHMSWVRQAPGKGLEWVGFIRNRANGYT TEYAASVKGRFTISRDNSKNSLYLQMNTLRTEDTAVYYCARLTMVVAEFDYWGQGTLVT VSS |
| | H5 | SEQ ID NO: 31 | EVQLVESGGGLVQPGGSLRLSCAASGFTFTEYHMSWVRQAPGKGLEWVGFIRNRAN*A*YT TEYAASVKGRFTISRDNSKNSLYLQMNTLRTEDTAVYYCARLTMVVAEFDYWGQGTLVT VSS |
| | H6 | SEQ ID NO: 32 | EVQLVESGGGLVQPGGSLRLSCAASGFTFTEYHMSWVRQAPGKGLEWVGFIRNRA*Q*GYT TEYAASVKGRFTISRDNSKNSLYLQMNTLRTEDTAVYYCARLTMVVAEFDYWGQGTLVT VSS |
| VL | L1 | SEQ ID NO: 33 | DIQMTQSPSSLSASVGDRVTITCQASQDINKYLNWYQHKPGKGPKLLIYYTSTLQTGVP SRFSGSGSGTDFTFTVSNLQPEDIATYYCLQYDNLLTFGQGTKLEIK |
| | L2 | SEQ ID NO: 34 | AIQMTQSPSSLSASVGERVTITCRASQDINKYLNWYQHKPGKGPKLLIYYTSTLQTGVP SRFSGSGSGTDFTFTVSNLQPEDIATYYCLQYDNLLTFGQGTKLEIK |

HCDR 2 were underlined, and amino acid substitutions were in bold italic.
The CDRs of Mu02 and Hu02 was defined and numbered by IMGT system.

For the purpose of preparation and/or detection in examples, the heavy chain constant region sequence and light chain constant region sequence of the Hu02 antibodies are the same as those of the humanized antibody in Example 4.

Example 6: Detection Method of Antibody-Drug Conjugate

According to the following method, antibody-drug conjugates were concentrated, medium-exchanged, and purified, and concentration of antibodies was measured, and an average number of drug molecules carried by each antibody was calculated, so as to identify antibody-drug conjugates.

Operation A: Concentration of Antibody or Antibody-Drug Conjugate

An ultrafiltration tube (Amicon Ultra, 50000 MWCO, Millipore Corporation) was taken out, antibody or antibody-drug conjugate solution to be concentrated was add thereto. The ultrafiltration tube was centrifuged until the antibody or antibody-drug conjugate solution therein reached to a required volume, and then taken out.

Operation B: Measurement of Antibody Concentration

An absorbance of the antibody was measured using a microplate reader (Multiskan GO, Thermo Fisher Scientific) according to the method defined by the manufacturer. The concentration of the antibody is the ratio of the absorption value to the absorption coefficient of the antibody at the detection wavelength.

Operation C: Medium Exchange of Antibody

According to the instructions provided by the manufacturer (Thermo Fisher Scientific), a Zeba spin desalting column (5 mL, 40K MWCO) was previously equilibrated with phosphate buffered saline (referred to as "PBS7.0/EDTA", 50 mM, pH 7.0) containing sodium chloride (50 mM) and EDTA (2 mM). 2 mL sample was loaded on each Zeba spin desalting column, and centrifuged (1000 g, 4 min). Thereafter, a flow-through fraction was collected and concentrated by Operation A, the antibody concentration was determined by Operation B, and the antibody concentration was adjusted with PBS7.0/EDTA.

Operation D: Purification of Antibody-Drug Conjugate

According to the instructions provided by the manufacturer (Thermo Fisher Scientific), a Zebaspin desalting column (5 mL, 40K MWCO) was previously equilibrated with storage buffer. Histidine-acetate buffer (20 mM histidine, pH 5.5) containing 150 mM NaCl or phosphate buffer (50 mM, pH 7.0) containing 50 mM NaCl was used as storage buffer. The reaction solution containing the antibody-drug conjugate (about 2 mL) was applied to the Zeba spin desalting column (5 mL), and centrifuged (1000 g, 4 min). Thereafter, a flow-through fraction (about 2 mL) was collected, and an elution process was repeated twice to remove the unbound linker-payload and low molecular weight compounds including reducing agents.

Operation E: Measurement of Concentration of Antibody in the Antibody-Drug Conjugate and Average Number of Drug Molecules Connected to Each Antibody (DAR Value)–(1)

The concentration of the drug conjugated on the antibody-drug conjugate can be obtained by measuring the UV absorption values of the antibody-drug conjugate aqueous solution at 280 nm and 370 nm and calculating by the following formula.

At any given wavelength, a total absorbance of a system is equal to the sum of the absorbances of all light-absorbing chemicals present in the system (additivity of absorbance). Therefore, assuming that the molar absorption coefficient of the antibody and the drug remains unchanged before and after conjugation of the antibody and the drug, the concentration of antibody and that of the drug in the antibody-drug conjugate can be expressed by the following formulas.

$$A_{280} = A_{D,280} + A_{A,280} = \varepsilon_{D,280}C_D + \varepsilon_{A,280}C_A \quad \text{Equation (1)}$$

$$A_{370} = A_{D,370} + A_{A,370} = \varepsilon_{D,370}C_D + \varepsilon_{A,370}C_A \quad \text{Equation (2)}$$

$A_{280}$ represents a total absorption value of the antibody-drug conjugate aqueous solution at 280 nm, $A_{370}$ represents a total absorption value of the antibody-drug conjugate aqueous solution at 370 nm. $A_{A,280}$ represents a absorption value of the antibody at 280 nm, $A_{D,370}$ represents a absorption value of the antibody at 370 nm, $A_{D,280}$ represents a absorption value of the drug molecule at 280 nm, $A_{D,370}$ represents a absorption value of the drug molecule at 370 nm, $\varepsilon_{A,280}$ represents a molar extinction coefficient of the antibody at 280 nm, $\varepsilon_{A,370}$ represents a molar extinction coefficient of the antibody at 370 nm, $\varepsilon_{D,280}$ represents a molar extinction coefficient of the drug molecule at 280 nm, $\varepsilon_{D,370}$ represents a molar extinction coefficient of the drug molecule at 370 nm, $C_A$ represents concentration of antibody in antibody-drug conjugate, and $C_D$ represents concentration of drug molecule in antibody-drug conjugate.

In this case, $\varepsilon_{A,280}$, $\varepsilon_{A,370}$, $\varepsilon_{D,280}$, and $\varepsilon_{D,370}$ are all known values (calculated from the sequence of the antibody or measured by the UV absorption of the compound). For example, $\varepsilon_{A,280}$ can be calculated from the amino acid sequence of the antibody using a known method (Protein Science, 1995, Vol. 4, pp. 2411-2423). The antibody usually has no absorbance at 370 nm, and thus $\varepsilon_{A,370}$ is usually 0. The values of $\varepsilon_{D,280}$ and $\varepsilon_{D,370}$ can be calculated by measuring the change of absorbance of drug molecule with concentration at 280 nm and 370 nm, respectively, and using Lambert-Beer law (absorbance=molar concentration×molar extinction coefficient×optical path). $C_A$ and $C_D$ can be obtained by measuring the absorbance values $A_{280}$ and $A_{370}$ of antibody-drug conjugates at 280 nm and 370 nm, and then solving the simultaneous equations (1) and (2). In addition, the average number of drug molecules connected to each antibody (DAR value) can be obtained by dividing $C_D$ by $C_A$.

Operation F: Average Number of Drug Molecules Connected to Each Antibody (DAR Value)–(2)

In addition to the aforementioned "Operation E", the average number of drug molecules conjugated to each antibody molecule in the antibody-drug conjugate may also be determined using the hydrophobic interaction chromatography (HIC) analysis method described below.

The elution of antibody-drug conjugate on hydrophobic interaction chromatography column was based on differences in concentration of salt ions in the eluent, as the concentration of salt ions decreases, the number of small molecule drugs in the eluted antibody-drug conjugates increases, that is, antibody-drug conjugate with low DAR value was preferentially eluted. The peak order of each component was D0 (antibody unconjugated to any linker-payload), D2 (antibody conjugated to about 2 linkers-payloads in average), D4 (antibody conjugated to about 4 linkers-payloads in average), D6 (antibody conjugated to about 6 linkers-payloads in average), D8 (antibody conjugated to about 8 linkers-payloads in average). The percentage content of each component can be obtained by measuring the peak area ratio of each peak. Then the HIC-DAR of corresponding samples are calculated as follows:

Average number of conjugated drug molecules =

D0 peak area ratio × 0 + D2 peak area ratio × 2 +

D4 peak area ratio × 4 + D6 peak area ratio × 6 + D8 peak area ratio × 8

Operation G: Measurement of Aggregates in Antibody-Drug Conjugate

Aggregates in the antibody-drug conjugate were detected using size exclusion chromatography in high performance liquid chromatography. The method was as follows.

High performance liquid chromatography system: Agilent 1260 Infinity II HPLC system Detector: Ultraviolet absorption spectrometer (Detection wavelength: 280 nm)

Figure 2A:
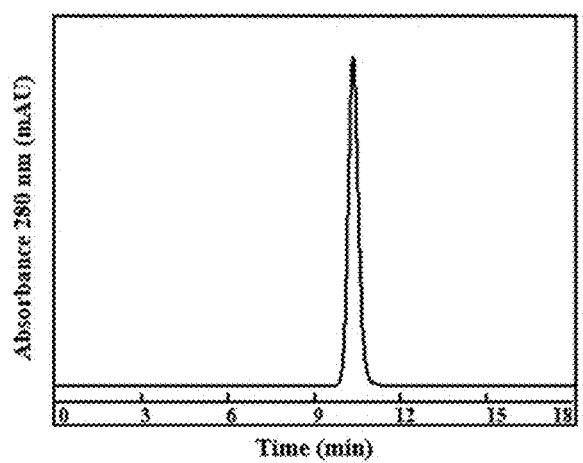
FIGS. 2A and 2B show the detection graphs of size exclusion chromatography and hydrophobic interaction chromatography of Hu02-L1H2 naked antibody prepared by Example 5, respectively; Hu02-L1H2 naked antibody is used as quality control substance.

Column type: TOSOH TSKgel G3000SWXL (7.8×300 mm, 5 μm)
Mobile phase: 200 mmol/L KHPO$_4$, 150 mmol/L NaCl, 15% (v/v) isopropyl alcohol, pH7.0
Flow rate: 0.75 mL/min
Analysis time: 18 min
Column temperature: Room temperature
Injection volume: 50 μg
Data analysis: substance A size exclusion chromatogram of a quality control substance (QC, Hu01-L3H1 naked antibody, i.e., humanized antibody coded L3H1 derived from Mu01 was not conjugated to a linker-payload) was shown in FIG. 1A; a size exclusion chromatogram of a quality control substance (QC, Hu02-L1H2 naked antibody, i.e., the antibody coded L1H2 derived from antibody Mu02 was not conjugated to linker-payload) was shown in FIG. 2A. A retention time of the main peak (single peak) of quality control substance of 150 kDa was between 9.5 and 10.5 minutes. The retention time of the aggregates should be earlier than that of the above-mentioned monomers.

Operation H: Comparison of Hydrophobicity of Antibody-Drug Conjugates

Figure 1B:
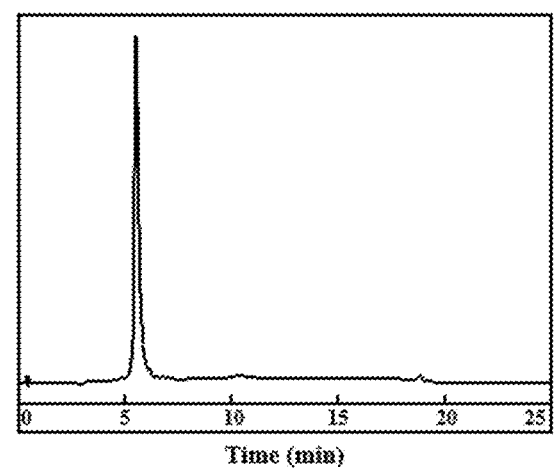
Figure 2B:
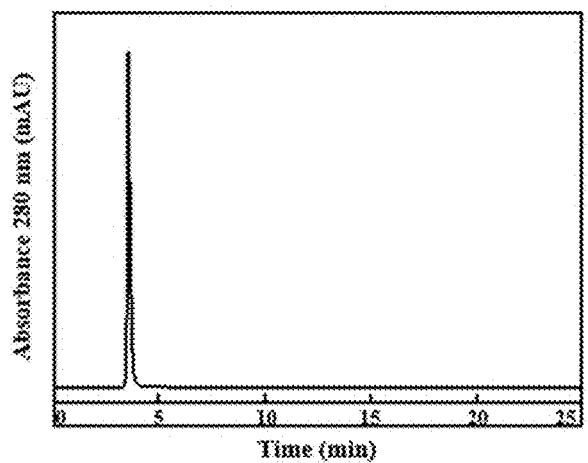

The hydrophobicity of antibody-drug conjugates was analyzed using high performance liquid chromatography hydrophobic interaction chromatography (HIC). The method was follows:
High performance liquid chromatography system: Agilent 1260 Infinity II HPLC system
Detector: Ultraviolet absorption spectrometer (Detection wavelength: 280 nm)
Column type: TOSOH TSKgel Butyl-NPR (4.6 mm I.D.× 3.5 cm, 2.5 μm)
Mobile phaseA: mol/L (NH$_4$)$_2$SO$_4$, 50 mmol/L KHPO$_4$, pH7.0
Mobile phaseB: 50 mmol/L KHPO$_4$, 25% (v/v) isopropanol, pH7.0
Analysis time: 25 min
Column temperature: Room temperature
Elution procedure (B %): 0%-25% (0-1 minutes), 25% (1-3 minutes), 25%-80% (3-13 minutes), 80% (13-17 minutes), 80%-0% (17-17.10 minutes), 0% (17.10-25 minutes)
Injection volume: 10 μL
Data analysis: A hydrophobic interaction chromatography chromatogram of a quality control material (QC, Hu01-L3H1 naked antibody) was shown in FIG. 1B. A hydrophobic chromatogram of a quality control material (QC, Hu02-L1H2 naked antibody) was shown in FIG. 2B. The sample with a shorter retention time was less hydrophobic. The antibody-drug conjugate was more hydrophobic than the unconjugated naked antibody, thus a retention time thereof was longer.

Example 7: Preparation of Antibody-Drug Conjugate Hu01-L3H1-LP1-DAR8

Reduction of the antibody: a medium of the Hu01-L3H1 antibody was exchanged with PBS7.0/EDTA by operation B (an extinction coefficient of the antibody at 280 nm was 1.658 mL mg$^{-1}$ cm$^{-1}$) and operation C in Example 6, and a concentration of the antibody after medium exchange was 7.353 mg/mL. 19.51 μL of 5 mM TCEP solution (corresponding to 7 times equivalent of the content of the antibody) was added to 284.24 μL of Hu01-L3H1 antibody aqueous solution, and 76 μL of 50 mM phosphate buffer (PBS7. 0) and 0.26 μL ultrapure water were added thereto at the same time. The mixed solution was placed in an environment of 37° C. to react for 2 hours.

Conjugation of antibody and linker-payload: the above mixed solution was incubated at 4° C. for 10 minutes. The linker-payload LP-1 prepared in Example 1 was dissolved in N, N-dimethylacetamide (DMA), and 20.90 μL (corresponding to 15 times equivalent of the content of the antibody) of the solution then was added to the mixed solution. The reaction of the mixed solution continued at 22° C. for 30 minutes.

Purification of the antibody-drug conjugate: the above reaction solution was purified by the method of operation D in Example 6 to obtain antibody-drug conjugate Hu01-L3H1-LP1-DAR8.

Characterization of the antibody-drug conjugate: the obtained antibody-drug conjugate was characterized using operation E ($\varepsilon_{D,280}$=6384 and $\varepsilon_{D,370}$=16180), operation F, operation G, and operation H in Example 6.

Figure 3A:
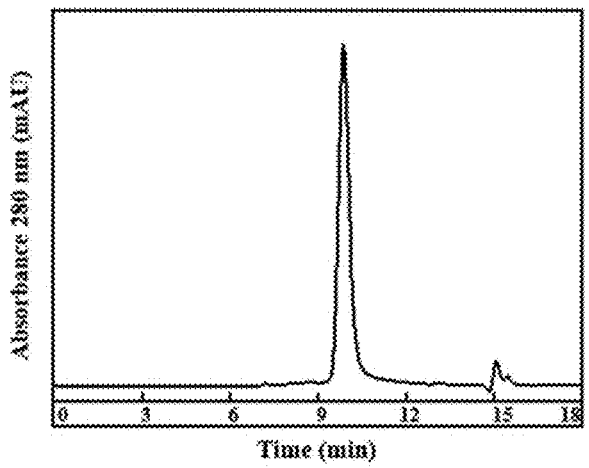
FIGS. 3A and 3B show the detection graphs of size exclusion chromatography and hydrophobic interaction chromatography of antibody-drug conjugate Hu01-L3H1-LP1-DAR8 prepared in Example 7, respectively.
Figure 3B:
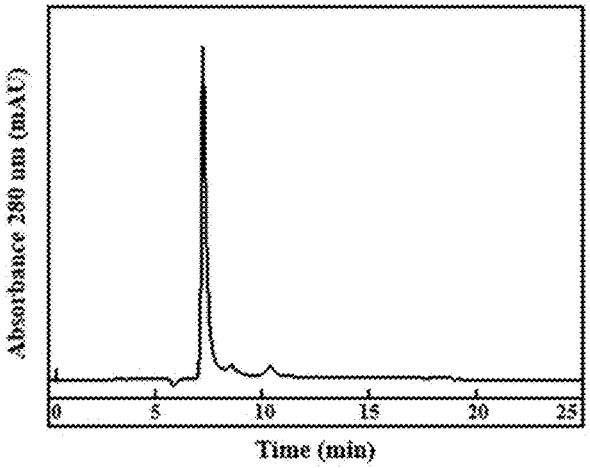

The concentration of the antibody-drug conjugate measured and calculated by operation E was 4.93 mg/mL, and an average number of payloads conjugated per antibody measured and calculated by operation E was 7.67. FIG. 3A showed a detection graph of aggregates, and a content of the aggregates in the antibody-drug conjugate Hu01-L3H1-LP1-DAR8 measured by operation G was 1.33%. FIG. 3B showed a detection graph of the hydrophobic interaction chromatography of the antibody-drug conjugate Hu01-L3H1-LP1-DAR8, and a retention time of the antibody-drug conjugate measured by operation H was 7.199 min.

Example 8: Preparation of Antibody-Drug Conjugate Hu01-L3H1-LP1-DAR4

Reduction of the antibody: a medium of the Hu01-L3H1 antibody was exchanged with PBS7.0/EDTA by operation B (an extinction coefficient of the antibody at 280 nm was 1.658 mL mg$^{-1}$ cm$^{-1}$) and operation C in Example 6, and a concentration of the antibody after medium exchange was 22.51 mg/mL. 40 μL of 5 mM TCEP solution (corresponding to 2.5 times equivalent of the content of the antibody) was added to 533.10 μL of Hu01-L3H1 antibody aqueous solution, and 320 μL of 50 mM phosphate buffer (PBS7. 0) and 706.90 μL ultrapure water were added thereto at the same time. The mixed solution was placed in an environment of 37° C. to react for 2 hours.

Conjugation of antibody and linker-payload: the above mixed solution was incubated at 4° C. for 10 minutes. The linker-payload LP-1 prepared in Example 1 was dissolved in DMA, and 64 μL (corresponding to 8 times equivalent of the content of the antibody) of the solution was added to the mixed solution. The reaction of the mixed solution continued at 22° C. for 30 minutes.

Purification of the antibody-drug conjugate: the above reaction solution was purified by the method of operation D in Example 6 to obtain antibody-drug conjugate Hu01-L3H1-LP1-DAR4.

Characterization of the antibody-drug conjugate: the obtained antibody-drug conjugate was characterized using operation E ($\varepsilon_{D,280}=^{6384}$ and $\varepsilon_{D,370}$=16180), operation F, operation G, and operation H in Example 6.

Figure 4A:
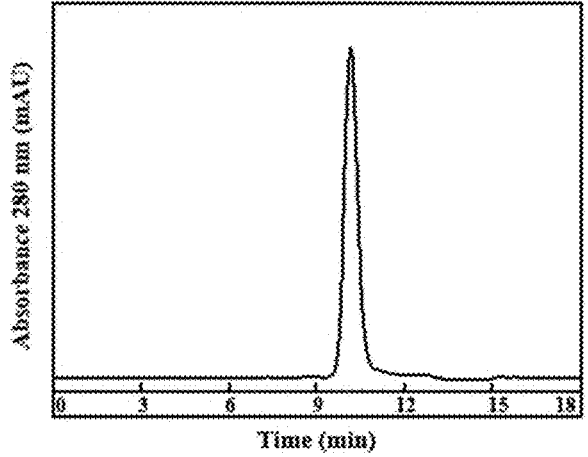
FIGS. 4A and 4B show the detection graphs of size exclusion chromatography and hydrophobic interaction chromatography of antibody-drug conjugate Hu01-L3H1-LP1-DAR4 prepared in Example 8, respectively.
Figure 4B:
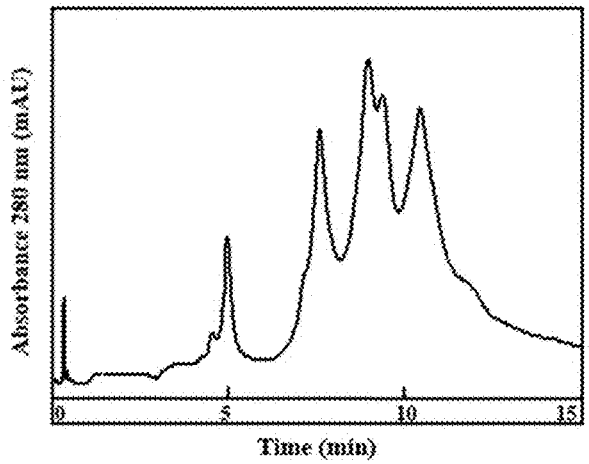

The concentration of the antibody-drug conjugate measured and calculated by operation E was 7.19 mg/mL, and an average number of payloads conjugated per antibody measured and calculated by operation E was 4.66. FIG. 4A showed a detection graph of aggregates, and a content of the aggregates in the antibody-drug conjugate Hu01-L3H1-LP1-DAR4 measured by operation G was 1.16%. FIG. 4B showed a detection graph of the hydrophobic interaction chromatography of a retention time distribution of the antibody-drug conjugate measured by operation H.

Example 9: Preparation of Antibody-Drug Conjugate Hu02-L1H2-LP1-DAR8

Reduction of the antibody: a medium of the Hu02-L1H2 antibody was exchanged with PBS7.0/EDTA by operation B (an extinction coefficient of the antibody at 280 nm was 1.382 mL mg$^{-1}$ cm$^{-1}$) and operation C in Example 6, and a concentration of the antibody after medium exchange was 11.98 mg/mL. 106.67 µL of 5 mM TCEP solution (corresponding to 10 times equivalent of the content of the antibody) was added to 667.78 µL of Hu02-L1H2 antibody aqueous solution, and 320 µL of 50 mM phosphate buffer (PBS7.0) and 505.50 µL ultrapure water were added thereto at the same time. The mixed solution was placed in an environment of 37° C. to react for 2 hours.

Conjugation of antibody and linker-payload: the above mixed solution was incubated at 4° C. for 10 minutes. The linker-payload LP-1 prepared in Example 1 was dissolved in DMA, and 80 µL (corresponding to 15 times equivalent of the content of the antibody) of the solution was added to the mixed solution. The reaction of the mixed solution continued at 22° C. for 30 minutes.

Purification of the antibody-drug conjugate: the above reaction solution was purified by the method of operation D in Example 6 to obtain antibody-drug conjugate Hu02-L1H2-LP1-DAR8.

Characterization of the antibody-drug conjugate: the obtained antibody-drug conjugate was characterized using operation E ($\varepsilon_{D,280}=6384$ and $\varepsilon_{D,370}=16180$), operation F, operation G, and operation H in Example 6.

Figure 5A:
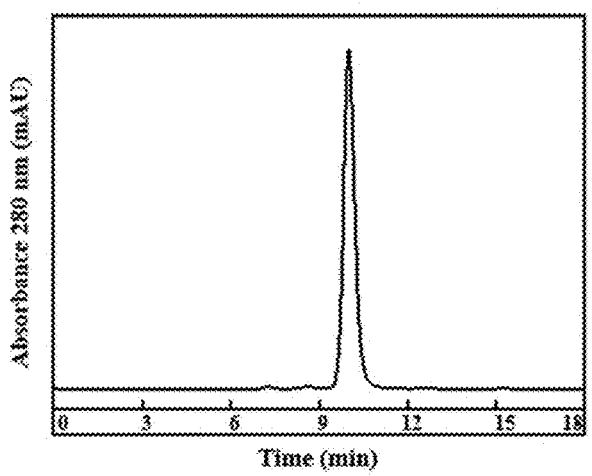
FIGS. 5A and 5B show the detection graphs of size exclusion chromatography and hydrophobic interaction chromatography of antibody-drug conjugate Hu02-L1H2-LP1-DAR8 prepared in Example 9, respectively.
Figure 5B:
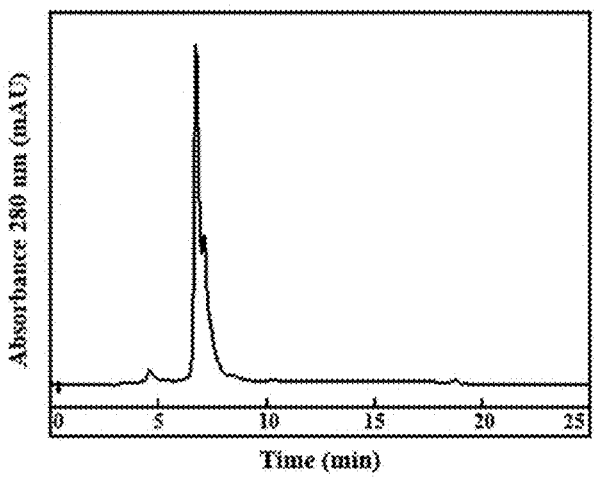

The concentration of the antibody-drug conjugate measured and calculated by operation E was 5.03 mg/mL, and an average number of payloads conjugated per antibody measured and calculated by operation E was 7.83. FIG. 5A showed a detection graph of aggregates, and a content of the aggregates in the antibody-drug conjugate Hu02-L1H2-LP1-DAR8 measured by operation G was 1.31%. FIG. 5B showed a detection graph of the hydrophobic interaction chromatography of the antibody-drug conjugate measured, and a retention time of the antibody-drug conjugate measured by operation H was 6.768 min.

Comparative Example 1: Preparation of Antibody-Drug Conjugate HuIgG-LP1-DAR8

Reduction of the antibody: a medium of the human IgG antibody was exchanged with PBS7.0/EDTA by operation B (an extinction coefficient of the antibody at 280 nm was 1.35 mLmg$^{-1}$ cm$^{-1}$) and operation C in Example 6, and a concentration of the antibody after medium exchange was 10 mg/mL. 0.267 mL of 5 mM TCEP solution (corresponding to 10 times equivalent of the content of the antibody) was added to 1.33 mL of human IgG protein aqueous solution (purchased from Beijing Solarbio Science & Technology Co., Ltd. product No. SP001), and 0.4 mL of 50 mM PBS7.0 was added thereto at the same time. After confirming that the pH of the solution was 7.0±0.1, the mixture was placed in an environment of 37° C. to react for 2 hours.

Conjugation of antibody and linker-payload: the above mixed solution was incubated at 4° C. for 10 minutes. The linker-payload LP-1 was dissolved in DMA, and 0.2 mL (corresponding to 15 times equivalent of the content of the antibody) of the solution then was added to the mixed solution. The reaction of the mixed solution continued at 22° C. for 30 minutes.

Purification of the antibody-drug conjugate: the above reaction solution was purified by the method of operation D in Example 6 to obtain antibody-drug conjugate HuIgG-LP1-DAR8.

Characterization of the antibody-drug conjugate: the obtained antibody-drug conjugate was characterized using operation E ($\varepsilon_{D,280}=6384$ and $\varepsilon_{D,370}=16180$), operation G, and operation H in Example 6.

Figure 6A:
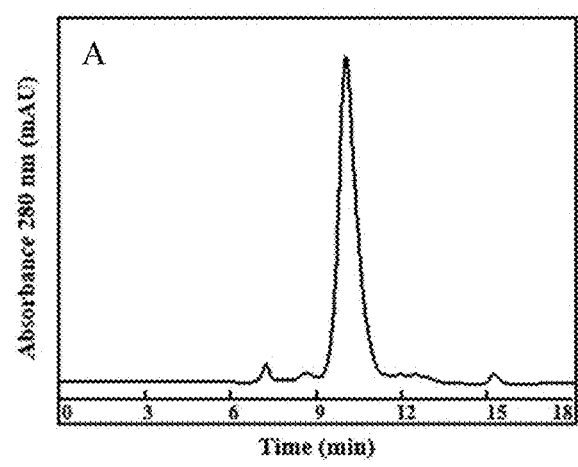
FIGS. 6A and 6B show the detection graphs of size exclusion chromatography and hydrophobic interaction chromatography of antibody-drug conjugate HuIgG-LP1-DAR8 prepared in Comparative Example 1, respectively.
Figure 6B:
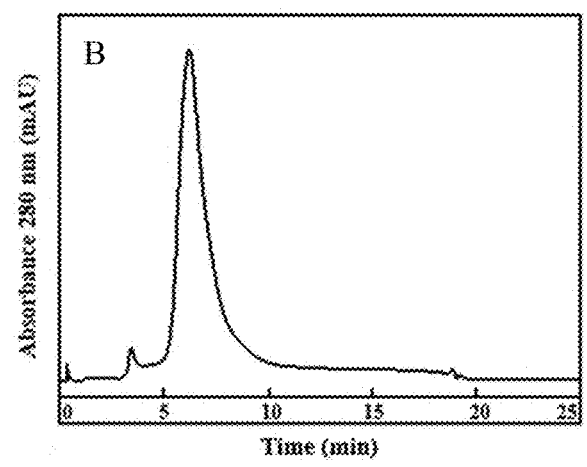

The concentration of the antibody-drug conjugate measured and calculated by operation E was 11.08 mg/mL, and an average number of payloads conjugated per antibody measured and calculated by operation E was 9.15. FIG. 6A showed a detection graph of aggregates, and a content of the aggregates in the antibody-drug conjugate HuIgG-LP1-DAR8 measured by operation G was 4.38%. FIG. 6B showed a detection graph of the hydrophobic interaction chromatography of the antibody-drug conjugate HuIgG-LP1-DAR8, and a retention time of the antibody-drug conjugate Human IgG-LP1 measured by operation H was 6.213 min.

Comparative Example 2: Preparation of Antibody-Drug Conjugate Tisotumab-MMAE (Referred to as: Reference ADC)

The sequences of antibody Tisotumab (referred to as: Reference Antibody) was recorded in PCT/EP2009/066755 (VH: SEQ ID NO:9; VL: SEQ ID NO:65), in which the antibody was named as TF-11.

Reduction of the antibody: a medium of the antibody was exchanged with PBS7.0/EDTA by operation B (an extinction coefficient of the antibody at 280 nm was 1.508 mLmg$^{-1}$ cm$^{-1}$) and operation C in Example 6, and a concentration of the antibody after medium exchange was 7.318 mg/mL. 23.21 µL of 5 mM TCEP solution (corresponding to 2.04 times equivalent of the content of the antibody) was added to 1127.36 µL of reference antibody aqueous solution, and 300 µL of 50 mM PBS7.0 and 49.43 µL of ultrapure water were added thereto at the same time. The mixture was placed in an environment of 37° C. to react for 2 hours.

Conjugation of antibody and linker-payload: the above mixed solution was incubated at 4° C. for 10 minutes. The linker-payload vc-MMAE (DC Chemicals, DC50025) was dissolved in DMA, 79.66 µL (corresponding to 7 times equivalent of the content of the antibody) of the solution then was added to the mixed solution. The reaction of the mixed solution continued at 22° C. for 30 minutes.

Purification of the antibody-drug conjugate: the above reaction solution was purified by the method of operation D in Example 6 to obtain antibody-drug conjugate Reference ADC.

Characterization of the antibody-drug conjugate: the obtained antibody-drug conjugate was characterized using operation B, operation F, operation G and operation H in Example 6.

Figure 7A:
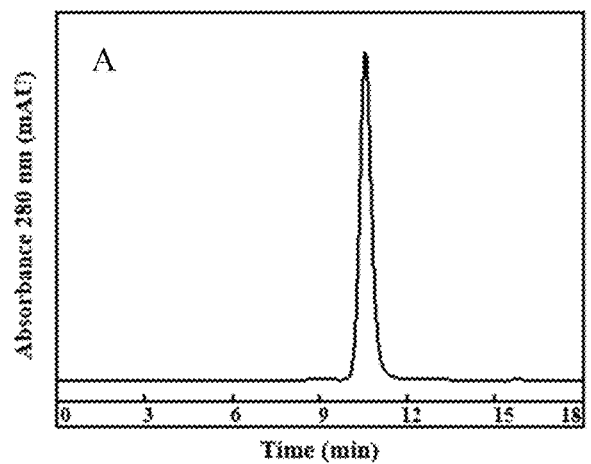
FIGS. 7A and 7B show the detection graphs of size exclusion chromatography and hydrophobic interaction chromatography of reference ADC prepared in Comparative Example 2, respectively.
Figure 7B:
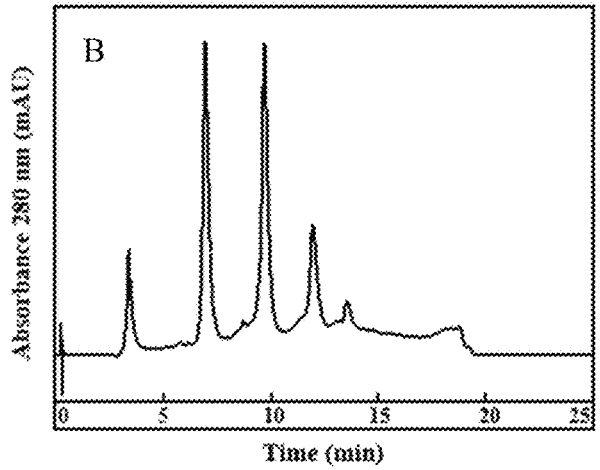

The concentration of antibody-drug conjugate calculated by operation B measurement was 5.01 mg/mL. An average number of payloads conjugated per antibody in the Reference ADC measured and calculated by operation F and operation G was 3.73. FIG. 7A showed a detection graph of aggregates, and a content of the aggregates in the Reference ADC measured by operation G was 0.92%. FIG. 7B showed a detection graph of the hydrophobic interaction chromatography of the Reference ADC measured by operation H.

The HNSTD (maximum dose without severe toxicity) of the Reference ADC for cynomolgus monkeys was 3 mg/kg.

Experimental Example 1: Affinity Assay of Mu01 and Mu02 on BXPC3 Cells

BxPC3 cells (Human pancreatic cancer cells, obtained from National Collection of Authenticated Cell Cultures) were digested in culture dish with trypsin (purchased from Gibco, Product No. 25200072). Digested cells were centrifuged at 1000 rpm for 5 min and blocked with 10% goat serum (purchased from SenBeiJia Biological Technology Co., Ltd., Product No.SRJ-SE-GO012) for 30 min. Then Mu01 and Mu02 antibodies respectively prepared in Example 4 and Example 5 were added at a final concentration of 20 μg/mL and incubated for 1 h. After washing with Phosphate buffer (PBS, PH 7.2-7.4) for 2 times, FITC-labeled goat anti-mouse antibody (purchased from Jackson ImmunoResearch, No. 115-545-003) was added at 1:500 and incubated for 1 hour. Analyzed the resulting product by flow cytometry after washing with PBS for 2 times.

Figure 8:
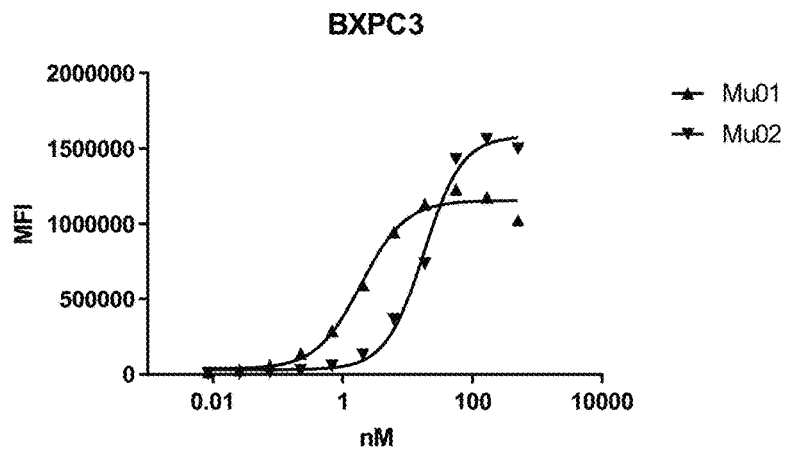
FIG. 8 shows a flow cytometry graph of endocytosis of BxPC3 cells to antibody Mu01 prepared by Example 4 and antibody Mu02 prepared by Example 5. MFI is the abbreviation of mean fluorescent intensity.

As shown in FIG. 8, both Mu01 and Mu02 showed good affinity for BXPC3 cells which were CD142 positive.

Experimental Example 2: In Vitro Killing Assay of Mu01 and Mu02 on MDA-MB-231 Cells MDA-MB-231 (human breast cancer, derived from Zhejiang Meisen Cell Technology Co., LTD.) cells were cultured so that a cell density reached 80%. The cells were collected and added into a 96-well plate, and the cell density was adjusted to $2-5\times10^4$/mL. Each well was added with 100 μl. Mu01 prepared in Example 4, Mu02 prepared in Example 5 or negative control IgG (murine anti-IgG, purchased from Abmart Medical Technology (Shanghai) Co., LTD., product No. M070890) was serially diluted 3 times with an initial concentration of 30 nM, and then was added to the cell culture medium. 2 μg/mL of goat anti-mouse antibody conjugated with MMAE (goat anti-mouse antibody purchased from Jackson, catalog No. 115-545-003) was added at the same time. The cells were cultured for 3 days. Cell survival was observed regularly during the period. 3 days later, 15 μL CCK-8 kit stock solution (purchased from Abbkine, catalog No. ATUOC1303) was directly added to the 96-well plate. After 0.5 to 2 hours of reaction in the incubator at 37° C., an absorbance at 450 nm was detected using a microplate reader, and the cell survival curves were drawn according to the absorbance values and antibody dilution gradient.

The method of goat anti-mouse antibody conjugated to MMAE was similar to the method in Comparative Example 2.

Figure 9:
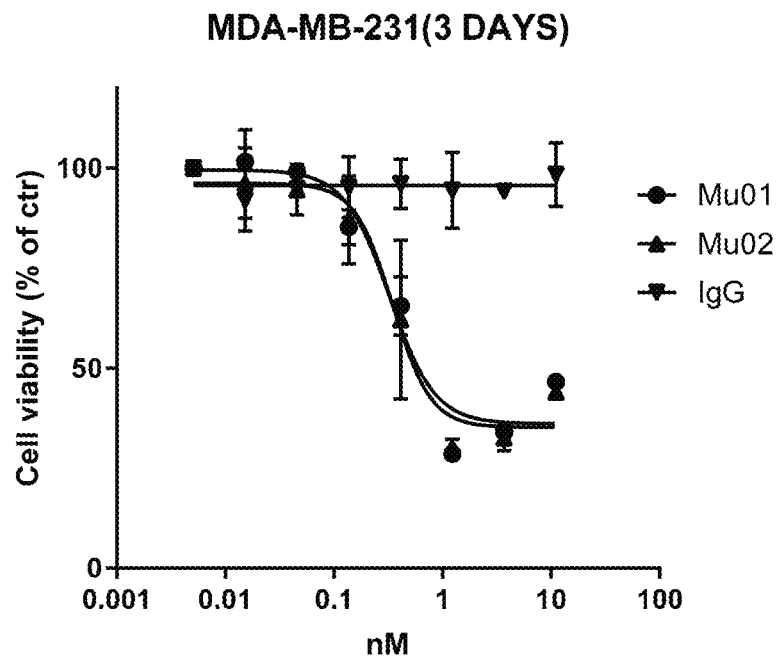
FIG. 9 shows a cell viability-concentration changing curves of MDA-MB-231 cells to antibody Mu01 prepared by Example 4 and antibody Mu02 prepared by Example 5.

As shown in FIG. 9, in the human breast cancer cell line MDA-MB-231, the cell survival rate decreased continuously with the increase of the concentration of Mu01 and Mu02, indicating that antibodies Mu01 and Mu02 had obvious killing effect on tumor cells.

Experimental Example 3: Affinity Assay of Hu01 Candidate Molecule on BXPC3 Cells BxPC3 cells (Human pancreatic cancer cells, obtained from National Collection of Authenticated Cell Cultures) were digested in culture dish with trypsin (purchased from Gibco, Product No. 25200072). Digested cells were centrifuged at 1000 rpm for 5 min and blocked with 10% goat serum (purchased from SenBeiJia Biological Technology Co., Ltd., Product No.SRJ-SE-GO012) for 30 min. Then Hu01 antibodies L5H2, L5H1, L3H1, L3H2 prepared in Example 4 were diluted with a 3-fold gradient at the initial concentration of 500 nM. After that, the Hu01 antibody was added to the cells and incubated for 1 h. After washing twice with PBS, FITC-labeled goat anti-human antibody (purchased from Sigma, product No. FS9512-2ML) was added at 1:500 and incubated for 1 h. The results were analyzed by flow cytometry after washing twice with PBS.

Ch01 antibody was a chimeric antibody, of which the variable regions were the same as those of Mu01 prepared in Example 4, and the constant region was the same as human IgG1 described in Example 4.

Figure 10:
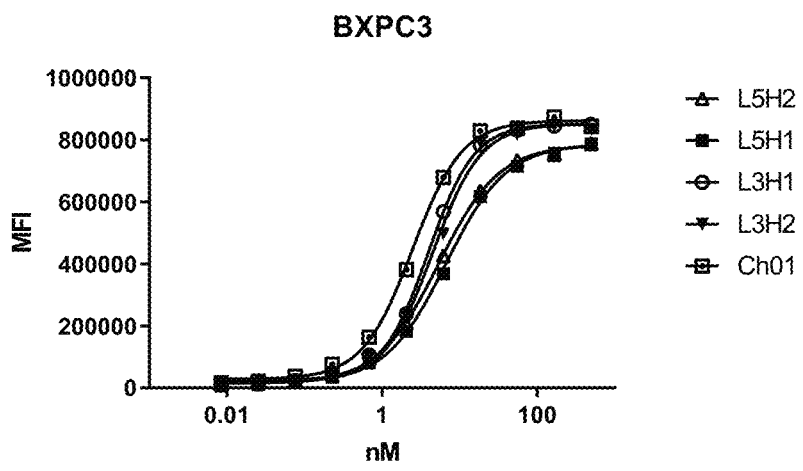
FIG. 10 shows an affinity curve of flow cytometry of BxPC3 cells to humanized antibody candidate molecules L5H2, L5H1, L3H1, L3H2 derived from Mu01 and chimeric antibody Ch01.

As shown in FIG. 10, the four candidate molecules of Hu01 antibody all showed good affinity for BXPC3 cells, and L3H1 showed the highest affinity.

Experimental Example 4: Affinity Assay of Hu02 Candidate Molecule on BXPC3 Cells BxPC3 cells (Human pancreatic cancer cells, obtained from National Collection of Authenticated Cell Cultures) were digested in culture dish with trypsin (purchased from Gibco, Product No. 25200072). Digested cells were centrifuged at 1000 rpm for 5 min and blocked with 10% goat serum (purchased from SenBeiJia Biological Technology Co., Ltd., Product No.SRJ-SE-GO012) for 30 min. Then Hu02 antibodies L1H1, L1H2, L1H3, L1H4, L1H5, L1H6, L2H1, L2H2, L2H3, L2H5, and L2H6 prepared in Example 5 were serially diluted 3 times with an initial concentration of 500 nM. After that, the Hu02 antibody was added to the cells and incubated for 1 h. After washing twice with PBS, FITC-labeled goat anti-human antibody (purchased from Sigma, product No. FS9512-2ML) was added at 1:500 and incubated for 1 h. The results were analyzed by flow cytometry (BD biosciences, product No. BD Accuri C6 Plus) after washing twice with PBS.

Ch02 antibody was a chimeric antibody, of which the variable regions were the same as those of Mu02 prepared in Example 5, and the constant region was the same as human IgG1 described in Example 4.

Figure 11:
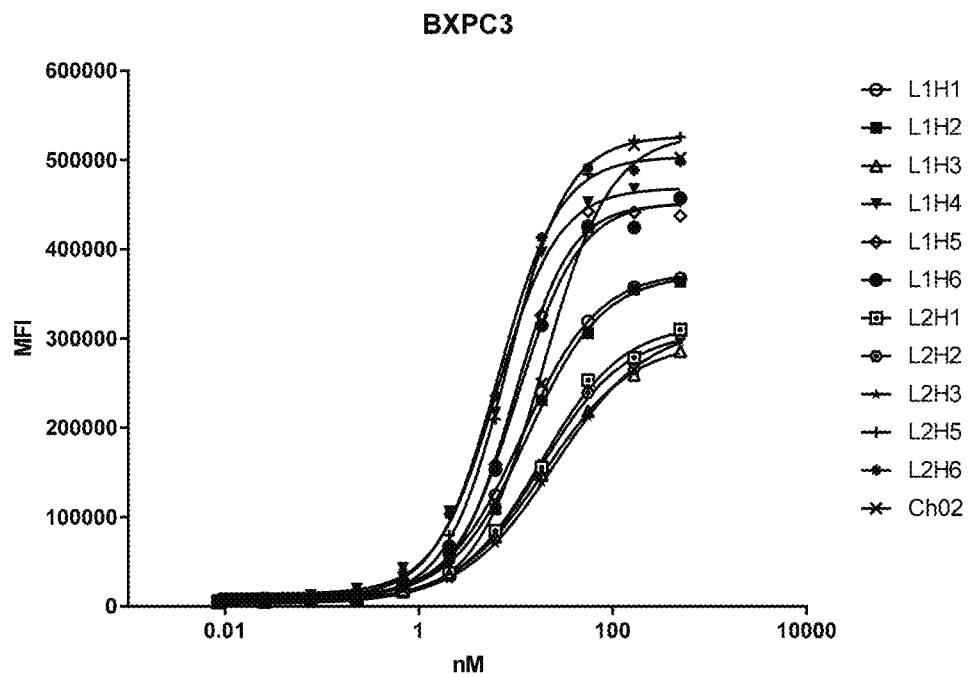
FIG. 11 shows an affinity curve of flow cytometry of BxPC3 cells to humanized antibody candidate molecules L1H1, L1H2, L1H3, L1H4, L1H5, L1H6, L2H1, L2H2, L2H3, L2H5, L2H6 derived from Mu02 and chimeric antibody Ch02.

As shown in FIG. 11 and Table 5, the 11 candidate molecules of Hu02 antibody all showed good affinity for BXPC3 cells, among which L2H6 showed the highest affinity, and L1H2 showed the good affinity.

TABLE 5

Affinity assay of Hu02 antibodies on BXPC3 cells

| | Antibody | | | | | | | | | | |
|---|---|---|---|---|---|---|---|---|---|---|---|
| | L1H1 | L1H2 | L1H3 | L1H4 | L1H5 | L1H6 | L2H1 | L2H2 | L2H3 | L2H5 | L2H6 | Ch02 |
| $EC_{50}$ (nM) | 11.62 | 13.16 | 19.67 | 6.388 | 9.478 | 10.17 | 18.08 | 18.28 | 25.20 | 8.119 | 6.539 | 19.16 |

Experimental Example 5: Effects of Hu01-L3H1, Hu02-L1H2 and Tisotumab on Blood Coagulation The effects of Hu01-L3H1, Hu02-L1H2 and reference antibody (Tisotumab) on the blood coagulation were detected by thrombin generation assay (TGA).

30 μl PPP-Reagent (mixture of 5 μM tissue factor and 4 μM phospholipid, purchased from Stago, product No. TS30.00) was added to human plasma containing 50 μg/mL CTI (Corn Trypsin Inhibitor, purchased from Enzyme Research) and diluted concentrations of antibody Hu01-L3H1 prepared in Example 4, Hu02-L1H2 prepared in Example 5 or negative control phosphate buffered saline (PBS), and incubated at 37° C. for 10 minutes. 120 l of the mixed solution was added to a reaction cup, then a tissue factor-dependent thrombin formation reaction was initiated by adding 30 μl FluCa reagent (containing calcium and thrombin substrate, purchased from Stago, product No. TS50.00). The parameters were detected and automatically exported using the TC TechnoClone instrument.

Figure 12:
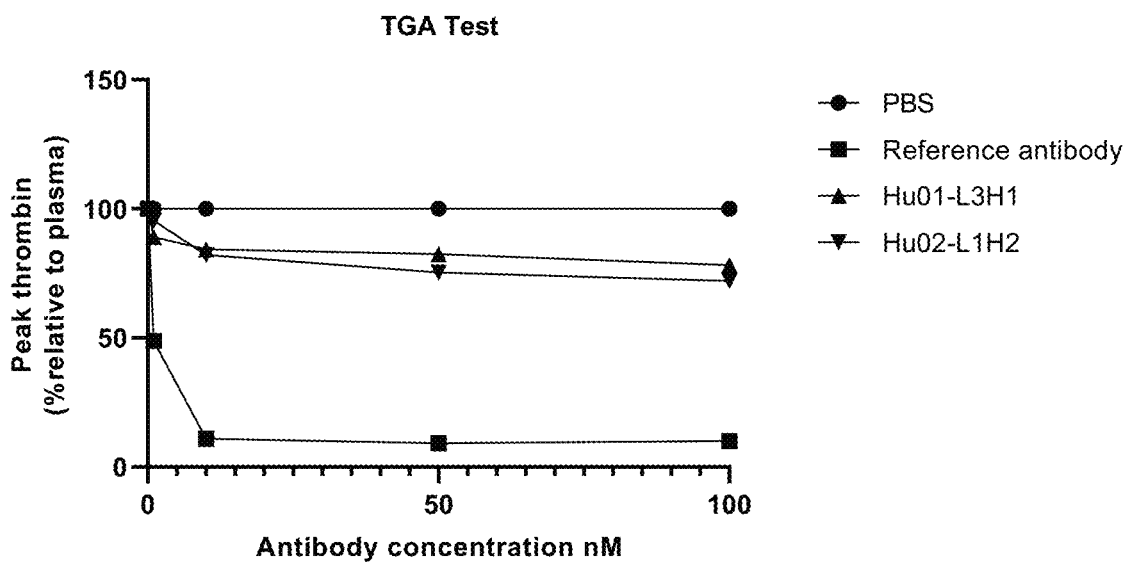
FIG. 12 shows the human plasma thrombin peak changing curve influenced by antibody Hu01-L3H1 prepared in Example 4 and Hu02-L1H2 prepared in Example 5.

As shown in FIG. 12, the inhibition rates of Hu01-L3H1 and Hu02-L1H2 on the thrombin peak value were lower than those of the reference antibody. The results indicated that Hu01-L3H1 and Hu02-L1H2 had less effect on blood coagulation function and lower coagulation toxicity compared with the reference antibodies in vitro.

Experimental Example 6: In Vitro Killing Assay of ADC Hu01-L3H1-LP1-DAR8, Hu01-L3H1-LP1-DAR4 and Hu02-L1H2-LP1-DAR8 on KYSE150, 5637, SW780 and Detroit562 Cells KYSE150 (human esophageal cancer cell, obtained from National Collection of Authenticated Cell Cultures), 5637 (human bladder cancer cell, obtained from National Collection of Authenticated Cell Cultures), SW780 (human bladder cancer, obtained from Zhejiang Meisen Cell Technology Co., LTD.) and Detroit 562 (human pancreatic cancer cell, obtained from National Collection of Authenticated Cell Cultures) were cultured so that a cell density reached 80%. The cells were collected and plated in a 96-well plate, and the cell density was adjusted to $2-5\times10^4$/ml. Each well was plated with 100 μL of cells. ADC molecules were serially diluted 3 times with an initial concentration of 300 nM, and then were added to the cell culture medium and incubated for 5 days. Cell Apoptosis was observed regularly during the period. 5 days later, 15 μL CCK-8 kit stock solution (purchased from Abbkine, product No. ATUOC1303) was directly added to the 96-well plate and reacted in an incubator of 37° C. for 0.5-2 h. An absorbance at 450 nm was detected using a microplate reader, and the cell survival curves were drawn based on the absorbance values and antibody dilution gradient.

Hu01-L3H1-LP1-DAR8 prepared in Example 7, Hu01-L3H1-LP1-DAR4 prepared in Example 8, Hu02-L1H2-LP1-DAR8 prepared in Example 9, and the isotype control HuIgG-LP1-DAR8 prepared in Comparative Example 1 were selected as ADC molecules.

Figure 13:
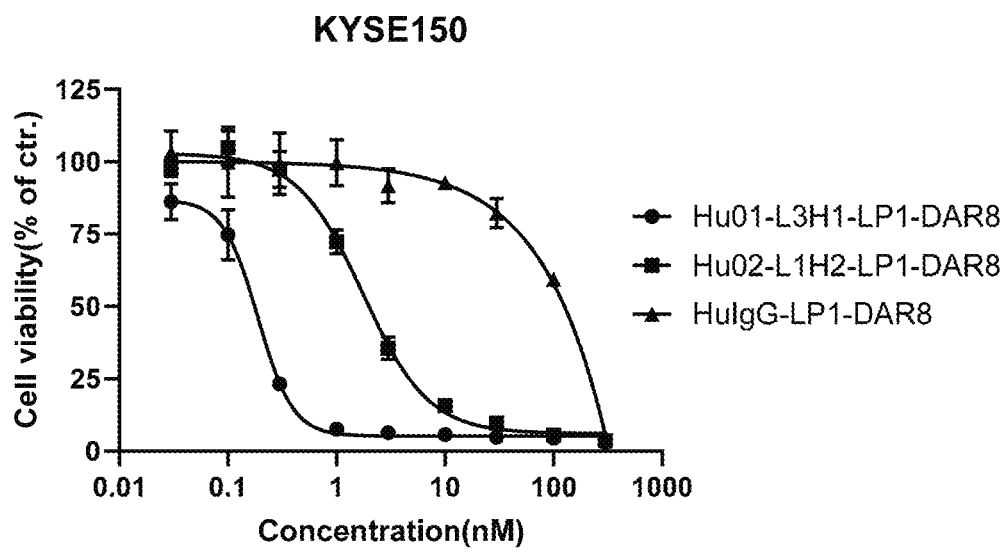
FIG. 13 shows the killing assay of KYSE150 cells by Hu01-L3H1-LP1-DAR8 prepared by Example 7 and Hu02-L1H2-LP1-DAR8 prepared by Example 9.
Figure 14:
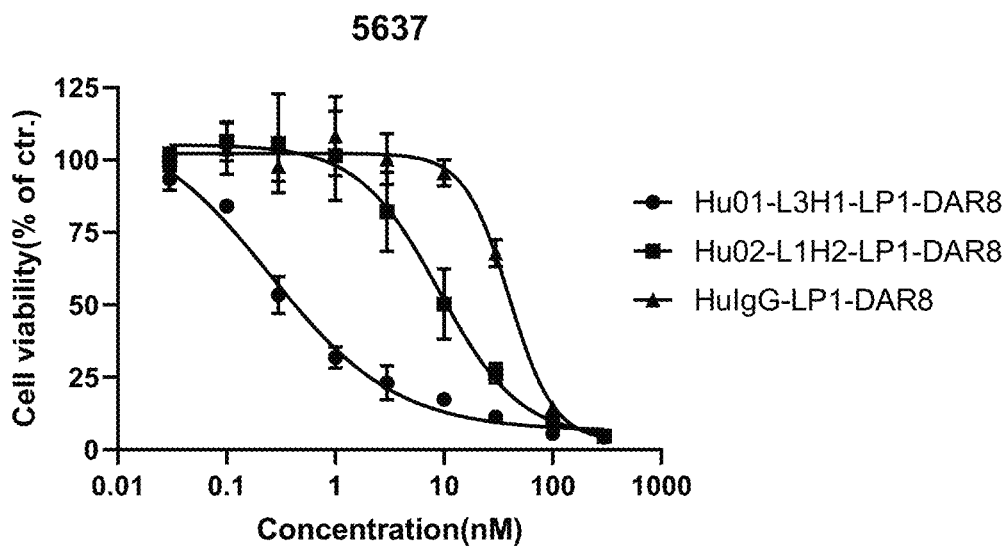
FIG. 14 shows the killing assay of 5637 cells by Hu01-L3H1-LP1-DAR8 prepared by Example 7 and Hu02-L1H2-LP1-DAR8 prepared by Example 9.
Figure 15:
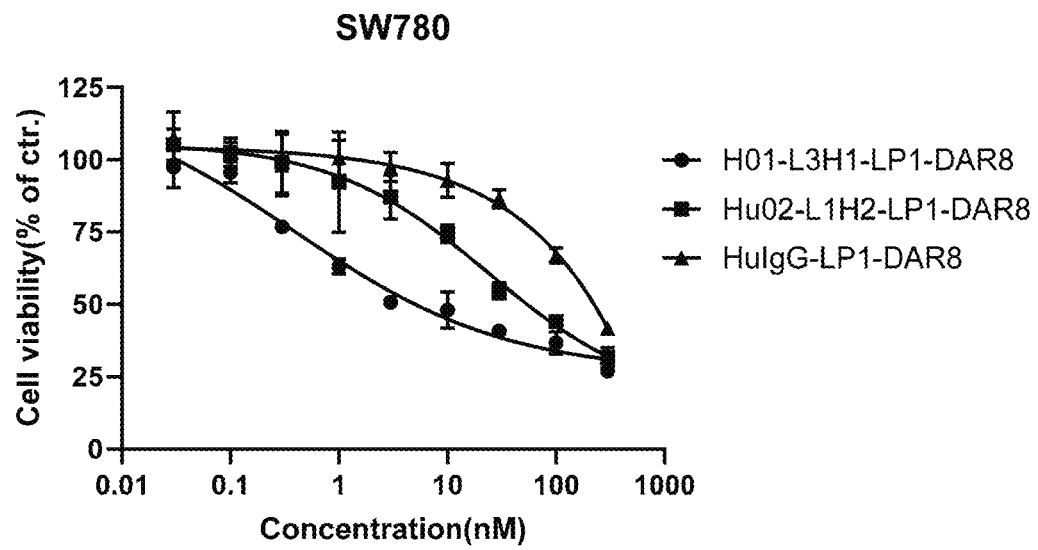
FIG. 15 shows the killing assay of SW780 cells by Hu01-L3H1-LP1-DAR8 prepared by Example 7 and Hu02-L1H2-LP1-DAR8 prepared by Example 9.

FIG. 13, FIG. 14 and FIG. 15 showed the cell survival curves of Hu01-L3H1-LP1-DAR8 and Hu02-L1H2-LP1-DAR8 on KYSE150, 5637 and SW780 cells, respectively. The results showed that Hu01-L3H1-LP1-DAR8 and Hu02-L1H2-LP1-DAR8 had obvious cytotoxic effects on these cell lines in vitro, and Hu01-L3H1-LP1-DAR8 had a better cytotoxic effect.

Figure 16:
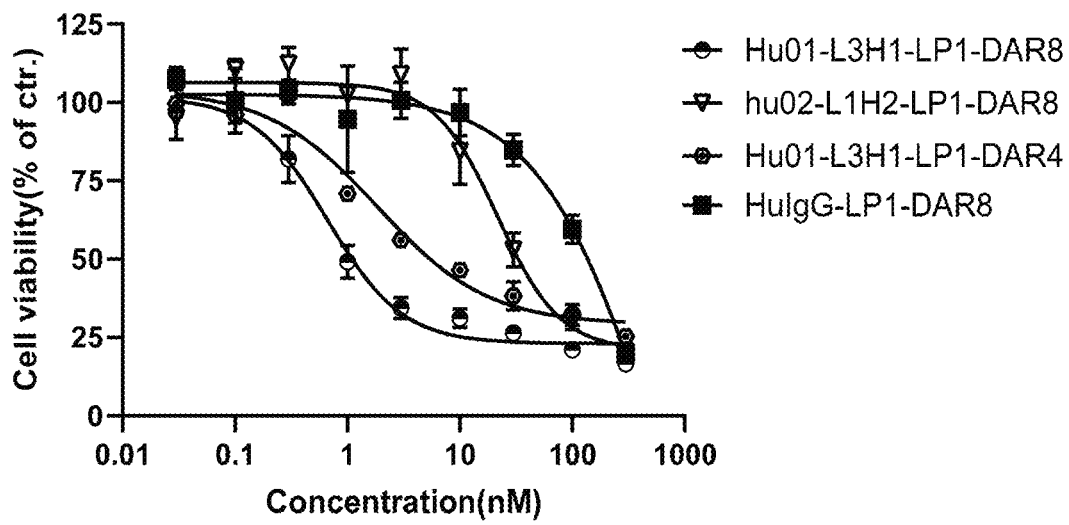
FIG. 16 shows the killing assay of Detroit 562 cells by Hu01-L3H1-LP1-DAR8 prepared by Example 7, Hu01-L3H1-LP1-DAR4 prepared by Example 8 and Hu02-L1H2-LP1-DAR8 prepared by Example 9.

FIG. 16 showed the cell survival curves of Detroit 562 cells by Hu01-L3H1-LP1-DAR8, Hu01-L3H1-LP1-DAR4 and Hu02-L1H2-LP-DAR8 in vitro. The results showed that the cytotoxicity of the ADCs was obvious in vitro, and the effect of cytotoxicity was Hu01-L3H1-LP1-DAR8>Hu01-L3H1-LP1-DAR4>Hu02-L1H2-LP1-DAR8 from high to low.

Experimental Example 7: Tumor Suppression Effects of Hu01-L3H1-LP1-DAR8, Hu02-L1H2-LP1-DAR8 and Reference ADC in CDX Mouse Model of NCI-H292

6-week-old Balb/c nude mice were purchased from Jiangsu GemPharmatech Co. Ltd. Each mouse was subcutaneously inoculated with $1.0\times10^7$ NCI-H292 (human lung cancer cells, obtained from National Collection of Authenticated Cell Cultures) cells to construct CDX (cell derived xenograft) mouse model. When an average tumor volume was about 100 mm$^3$, 2.5, 5, 10 mpk (mg/kg) Hu01-L3H1-LP1-DAR8 prepared in Example 7, 10 mpk Hu02-L1H2-LP1-DAR8 prepared in Example 9, 3 mpk Reference ADC prepared in Comparative Example 2, and 10 mpk HuIgG-LP1-DAR8 prepared in Comparative Example 1 were intravenously injected, respectively. After administration, a tumor volume was measured twice a week with a vernier caliper, and the tumor volume was calculated according to the following formula: TV=(length×width)$^2$/2.

Figure 17:
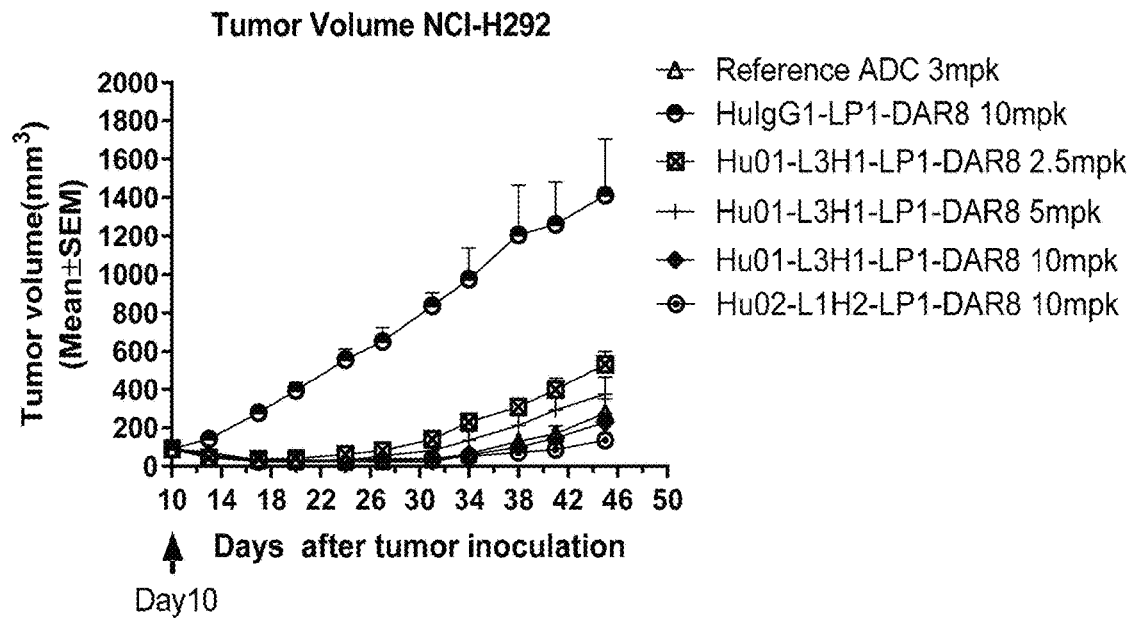
FIG. 17 shows the in vivo efficacy of ADCs in cell derived xenograft mouse model of NCI-H292.

FIG. 17 showed the in vivo tumor suppressive effects of Hu01-L3H1-LP1-DAR8, Hu02-L1H2-LP1-DAR8 and Reference ADC in the CDX mouse model of NCI-H292 It showed that Hu01-L3H1-LP1-DAR8 and Hu02-L1H2-LP1-DAR8 had similar tumor suppression efficacy to that of the Reference ADC. In addition, Hu01-L3H1-LP1-DAR8 showed a dose-dependent effect on tumor inhibition according to the tumor inhibition curves of different doses.

Figure 18:
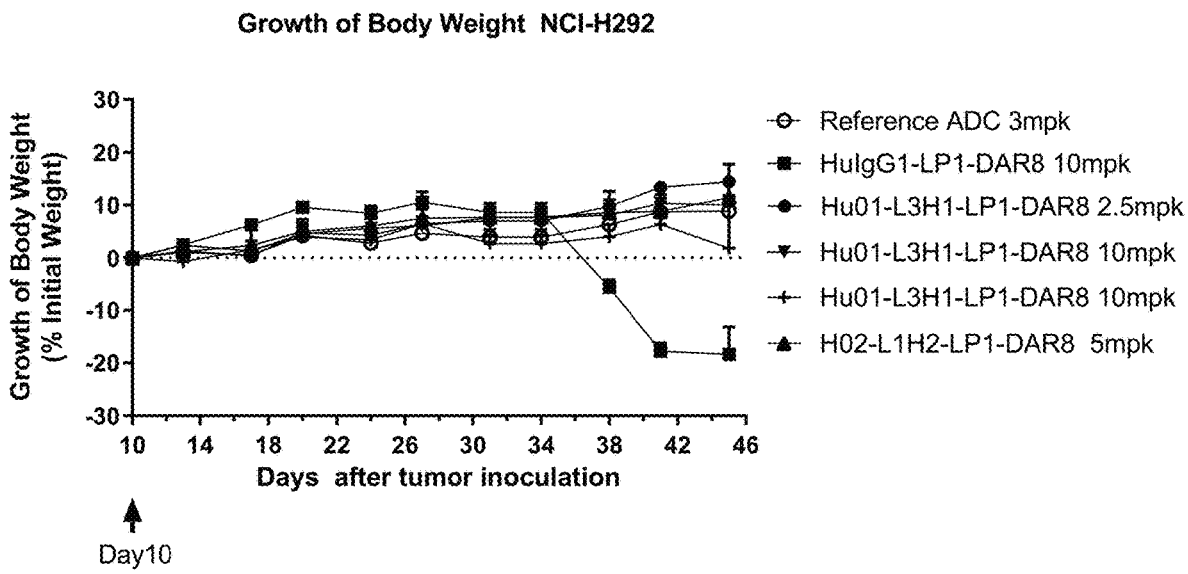
FIG. 18 shows the body weight-time changing curves after treatment in cell derived xenograft mouse model of NCI-H292.

FIG. 18 showed the effects of Hu01-L3H1-LP1-DAR8, Hu02-L1H2-LP1-DAR8 and the Reference ADC on body weight of mice. The results showed that the above ADC molecules have little effects on the body weight of mice, indicating that it will not cause obvious digestive system toxicity at this dose.

Experimental Example 8: Tumor Suppression Effects of Hu01-L3H1-LP1-DAR8 and Reference ADC in CDX Model of NCI-H226

6-week-old Balb/c nude mice were purchased from Jiangsu GemPharmatech Co. Ltd. Each mouse was subcutaneously inoculated with $5.0\times10^6$ NCI-H226 (human lung cancer cells, obtained from National Collection of Authenticated Cell Cultures) cells to construct CDX mouse model. When an average tumor volume was about 130 mm$^3$, 5, 10 mg/kg Hu01-L3H1-LP1-DAR8 prepared in Example 7, 3 mg/kg Reference ADC prepared in Comparative Example 2, and 10 mg/kg HuIgG-LP1-DAR8 prepared in Comparative Example 1 were intravenously injected, respectively. Tumor volume was measured and calculated as the method in Experimental Example 7.

Figure 19:
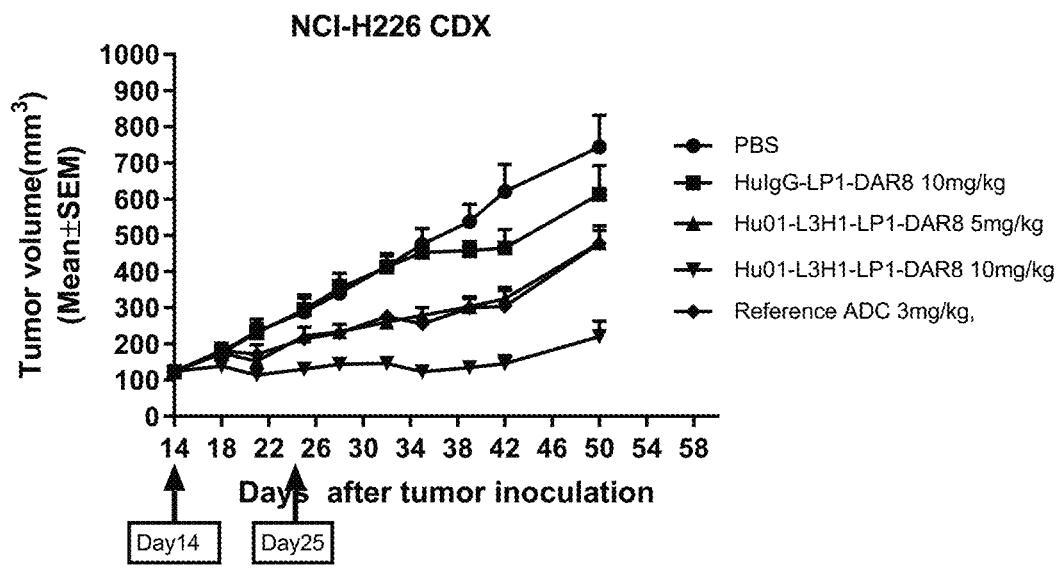
FIG. 19 shows the in vivo efficacy of ADCs in cell derived xenograft mouse model of NCI-H226.

FIG. 19 showed the in vivo tumor suppressive effects of Hu01-L3H1-LP1-DAR8 and Reference ADC on the CDX mouse model of NCI-H226. It showed that the tumor suppression effect of Hu01-L3H1-LP1-DAR8 with a 10 mg/kg dosage was better than that of Reference ADC with a 3 mg/kg dosage. The tumor suppression effect of Hu01-

L3H1-LP1-DAR8 with a 5 mg/kg dosage was similar to that of Reference ADC with a 3 mg/kg dosage.

Experimental Example 9: Tumor Suppression Effects of Hu01-L3H1-LP1-DAR8 and Reference ADC on Mouse Model Constructed with IGROV1 Cells 6-week-old Balb/c nude mice were purchased from Jiangsu GemPharmatech Co. Ltd. Each mouse was subcutaneously inoculated with $1.0 \times 10^7$ IGROV1 cells (human ovarian cancer, obtained from Zhejiang Meisen Cell Technology Co., LTD.) to construct CDX mouse model. When an average tumor volume was about 100 mm³, 10 mpk Hu01-L3H1-LP1-DAR8 prepared in Example 7, 3 mpk Reference ADC prepared in Comparative Example 2, and 10 mpk HuIgG-LP1-DAR8 prepared in Comparative Example 1 were intravenously injected, respectively. Tumor volume was measured and calculated as the method in Experimental Example 7.

Figure 20:
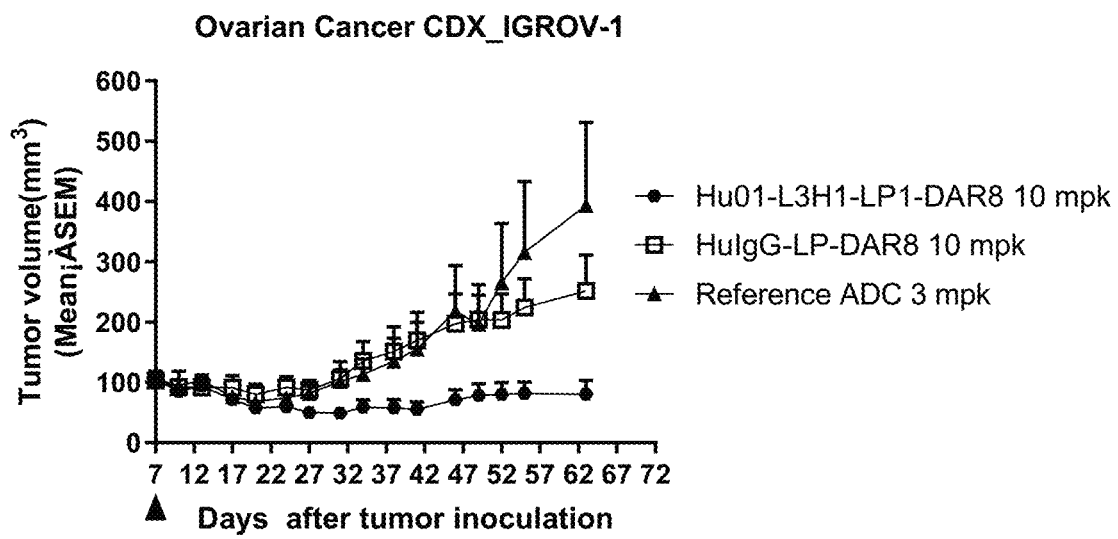
FIG. 20 shows the in vivo efficacy of ADCs in cell derived xenograft mouse model of IGROV1.

FIG. 20 showed the in vivo tumor suppressive effects of Hu01-L3H1-LP1-DAR8 and Reference ADC on the CDX mouse model constructed with IGROV1 cells. It showed that the tumor suppression effect of Hu01-L3H1-LP1-DAR8 with a 10 mg/kg dosage was better than that of Reference ADC with a 3 mg/kg dosage.

Experimental Example 10: Tumor Suppression Effects of Hu01-L3H1-LP1-DAR8 and Reference ADC on Mouse Model Constructed with SW780 Cells 6-week-old Balb/c nude mice were purchased from Jiangsu GemPharmatech Co. Ltd. Each mouse was subcutaneously inoculated with $4.0 \times 10^6$ SW780 cells (Human bladder cancer, obtained from Zhejiang Meisen Cell Technology Co., LTD.) to construct CDX mouse model. When an average tumor volume was about 100 mm³, 10 mg/kg Hu01-L3H1-LP1-DAR8 prepared in Example 7, 3 mg/kg Reference ADC prepared in Comparative Example 2, and 10 mg/kg HuIgG-LP1-DAR8 prepared in Comparative Example 1 were intravenously injected, respectively. Tumor volume was measured and calculated as the method in Experimental Example 7.

Figure 21:
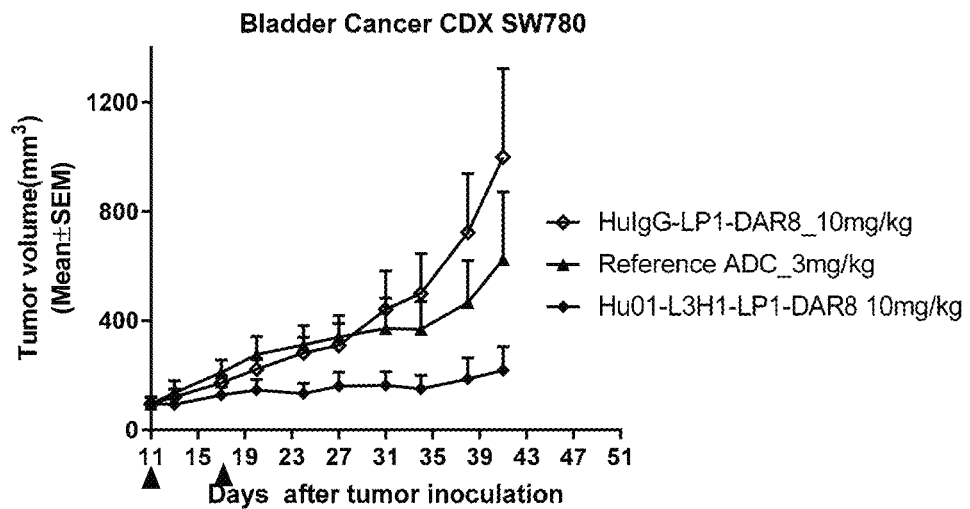
FIG. 21 shows the in vivo efficacy of ADCs in cell derived xenograft mouse model of SW780.

FIG. 21 showed the in vivo tumor suppressive effects of Hu01-L3H1-LP1-DAR8 and Reference ADC on the CDX mouse model constructed with SW780 cells. It showed that the tumor suppression effect of Hu01-L3H1-LP1-DAR8 with a 10 mg/kg dosage was better than that of Reference ADC with a 3 mg/kg dosage.

Experimental Example 11: Tumor Suppression Effects of Hu01-L3H1-LP1-DAR8 on PDX1 Mouse Model Constructed with Human Lung Cancer Tissue Six-week-old NU/NU nude mice, female, weighing 18-21 g, were purchased from Beijing Vital River Laboratory Animal Technology Co., Ltd. Each mouse was subcutaneously inoculated with human lung cancer tissue (obtained from Shanghai Lide Biotechnology Co., LTD.) to construct patient-derived tumor xenograft model (PDX). When the average tumor volume was about 160 mm³, 10 mg/kg Hu01-L3H1-LP1-DAR8 prepared in Example 7 and PBS were intravenously injected, respectively. Tumor volume was measured and calculated as the method in Experimental Example 7.

Figure 22:
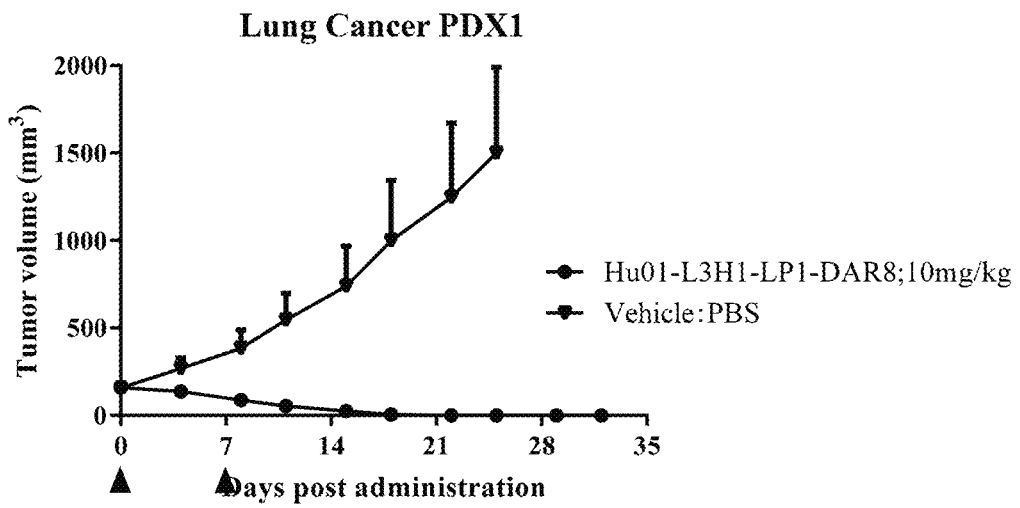
FIG. 22 shows the in vivo efficacy of ADCs in patient-derived tumor xenograft mouse model constructed with human lung cancer tissue.

FIG. 22 showed the in vivo tumor suppressive effects of Hu01-L3H1-LPT-DAR8 and PBS on the PDX1 mouse model. It showed that the tumor suppression effect of Hu01-L3H1-LP1-DAR8 with a 10 mg/kg dosage was significant compared with PBS. In addition, the tumor was completely eliminated in 5 mice on the 22nd day, indicating that Hu01-L3H1-LP1-DAR8 had a significant efficacy on tumor suppressive.

Experimental Example 12: Tumor Suppression Effects of Hu01-L3H1-LP1-DAR4 on PDX2 Mouse Model Constructed with Human Cervical Cancer Tissue Six-week-old NU/NU nude mice, female, weighing 18-21 g, were purchased from Beijing Vital River Laboratory Animal Technology Co., Ltd. Each mouse was subcutaneously inoculated with human lung cancer tissue (obtained from Shanghai Lide Biotechnology Co., LTD.) to construct PDX model. When the average tumor volume was about 160 mm³, 10 mg/kg Hu01-L3H1-LP1-DAR4 prepared in Example 8, 3 mg/kg Reference ADC prepared in Comparative Example 2, and PBS were intravenously injected, respectively. Tumor volume was measured and calculated as the method in Experimental Example 7.

Figure 23:
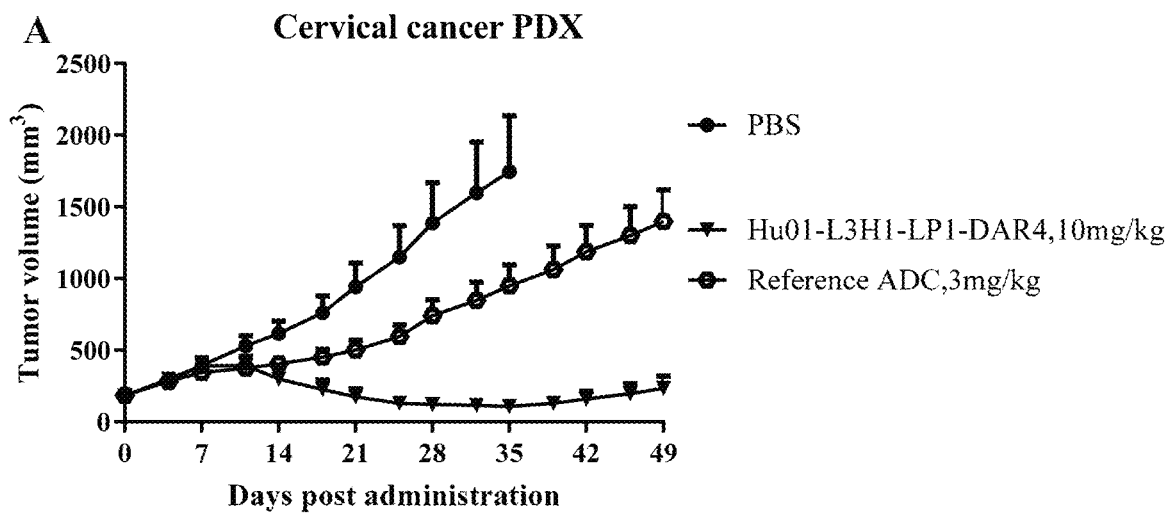
FIG. 23 shows the in vivo efficacy of ADCs inpatient-derived tumor xenograft mouse model constructed with human cervical cancer tissue.

FIG. 23 showed the in vivo tumor suppressive effects of Hu01-L3H1-LP1-DAR4 and Reference ADC on the PDX2 mouse model. It showed that the tumor suppression effect of Hu01-L3H1-LP1-DAR4 with a 10 mg/kg dosage was significant compared with Reference ADC, indicating that Hu01-L3H1-LP1-DAR4 had a significant efficacy on tumor suppressive.

Experimental Example 13: Toxicological Experiments of Hu01-L3H1-LP1-DAR8 on Cynomolgus Monkeys The toxicological experiments of Hu01-L3H1-LP1-DAR8 were detected by repeated administration of cynomolgus monkeys.

6 cynomolgus monkeys (purchased from Guangxi Frontier Biotechnology Co., Ltd.) were randomly divided into 3 groups, and there were one male and one male in each group. Vehicle, 10 mg/kg of Hu01-L3H1-LP1-DAR8, and 30 mg/kg of Hu01-L3H1-LP1-DAR8 were infused intravenously on the 1st day, the 22nd day and the 43rd day, respectively. During the experiment, animals were observed for any abnormalities, and blood samples thereof were collected for hematology and blood biochemical index analysis. On the 50th day, the animals were euthanized and sampled for pathological analysis. As shown in Table 6, in the present experiment, all doses of the test substance did not cause death of the animals. Target organs related to the test substance were bone marrow, intestine, thymus and spleen. HNSTD (maximum dose without severe toxicity) of Hu01-L3H1-LP1-DAR8 was 30 mg/kg, indicating that Hu01-L3H1-LP1-DAR8 was safe.

TABLE 6

Results of toxicological experiments in cynomolgus monkeys

| | cynomolgus monkey |
|---|---|
| protocol | 0, 10, and 30 mg/kg, 1/sex/group Intravenous injection; Q3Wx3 |
| Lethal dose | not observed |
| Clinical signs | 30 mg/kg: diarrhea |

TABLE 6-continued

Results of toxicological experiments in cynomolgus monkeys

| | cynomolgus monkey |
|---|---|
| Body weight | 30 mg/kg; reduced about 15% |
| Hematology | 30 mg/kg: Reversibly reduced erythrocyte and bone marrow lineages |
| Blood chemistry | PT (Prothrombin time) decreased only briefly and slightly 1 hour after administration. |
| Target organs and tissues | ≥30 mg/kg: Thymus, spleen, bone marrow, digestive tract |
| HNSTD | 30 mg/kg |

The ADCs with a novel linker provided herein have a better safety than ADCs with payload MMAE analogs which are microtubule inhibitor toxin. Specifically, ADC linked to VC-MMAE (e.g., Tisotumab vedotin) has an HNSTD of 3 mpk (data from U.S. Food and Drug Administration), and ADC linked to ZymeLink™ Auristatin (e.g., XB002/ICON-2) has an HNSTD of 10 mpk to 18 mpk (World ADC Digital, Sep. 15-18, 2020). The HNSTD of the ADCs provided herein is significantly higher than that of prior art and has a higher therapeutic window. At the same time, the ADCs provided herein have more excellent in vivo anti-tumor efficacy.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. An isolated antibody or antigen-binding fragment thereof that binds to CD142, comprising at least a heavy chain variable region (VH) and a light chain variable region (VL), wherein the VH comprises a heavy chain complementary determining region 1 (HCDR1) comprising the amino acid sequence of SEQ ID NO: 1, a HCDR2 comprising the amino acid sequence of IYPGX$_1$GDX$_2$ (SEQ ID NO: 2), and a HCDR3 comprising the amino acid sequence of SEQ ID NO: 3; and the VL comprises a light chain complementarity determining region 1 (LCDR1) comprising the amino acid sequence of SEQ ID NO: 4, a LCDR2 comprising the amino acid sequence of LTS, and a LCDR3 comprising the amino acid sequence of SEQ ID NO: 5;

wherein X$_1$ is D or Q, X$_2$ is S or A.

2. The isolated antibody or antigen-binding fragment thereof of claim 1, wherein:
the X$_1$ is D, and X$_2$ is S;
the X$_1$ is Q, and X$_2$ is S; or
the X$_1$ is Q, and X$_2$ is A.

3. The isolated antibody or antigen-binding fragment thereof of claim 1, comprising:
a VH having at least 70% identity to the amino acid sequence of SEQ ID NO: 6, and a VL having at least 70% identity to the amino acid sequence of SEQ ID NO: 7;
a VH having at least 90% identity to the amino acid sequence of SEQ ID NO: 8, and a VL having at least 90% identity to the amino acid sequence of SEQ ID NO: 15;
a VH having at least 90% identity to the amino acid sequence of SEQ ID NO: 8, and a VL having at least 95% identity to the amino acid sequence of SEQ ID NO: 17;
a VH having at least 90% identity to the amino acid sequence of SEQ ID NO: 9, and a VL having at least 90% identity to the amino acid sequence of SEQ ID NO: 15; or
a VH having at least 90% identity to the amino acid sequence of SEQ ID NO: 9, and a VL having at least 95% identity to the amino acid sequence of SEQ ID NO: 17.

4. The isolated antibody or antigen-binding fragment thereof of claim 1, wherein
the VH comprises the amino acid sequence of SEQ ID NO: 6, and the VL comprises the amino acid sequence of SEQ ID NO: 7;
the VH comprises the amino acid sequence of SEQ ID NO: 8, and the VL comprises the amino acid sequence of SEQ ID NO: 15;
the VH comprises the amino acid sequence of SEQ ID NO: 8, and the VL comprises the amino acid sequence of SEQ ID NO: 17;
the VH comprises the amino acid sequence of SEQ ID NO: 9, and the VL comprises the amino acid sequence of SEQ ID NO: 15; or
the VH comprises the amino acid sequence of SEQ ID NO: 9, and the VL comprises the amino acid sequence of SEQ ID NO: 17.

5. The isolated antibody or antigen-binding fragment thereof of claim 1, comprising a heavy chain constant region comprising the amino acid sequence of SEQ ID NO: 35, and a light chain constant region comprising the amino acid sequence of SEQ ID NO: 36.

6. The isolated antibody or antigen-binding fragment thereof of claim 1, comprising a heavy chain comprising the amino acid sequences of SEQ ID NOs: 8 and 35, and a light chain comprising the amino acid sequences of SEQ ID NOs 15 and 36.

7. A nucleic acid encoding the antibody or antigen-binding fragment of claim 1.

8. The nucleic acid of claim 7, wherein the nucleic acid encoding the VH comprises the nucleotide sequence of SEQ ID NO: 18 and the nucleic acid encoding the VL comprises the nucleotide sequence of SEQ ID NO: 19.

9. A vector, wherein the vector comprises the nucleic acid of claim 7.

10. A host cell, comprising the nucleic acid of claim 7.

11. An antibody-drug conjugate of formula I, $$Ab\text{-}(L\text{-}D)n \quad (I)$$

or an isomer, an isotopic variant, a pharmaceutically acceptable salt, prodrug, solvate thereof, or combinations thereof; wherein
Ab is the isolated antibody or antigen-binding fragment thereof of claim 1;
L is a linker that covalently links to Ab and D, respectively;
D is a payload;
n is an integer of 1 to 10.

12. The antibody-drug conjugate of claim 11, wherein the L comprises a cleavable peptide, which is cleavable by Cathepsin B.

13. The antibody-drug conjugate of claim 11, wherein the L comprises an amino acid unit comprising a dipeptide, a tripeptide, a tetrapeptide or a pentapeptide.

14. The antibody-drug conjugate of claim 13, wherein the amino acid unit is Val-Cit, Val-Ala, Glu-Val-Cit, Ala-Ala-Asn, Gly-Val-Cit, Gly-Gly-Gly or Gly-Gly-Phe-Gly.

15. The antibody-drug conjugate of claim 11, wherein the L comprises at least one spacer, in the form of at least one self-immolative spacer.

16. The antibody-drug conjugate of claim 15, wherein the self-immolative spacer is p-aminobenzyloxycarbonyl (PABC) or p-aminobenzyl (PAB).

17. The antibody-drug conjugate of claim 15, wherein the L comprises a cleavable peptide and the cleavable peptide is directly spliced to the spacer.

18. The antibody-drug conjugate of claim 15, wherein L comprises -L$_1$-L$_2$-L$_3$-, where
L$_1$ denotes -(succinimidyl-3-yl-N)—(CH$_2$)m$^1$-C(=O)—, —CH$_2$—C(=O)—NH—(CH$_2$)m$^2$-C(=O)— or —C(=O)—(CH$_2$) m$^3$-C(=O)—, where m$^1$ denotes an integer of 2 to 8; m$^2$ denotes an integer of 2 to 8, and m$^3$ denotes an integer of 2 to 8; L2 denotes an amino acid unit; L3 denotes the self-immolative spacer.

19. The antibody-drug conjugate of claim 11, wherein L is
-(succinimidyl-3-yl-N)—CH$_2$CH$_2$—C(=O)-GGFG-PABC-;
-(succinimidyl-3-yl-N)—CH$_2$CH$_2$CH$_2$CH$_2$CH$_2$—C(=O)-GGFG-PABC-;
-(succinimidyl-3-yl-N)—CH$_2$CH$_2$CH$_2$CH$_2$CH$_2$—C(=O)-GGFG-NH-PABC-;
-(succinimidyl-3-yl-N)—CH$_2$CH$_2$—C(=O)—NH—CH$_2$CH$_2$O—CH$_2$CH$_2$O—CH$_2$CH$_2$—C(=O)-GGFG-PABC-;
-(succinimidyl-3-yl-N)—CH$_2$CH$_2$—C(=O)—NH—CH$_2$CH$_2$O—CH$_2$CH$_2$O—CH$_2$CH$_2$O—CH$_2$CH$_2$O—CH$_2$CH$_2$—C(=O)-GGFG-PABC-;
—CH$_2$—C(=O)—NH—CH$_2$CH$_2$—C(=O)-GGFG-PABC-;

—C(=O)—CH₂CH₂CH₂CH₂CH₂—C(=O)-GGFG-PABC-;
-(succinimidyl-3-yl-N)—CH₂CH₂—C(=O)-GGFG-NH—CH₂CH₂—C(=O)—;
-(succinimidyl-3-yl-N)—CH₂CH₂—C(=O)-GGFG-NH—CH₂CH₂CH₂—C(=O)—;
-(succinimidyl-3-yl-N)—CH₂CH₂CH₂CH₂CH₂—C(=O)-GGFG-NH—CH₂CH₂—C(=O)—;
-(succinimidyl-3-yl-N)—CH₂CH₂CH₂CH₂CH₂—C(=O)-GGFG-NH—CH₂CH₂CH₂—C(=O)—;
-(succinimidyl-3-yl-N)—CH₂CH₂CH₂CH₂CH₂—C(=O)-GGFG-NH—CH₂CH₂CH₂CH₂CH₂—C(=O)—;
-(succinimidyl-3-yl-N)—CH₂CH₂CH₂CH₂CH₂—C(=O)-GGFG-NH—CH₂—O—CH₂—C(=O)—;
-(succinimidyl-3-yl-N)—CH₂CH₂CH₂CH₂CH₂—C(=O)-GGFG-NH—CH₂CH₂—O—CH₂—C(=O)—;
-(succinimidyl-3-yl-N)—CH₂CH₂—C(=O)—NH—CH₂CH₂O—CH₂CH₂O—CH₂CH₂—C(=O)-GGFG-NH—CH₂CH₂CH₂—C(=O)—;
-(succinimidyl-3-yl-N)—CH₂CH₂—C(=O)—NH—CH₂CH₂O—CH₂CH₂O—CH₂CH₂—C(=O)-GGFG-NH—CH₂CH₂—C(=O)—;
-(succinimidyl-3-yl-N)—CH₂CH₂—C(=O)—NH—CH₂CH₂O—CH₂CH₂O—CH₂CH₂O—CH₂CH₂O—CH₂CH₂—C(=O)-GGFG-NH—CH₂CH₂CH₂—C(=O)—;
-(succinimidyl-3-yl-N)—CH₂CH₂—C(=O)—NH—CH₂CH₂O—CH₂CH₂O—CH₂CH₂O—CH₂CH₂O—CH₂CH₂—C(=O)-GGFG-NH—CH₂CH₂—C(=O)—;
—CH₂—C(=O)—NH—CH₂CH₂—C(=O)-GGFG-NH—CH₂CH₂CH₂—C(=O)—;
—C(=O)—CH₂CH₂CH₂CH₂CH₂—C(=O)-GGFG-NH—CH₂CH₂CH₂—C(=O)—;
-(succinimidyl-3-yl-N)—CH₂CH₂—C(=O)—VA-PABC-;
-(succinimidyl-3-yl-N)—CH₂CH₂CH₂CH₂CH₂—C(=O)—VA-PABC-;
-(succinimidyl-3-yl-N)—CH₂CH₂CH₂CH₂CH₂—C(=O)—VA-NH-PABC-;
-(succinimidyl-3-yl-N)—CH₂CH₂—C(=O)—NH—CH₂CH₂O—CH₂CH₂O—CH₂CH₂—C(=O)—VA-PABC-;
-(succinimidyl-3-yl-N)—CH₂CH₂—C(=O)—NH—CH₂CH₂O—CH₂CH₂O—CH₂CH₂O—CH₂CH₂O—CH₂CH₂—C(=O)—VA-PABC-;
—CH₂—C(=O)—NH—CH₂CH₂—C(=O)—VA-PABC-;
—C(=O)—CH₂CH₂CH₂CH₂CH₂—C(=O)—VA-PABC-;
-(succinimidyl-3-yl-N)—CH₂CH₂—C(=O)—VA-NH—CH₂CH₂—C(=O)—;
-(succinimidyl-3-yl-N)—CH₂CH₂—C(=O)—VA-NH—CH₂CH₂CH₂—C(=O)—;
-(succinimidyl-3-yl-N)—CH₂CH₂CH₂CH₂CH₂—C(=O)—VA-NH—CH₂CH₂—C(=O)—;
-(succinimidyl-3-yl-N)—CH₂CH₂CH₂CH₂CH₂—C(=O)—VA-NH—CH₂CH₂CH₂—C(=O)—;
-(succinimidyl-3-yl-N)—CH₂CH₂CH₂CH₂CH₂—C(=O)—VA-NH—CH₂CH₂CH₂CH₂CH₂—C(=O)—;
-(succinimidyl-3-yl-N)—CH₂CH₂CH₂CH₂CH₂—C(=O)—VA-NH—CH₂—O—CH₂—C(=O)—;
-(succinimidyl-3-yl-N)—CH₂CH₂CH₂CH₂CH₂—C(=O)—VA-NH—CH₂CH₂—O—CH₂—C(=O)—;
-(succinimidyl-3-yl-N)—CH₂CH₂—C(=O)—NH—CH₂CH₂O—CH₂CH₂O—CH₂CH₂—C(=O)—VA-NH—CH₂CH₂CH₂—C(=O)—;
-(succinimidyl-3-yl-N)—CH₂CH₂—C(=O)—NH—CH₂CH₂O—CH₂CH₂O—CH₂CH₂—C(=O)—VA-NH—CH₂CH₂—C(=O)—;
-(succinimidyl-3-yl-N)—CH₂CH₂—C(=O)—NH—CH₂CH₂O—CH₂CH₂O—CH₂CH₂O—CH₂CH₂O—CH₂CH₂—C(=O)—VA-NH—CH₂CH₂CH₂—C(=O)—;
-(succinimidyl-3-yl-N)—CH₂CH₂—C(=O)—NH—CH₂CH₂O—CH₂CH₂O—CH₂CH₂O—CH₂CH₂O—CH₂CH₂—C(=O)—VA-NH—CH₂CH₂—C(=O)—;
—CH₂—C(=O)—NH—CH₂CH₂—C(=O)—VA-NH—CH₂CH₂CH₂—C(=O)—; or
—C(=O)—CH₂CH₂CH₂CH₂CH₂—C(=O)—VA-NH—CH₂CH₂CH₂—C(=O)—.

20. The antibody-drug conjugate of claim 16, wherein the p-aminobenzyloxycarbonyl (PABC) or p-aminobenzyl (PAB) comprises a polysarcosine (poly-N-methylglycine) residue.

21. The antibody-drug conjugate of claim 11, wherein L is

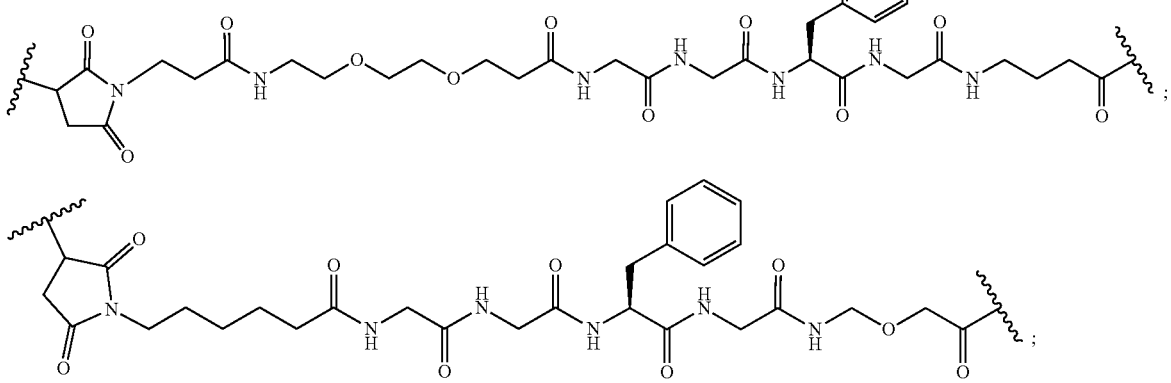

-continued

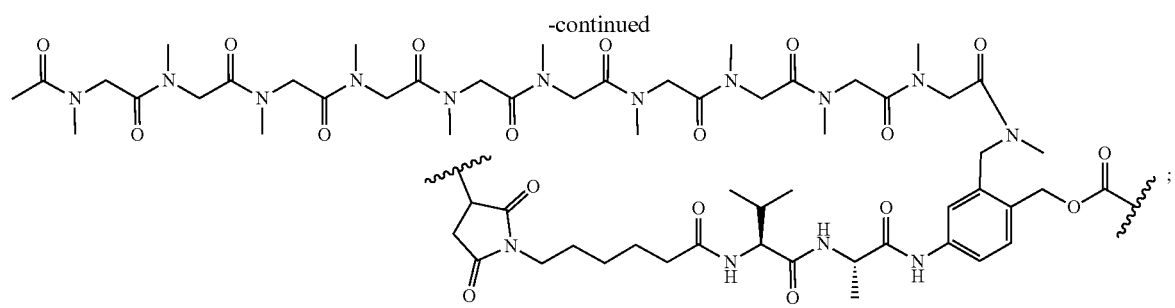

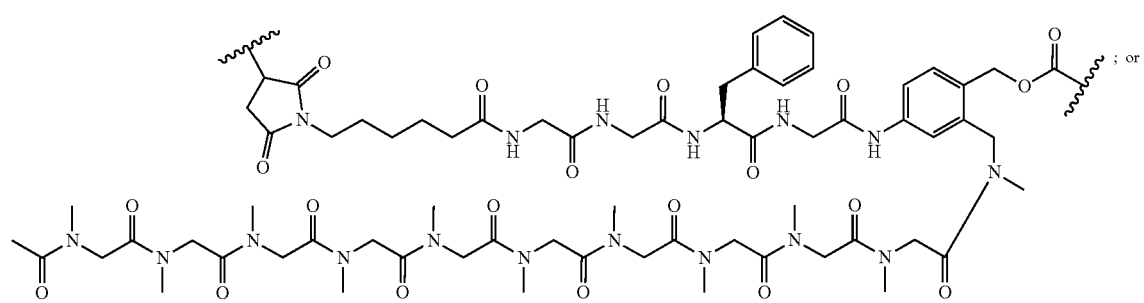

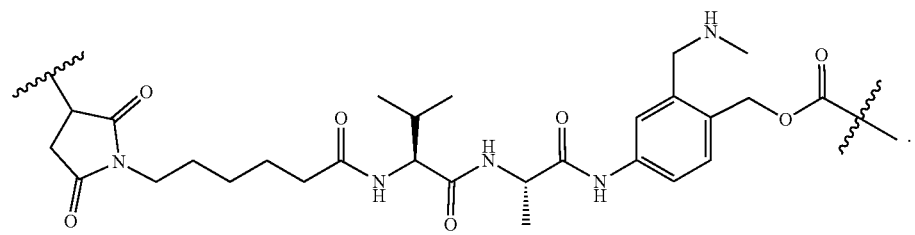

22. The antibody-drug conjugate of claim 11, wherein the payload is at least one cytotoxic agent, wherein the at least one cytotoxic agent comprises a tubulin inhibitor or a topoisomerase inhibitor; the tubulin inhibitor comprises auristatin or a derivative thereof, maytansine or a derivative thereof; and the topoisomerase inhibitor comprises camptothecin or a derivative thereof.

23. The antibody-drug conjugate of claim 11, wherein the antibody-drug conjugate is

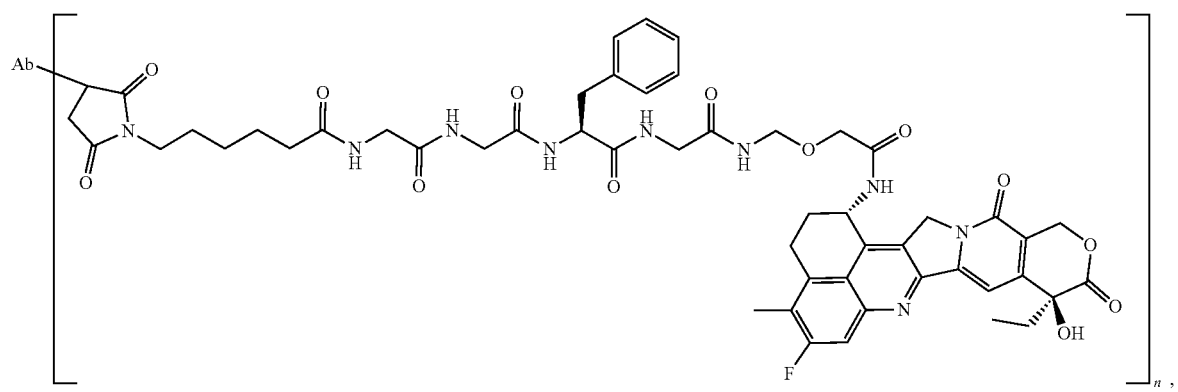

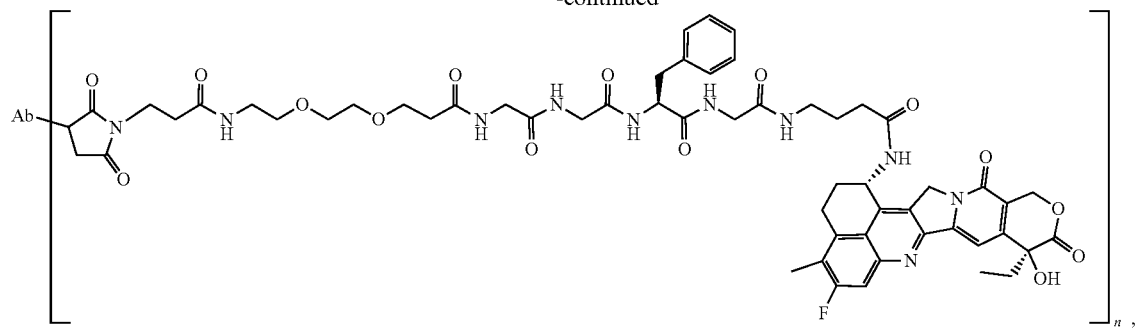
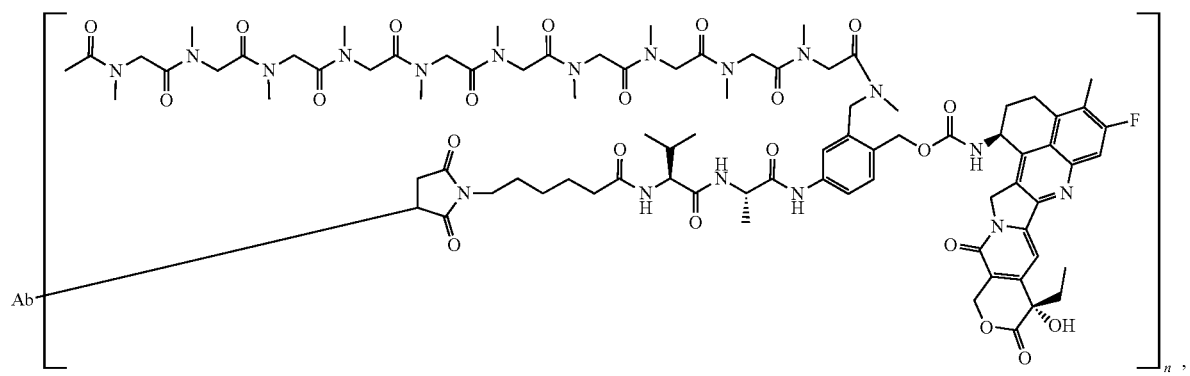
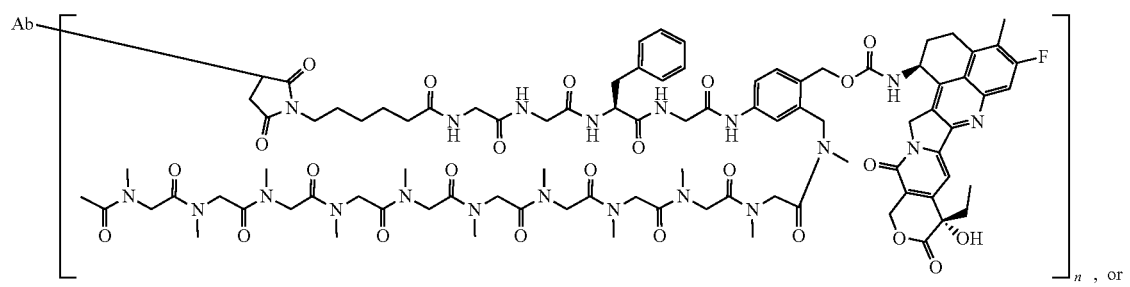
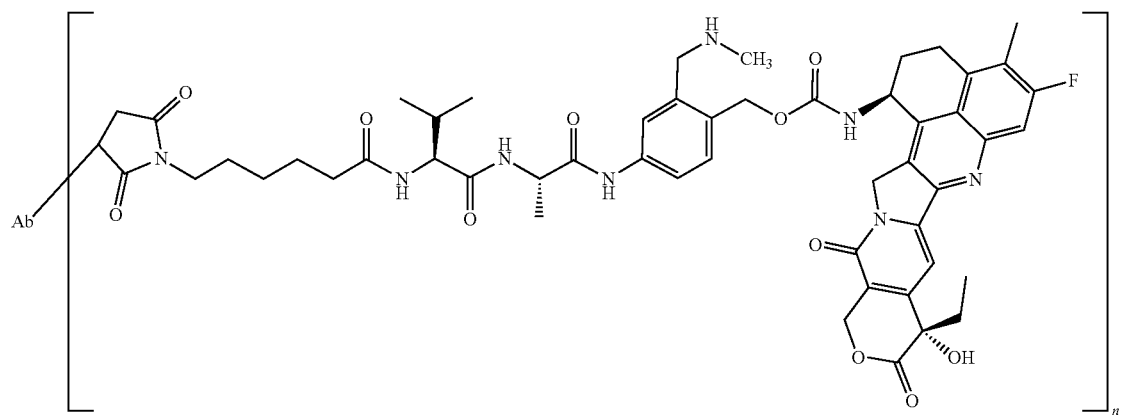
n denotes a DAR value of 1 to 10, or 4 to 10.

24. The antibody-drug conjugate of claim 23, wherein the antibody-drug conjugate is

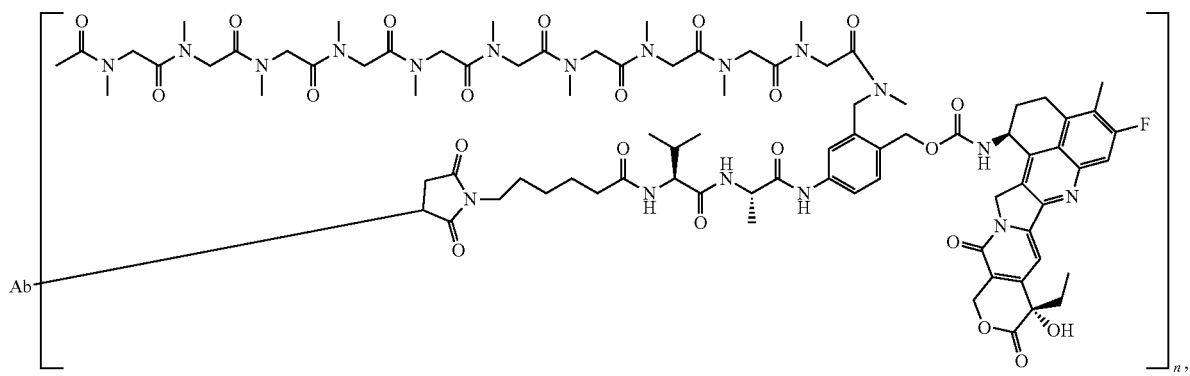

further wherein the Ab is:
an antibody or antigen-binding fragment thereof that binds to CD142 comprising
a light chain complementarity-determining region 1 (LCDR1) comprising the amino acid sequence of SEQ ID NO: 4, a LCDR2 comprising the amino acid sequence of LTS, and a LCDR3 comprising the amino acid sequence of SEQ ID NO: 5, and
a heavy chain complementarity-determining region 1 (HCDR1) comprising the amino acid sequence of SEQ ID NO: 1, a HCDR2 comprising the amino acid sequence of IYPGX$_1$GDX$_2$ (SEQ ID NO: 2) wherein X$_1$ is D and X$_2$ is S, and a HCDR3 comprising the amino acid sequence of SEQ ID NO: 3, or
an antibody or antigen-binding fragment thereof that binds to CD142 comprising
a light chain variable region (VL) having at least 90% identity to the amino acid sequence of SEQ ID NO: 15, and
a heavy chain variable region (VH) having at least 90% identity to the amino acid sequence of SEQ ID NO: 8, wherein any sequence variance is located outside the complementarity-determining regions, or an antibody or antigen-binding fragment thereof that binds to CD142 comprising
a light chain comprising a light chain variable region (VL) comprising the amino acid sequence of SEQ ID NO: 15 and a constant region comprising the amino acid sequence of SEQ ID NO: 36, and
a heavy chain comprising a heavy chain variable region (VH) comprising the amino acid sequence of SEQ ID NO: 8 and a constant region comprising the amino acid sequence of SEQ ID NO: 35.

25. The antibody-drug conjugate of claim 24, wherein n denotes a DAR value of 4 to 8.

26. A pharmaceutical composition comprising the antibody-drug conjugate of claim 11, or an isomer, an isotopic variant, a pharmaceutically acceptable salt, prodrug, solvate thereof, or combinations thereof, and a pharmaceutically acceptable excipient.

27. A kit comprising the antibody-drug conjugate of claim 11.

28. A method of diagnosing or treating tumor diseases, comprising administering to a subject a therapeutic dose of a therapeutic agent, wherein the therapeutic agent comprises the antibody-drug conjugate of claim 11.

* * * * *